(12) United States Patent
Ouchi et al.

(10) Patent No.: US 10,321,411 B2
(45) Date of Patent: Jun. 11, 2019

(54) TERMINAL APPARATUS AND COMMUNICATION METHOD FOR SETTING APPROPRIATE UPLINK TRANSMIT POWER FOR AN UPLINK SIGNAL BASED ON DETECING A DCI

(71) Applicant: SHARP KABUSHIKI KAISHA, Sakai, Osaka (JP)

(72) Inventors: Wataru Ouchi, Sakai (JP); Kimihiko Imamura, Sakai (JP); Yosuke Akimoto, Sakai (JP); Toshizo Nogami, Sakai (JP); Daiichiro Nakashima, Sakai (JP); Kazuyuki Shimezawa, Sakai (JP); Shoichi Suzuki, Sakai (JP); Yasuyuki Kato, Sakai (JP); Katsunari Uemura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/591,492

(22) Filed: May 10, 2017

(65) Prior Publication Data
US 2017/0245220 A1 Aug. 24, 2017

Related U.S. Application Data

(63) Continuation of application No. 14/236,560, filed as application No. PCT/JP2012/069673 on Aug. 2, 2012, now Pat. No. 9,832,737.

(30) Foreign Application Priority Data

Aug. 2, 2011 (JP) .................................. 2011-169320

(51) Int. Cl.
*H04W 52/24* (2009.01)
*H04W 52/14* (2009.01)
(Continued)

(52) U.S. Cl.
CPC ......... *H04W 52/242* (2013.01); *H04L 5/0073* (2013.01); *H04W 52/146* (2013.01);
(Continued)

(58) Field of Classification Search
CPC ............. H04W 52/146; H04W 72/042; H04W 52/242; H04W 24/10; H04L 5/0073; H04L 5/0048; H04B 7/024
See application file for complete search history.

(56) References Cited

U.S. PATENT DOCUMENTS

| 8,938,247 B2 | 1/2015 | Gorokhov et al. |
| 9,100,924 B2 | 8/2015 | Suzuki et al. |

(Continued)

FOREIGN PATENT DOCUMENTS

| EP | 2 523 510 A1 | 11/2012 |
| JP | 2011-4161 A | 1/2011 |

(Continued)

OTHER PUBLICATIONS

Suwon Park et al., "Uplink Transmit Power Control during Soft Handoff in DS/CDMA Systems", Aug. 2002, IEEE.*

(Continued)

*Primary Examiner* — Ian N Moore
*Assistant Examiner* — Justin T Van Roie
(74) *Attorney, Agent, or Firm* — Birch, Stewart, Kolasch & Birch, LLP

(57) ABSTRACT

A terminal apparatus for communication with a base station apparatus includes reception circuitry and a transmission circuitry. The reception circuitry receives a higher layer signal and sets first and second parameter sets for an uplink power control. The transmission circuitry transmits an uplink signal. If a cell of a first base station and a cell of a second base station are configured, the transmission circuitry sets a transmit power for the uplink signal based on
(Continued)

the first parameter set upon detecting a DCI format from the first base station and sets transmit power based on the second parameter set upon detecting a DCI format from the second base station.

4 Claims, 32 Drawing Sheets

(51) Int. Cl.
    *H04L 5/00*         (2006.01)
    *H04W 72/04*       (2009.01)
    *H04W 24/10*       (2009.01)
    *H04B 7/024*       (2017.01)

(52) U.S. Cl.
    CPC ........... *H04W 72/042* (2013.01); *H04B 7/024* (2013.01); *H04L 5/0048* (2013.01); *H04W 24/10* (2013.01)

(56) References Cited

U.S. PATENT DOCUMENTS

| | | |
|---|---|---|
| 9,264,197 B2 | 2/2016 | Suzuki et al. |
| 2008/0280638 A1 | 11/2008 | Malladi et al. |
| 2010/0331037 A1 | 12/2010 | Jen |
| 2011/0081936 A1 | 4/2011 | Haim et al. |
| 2011/0098054 A1 | 4/2011 | Gorokhov et al. |
| 2011/0195735 A1 | 8/2011 | Irmer et al. |
| 2012/0106388 A1 | 5/2012 | Shimezawa et al. |
| 2012/0127911 A1 | 5/2012 | Nishikawa et al. |
| 2012/0281654 A1 | 11/2012 | Aiba et al. |
| 2013/0012252 A1 | 1/2013 | Suzuki et al. |
| 2013/0070685 A1 | 3/2013 | Yi et al. |
| 2013/0077569 A1 | 3/2013 | Nam et al. |
| 2013/0078913 A1 | 3/2013 | Lee et al. |
| 2013/0114562 A1 | 5/2013 | Seo et al. |
| 2013/0121279 A1 | 5/2013 | Noh et al. |
| 2013/0272158 A1 | 10/2013 | Park et al. |
| 2014/0113677 A1 | 4/2014 | Parkvall et al. |
| 2014/0133337 A1 | 5/2014 | Lee et al. |
| 2014/0161003 A1 | 6/2014 | Han et al. |
| 2014/0169321 A1 | 6/2014 | Imamura et al. |
| 2014/0177467 A1 | 6/2014 | Kim et al. |
| 2014/0177531 A1 | 6/2014 | Imamura et al. |
| 2014/0177584 A1 | 6/2014 | Ouchi et al. |
| 2014/0241301 A1 | 8/2014 | Nakashima et al. |
| 2014/0247796 A1 | 9/2014 | Ouchi et al. |
| 2014/0329553 A1 | 11/2014 | Nakashima et al. |
| 2015/0043465 A1 | 2/2015 | Ouchi |

FOREIGN PATENT DOCUMENTS

| | | |
|---|---|---|
| JP | 2011-9866 A | 1/2011 |
| JP | 2011-061706 A | 3/2011 |
| JP | 2012-34145 A | 2/2012 |
| WO | WO 2010/022773 A1 | 3/2010 |
| WO | WO 2011/031059 A2 | 3/2011 |
| WO | WO 2011/044171 A2 | 4/2011 |
| WO | WO 2011/083706 A1 | 7/2011 |
| WO | WO 2011/083746 A1 | 7/2011 |

OTHER PUBLICATIONS

3GPP TS 36.213 V10.2.0 (Jun. 2011) pp. 9-18 (Year: 2011).*
Park et al., UE Measurement Reports for CoMP, U.S. Appl. No. 61/445,534, filed Feb. 2011 (Year: 2011).*
Park et al., UL Power Control in CoMP, U.S. Appl. No. 61/446,497, filed Feb. 2011 (Year: 2011).*
3GPP TR 36.814 V9.0.0 (Mar. 2010) 3rd Generation Partnership Project; Technical Specification Group Radio Access Network; Evolved Universal Terrestrial Radio Access (E-UTRA); Further advancements for E-UTRA physical layer aspects (Release 9), pp. 1-104.
3GPP TS 36.212 V10.1.0 (Mar. 2011) 3rd Generation Partnership Project; Technical Specification Group Radio Access Network; Evolved Universal Terrestrial Radio Access (E-UTRA); Multiplexing and channel coding (Release 10), pp. 1-76.
Intel Corporation: "Uplink Power Control Discussion for CoMP Scenario 4," 3GPP Draft; R1-111598, 3rd Generation Partnership Project (3GPP). F-06921 Sophia-Antipolis Cedex; France, vol. RAN WG1, No. Barcelona, Spain; May 9, 2011, May 3, 2011, XP050491244.
InterDigital Communications Corporation, "Combined Open Loop/Closed Loop Uplink Power Control with Interference Mitigation for E-UTRA", 6.11, 3GPP TSG RAN WG1 #48, R1-071100, St. Louis, USA, Feb. 12-16, 2007, pp. 1-7.
Jacek Gora et al., "Cell-Specific Uplink Power Control for Heterogeneous Networks in LTE" Vehicular Technology Conference Fall (VTC 2010-Fall), 2010 IEEE 72nd, IEEE, Piscataway, NJ, USA, Sep. 6, 2010, pp. 1-5, XP031770394 ISBN: 978-1-4244-3573-9.
Lee et al, Methods to Support Extension Carrier, U.S. Appl. No. 61/522,253, filed Aug. 2011.
Leumaleu Djikeussi Cedric Anthony, LTE: der Mobilfunk der Zukunft Reference Signals and Channel Estimation, Nov. 25, 2009.
Panasonic, "Flexible CoMP Operation based on Dedicated CSI-RS Configuration", 3GPP TSG RAN WG1 Meeting #65 R1-111587, Barcelona, Spain, May 9-13, 2011, pp. 1-5.
U.S. Office Action for corresponding U.S. Appl. No. 14/236,481 dated Mar. 23, 2015.
U.S. Office Action for corresponding U.S. Appl. No. 14/236,541 dated Mar. 23, 2015.
CATT, SRS enhancement for Comp [online], 3GPP TSG-RAN WG1#68 R1-120107, Internet <URL:http://www.3gpp.org/ftp/tsg_ran/WG1_RL1/TSGR1_68/Docs/R1-120107.zip>, Jan. 31, 2012 (2 pages).
Kim et al,, Pathloss Estimation Method, U.S. Appl. No. 61/546,566, U.S. Appl. No. 61/546,566, filed Oct. 2011.
Lee et al., Aperiodic SRS Design for LTE-Advanced, U.S. Appl. No. 61/369,654, filed Jul. 2010.
Nam et al., Methods and Apparatus on Uplink Transmissions in Wirelss Communications Systems, U.S. Appl. No. 61/538,021, filed Sep. 2011.
U.S. Advisory Action for copending U.S. Appl. No. 14/236,560, dated Feb. 12, 2016.
U.S. Office Action for copending U.S. Appl. No. 14/236,560, dated Feb. 10, 2017.
U.S. Office Action for copending U.S. Appl. No. 14/236,560, dated Mar. 13, 2015.
U.S. Office Action for copending U.S. Appl. No. 14/236,560, dated Sep. 2, 2016.
U.S. Office Action for copending U.S. Appl. No. 14/236,560, dated Sep. 25, 2015.
U.S. Office Action, dated Sep. 25, 2015, for U.S. Appl. No. 14/236,541.
U.S. Office Action for Copending U.S. Appl. No. 14/236,541, dated Feb. 13, 2017.
U.S. Office Action for Copending U.S. Appl. No. 14/236,541, dated Sep. 6, 2016.
U.S. Office Action for U.S. Appl. No. 14/236,481, dated Oct. 8, 2015.
International Search Report for corresponding PCT application No. PCT/JP2012/069673, dated Sep. 25, 2012.
U.S. Advisory Action for copending U.S. Appl. No. 14/236,541, dated Feb. 12, 2016.

* cited by examiner

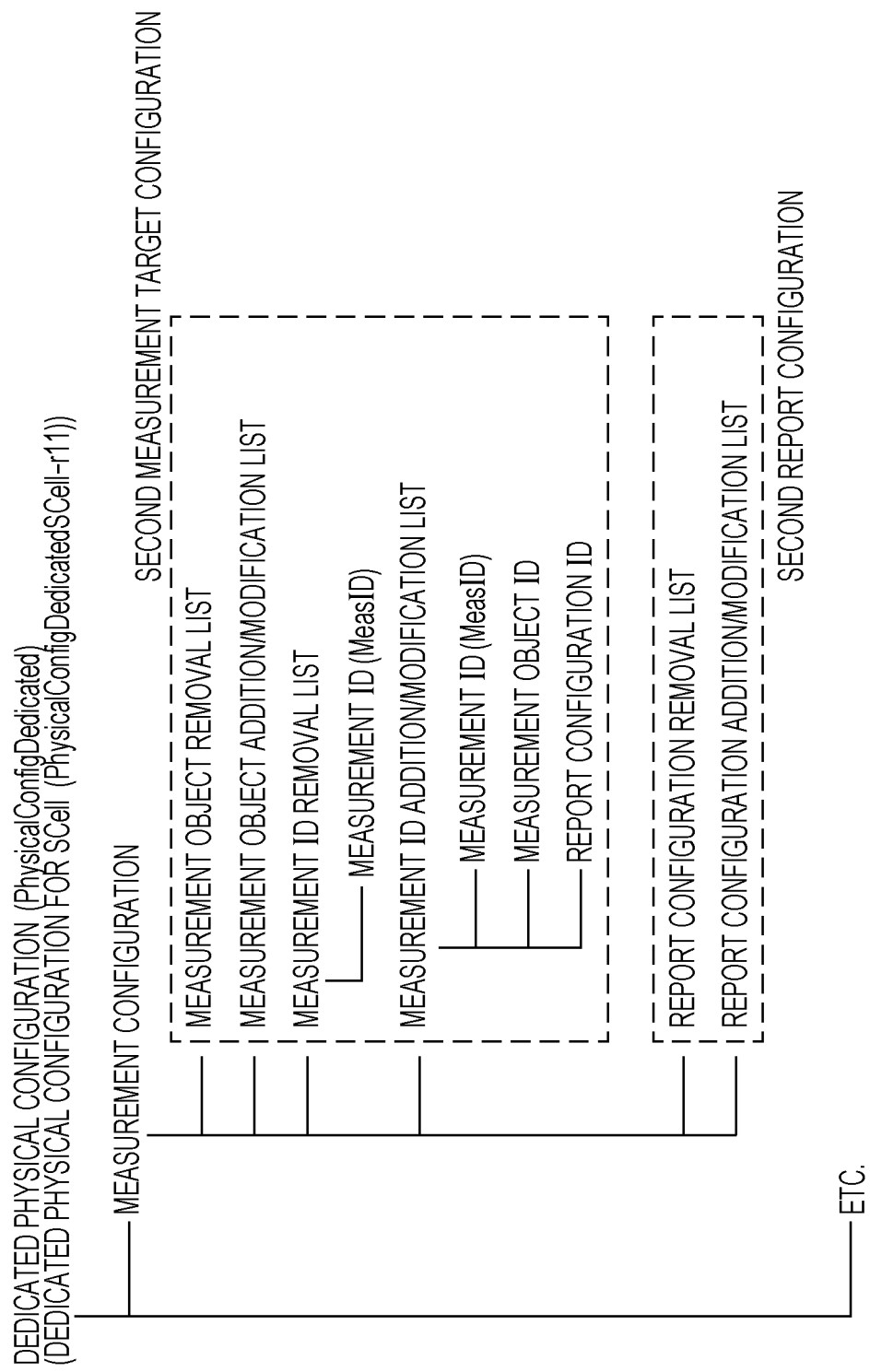

FIG. 17

REPORT CONFIGURATION-ADDITION/MODIFICATION LIST
- REPORT CONFIGURATION ID
- REPORT CONFIGURATION
- REPORT CONFIGURATION ID
- REPORT CONFIGURATION
- REPORT CONFIGURATION ID
- REPORT CONFIGURATION

REPORT CONFIGURATION-REMOVAL LIST
- REPORT CONFIGURATION ID
- REPORT CONFIGURATION ID
- REPORT CONFIGURATION ID

FIG. 18

REPORT CONFIGURATION
- TRIGGER TYPE
- TRIGGER PHYSICAL QUANTITY — {RSRP, RSRQ}
- REPORT PHYSICAL QUANTITY — {SAME AS TRIGGER TYPE, BOTH}
- MAXIMUM REPORT CELL (MAXIMUM NUMBER OF REPORT CELLS)
- REPORT INTERVAL
- REPORT AMOUNT (NUMBER OF MEASUREMENT REPORTS)
- ETC.

FIG. 28

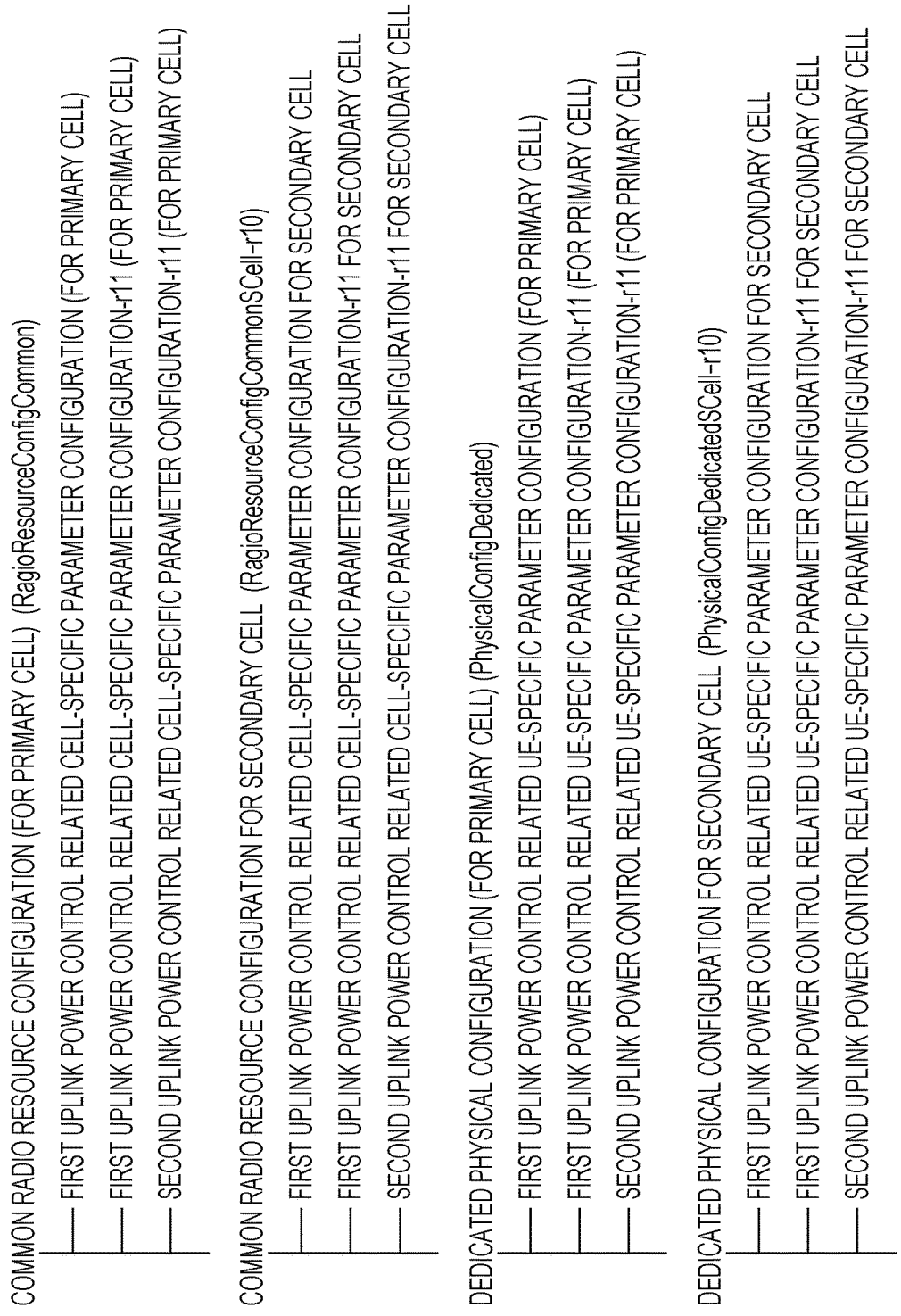

COMMON RADIO RESOURCE CONFIGURATION (FOR PRIMARY CELL) (RagioResourceConfigCommon)
— FIRST UPLINK POWER CONTROL RELATED CELL-SPECIFIC PARAMETER CONFIGURATION (FOR PRIMARY CELL)
— FIRST UPLINK POWER CONTROL RELATED CELL-SPECIFIC PARAMETER CONFIGURATION-r11 (FOR PRIMARY CELL)
— SECOND UPLINK POWER CONTROL RELATED CELL-SPECIFIC PARAMETER CONFIGURATION-r11 (FOR PRIMARY CELL)

COMMON RADIO RESOURCE CONFIGURATION FOR SECONDARY CELL (RagioResourceConfigCommonSCell-r10)
— FIRST UPLINK POWER CONTROL RELATED CELL-SPECIFIC PARAMETER CONFIGURATION FOR SECONDARY CELL
— FIRST UPLINK POWER CONTROL RELATED CELL-SPECIFIC PARAMETER CONFIGURATION-r11 FOR SECONDARY CELL
— SECOND UPLINK POWER CONTROL RELATED CELL-SPECIFIC PARAMETER CONFIGURATION-r11 FOR SECONDARY CELL DEDICATED PHYSICAL CONFIGURATION (FOR PRIMARY CELL) (PhysicalConfigDedicated)
— FIRST UPLINK POWER CONTROL RELATED UE-SPECIFIC PARAMETER CONFIGURATION (FOR PRIMARY CELL)
— FIRST UPLINK POWER CONTROL RELATED UE-SPECIFIC PARAMETER CONFIGURATION-r11 (FOR PRIMARY CELL)
— SECOND UPLINK POWER CONTROL RELATED UE-SPECIFIC PARAMETER CONFIGURATION-r11 (FOR PRIMARY CELL)

DEDICATED PHYSICAL CONFIGURATION FOR SECONDARY CELL (PhysicalConfigDedicatedSCell-r10)
— FIRST UPLINK POWER CONTROL RELATED UE-SPECIFIC PARAMETER CONFIGURATION FOR SECONDARY CELL
— FIRST UPLINK POWER CONTROL RELATED UE-SPECIFIC PARAMETER CONFIGURATION-r11 FOR SECONDARY CELL
— SECOND UPLINK POWER CONTROL RELATED UE-SPECIFIC PARAMETER CONFIGURATION-r11 FOR SECONDARY CELL

FIG. 29

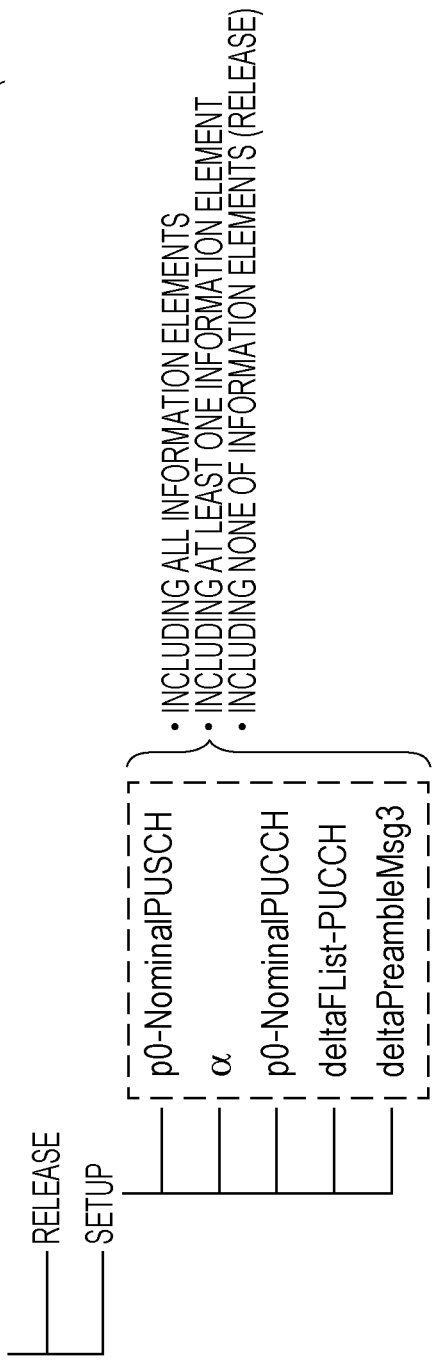

EXAMPLE OF SECOND UPLINK POWER CONTROL RELATED CELL-SPECIFIC PARAMETER CONFIGURATION-r11 (FOR PRIMARY CELL)

- RELEASE
- SETUP
  - p0-NominalPUSCH
  - α
  - p0-NominalPUCCH
  - deltaFList-PUCCH
  - deltaPreambleMsg3

- INCLUDING ALL INFORMATION ELEMENTS
- INCLUDING AT LEAST ONE INFORMATION ELEMENT
- INCLUDING NONE OF INFORMATION ELEMENTS (RELEASE)

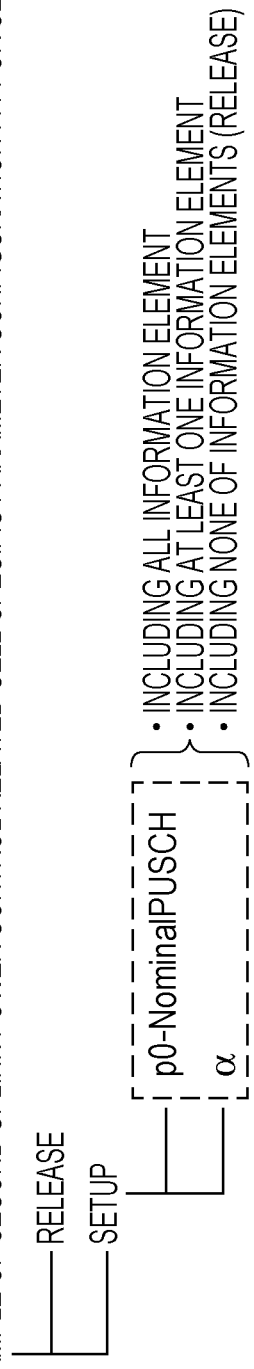

EXAMPLE OF SECOND UPLINK POWER CONTROL RELATED CELL-SPECIFIC PARAMETER CONFIGURATION-r11 FOR SECONDARY CELL

- RELEASE
- SETUP
  - p0-NominalPUSCH
  - α

- INCLUDING ALL INFORMATION ELEMENT
- INCLUDING AT LEAST ONE INFORMATION ELEMENT
- INCLUDING NONE OF INFORMATION ELEMENTS (RELEASE)

FIG. 30

EXAMPLE OF FIRST UPLINK POWER CONTROL RELATED UE-SPECIFIC PARAMETER
CONFIGURATION-r11 (FOR PRIMARY CELL)
└── PATH LOSS REFERENCE RESOURCE

EXAMPLE OF FIRST UPLINK POWER CONTROL RELATED UE-SPECIFIC PARAMETER
CONFIGURATION-r11 FOR SECONDARY CELL
└── PATH LOSS REFERENCE RESOURCE

EXAMPLE OF SECOND UPLINK POWER CONTROL RELATED UE-SPECIFIC PARAMETER
CONFIGURATION-r11 (FOR PRIMARY CELL)
├── RELEASE
└── SETUP
    ├── p0-UE-PUSCH
    ├── deltaMCS-Enabled
    ├── accumulation-Enabled
    ├── p0-UE-PUCCH
    ├── pSRS-Offset
    ├── filterCoefficient
    ├── pSRS-Offset-Ap
    ├── deltaTxD-OffsetListPUCCH
    └── PATH LOSS REFERENCE RESOURCE

- INCLUDING ALL INFORMATION ELEMENTS
- INCLUDING AT LEAST ONE INFORMATION ELEMENT
- INCLUDING NONE OF INFORMATION ELEMENTS (RELEASE)

EXAMPLE OF SECOND UPLINK POWER CONTROL RELATED UE-SPECIFIC PARAMETER
CONFIGURATION-r11 FOR SECONDARY CELL
├── RELEASE
└── SETUP
    ├── p0-UE-PUSCH
    ├── deltaMCS-Enabled
    ├── accumulation-Enabled
    ├── p0-UE-PUCCH
    ├── pSRS-Offset
    ├── pSRS-Offset-Ap
    ├── filterCoefficient
    ├── pathlossReference(-r11)
    └── PATH LOSS REFERENCE RESOURCE

- INCLUDING ALL INFORMATION ELEMENTS
- INCLUDING AT LEAST ONE INFORMATION ELEMENT
- INCLUDING NONE OF INFORMATION ELEMENTS (RELEASE)

FIG. 31

PATH LOSS REFERENCE RESOURCE
└── MEASUREMENT TARGET ── INDEX ASSOCIATED WITH CELL-SPECIFIC REFERENCE SIGNAL ANTENNA PORT 0 OR CSI-RS ANTENNA PORT INDEX (OR CSI-RS MEASUREMENT INDEX)

TERMINAL APPARATUS AND COMMUNICATION METHOD FOR SETTING APPROPRIATE UPLINK TRANSMIT POWER FOR AN UPLINK SIGNAL BASED ON DETECING A DCI

This application is a Continuation of application Ser. No. 14/236,560, filed on Jan. 31, 2014, now U.S. Pat. No. 9,832,737 which was filed as PCT International Application No. PCT/JP2012/069673 on Aug. 2, 2012, which claims the benefit under 35 U.S.C. § 119(a) to Patent Application No. 2011-169320, filed in Japan on Aug. 2, 2011, all of which are hereby expressly incorporated by reference into the present application.

TECHNICAL FIELD

The present invention relates to a terminal, a communication system, and a communication method.

BACKGROUND ART

In radio communication systems such as systems based on WCDMA (Wideband Code Division Multiple Access), LTE (Long Term Evolution), and LTE-A (LTE-Advanced), which are developed by 3GPP (Third Generation Partnership Project), and Wireless LAN and WiMAX (Worldwide Interoperability for Microwave Access), which are developed by IEEE (The Institute of Electrical and Electronics engineers), a base station (cell, transmit station, transmitting device, eNodeB) and a terminal (mobile terminal, receive station, mobile station device, receiving device, UE (User Equipment)) each include a plurality of transmit/receive antennas, and employ MIMO (Multi Input Multi Output) techniques to spatially multiplex data signals to realize high-speed data communication.

In these radio communication systems, it is necessary for a base station to perform various types of control on a terminal in order to realize data communication between the base station and the terminal. To this end, a base station notifies a terminal of control information using certain resources to perform data communication in the downlink and uplink. For example, a base station notifies a terminal of information on resource allocation, information on the modulation and coding scheme of data signals, spatial multiplexing order information of data signals, transmit power control information, and so forth to realize data communication. Transmission of such control information may be implemented using the method described in NPL 1.

Various methods may be used as communication methods based on MIMO techniques in the downlink, examples of which include a multi-user MIMO scheme in which the same resources are allocated to different terminals, and a CoMP (Cooperative Multipoint, Coordinated Multipoint) scheme in which a plurality of base stations coordinate with each other to perform data communication.

FIG. 34 is a diagram illustrating an example of implementation of a multi-user MIMO scheme. In FIG. 34, a base station 3401 performs data communication with a terminal 3402 via a downlink 3404, and performs data communication with a terminal 3403 via a downlink 3405. In this case, the terminal 3402 and the terminal 3403 perform multi-user MIMO-based data communication. The downlink 3404 and the downlink 3405 use the same resources. The resources include resources in the frequency domain and the time domain. Further, the base station 3401 performs beam control for each of the downlink 3404 and the downlink 3405 using a precoding technique or the like to mutually maintain orthogonality or reduce co-channel interference. Accordingly, the base station 3401 can realize data communication with the terminal 3402 and the terminal 3403 using the same resources.

FIG. 35 is a diagram illustrating an example of implementation of a downlink CoMP scheme. In FIG. 35, the establishment of a radio communication system having a heterogeneous network configuration using a broad-coverage macro base station 3501 and an RRH (Remote Radio Head) 3502 having a narrower coverage than the macro base station 3501 is illustrated. Consideration is now given to a configuration in which the coverage of the macro base station 3501 includes part or all of the coverage of the RRH 3502. In the example illustrated in FIG. 35, the macro base station 3501 and the RRH 3502 establish a heterogeneous network configuration, and coordinate with each other to perform data communication with a terminal 3504 via a downlink 3505 and a downlink 3506, respectively. The macro base station 3501 is connected to the RRH 3502 via a line 3503, and can transmit and receive a control signal and a data signal to and from the RRH 3502. The line 3503 may be implemented using a wired line such as a fiber optic line or a wireless line that is based on relay technology. In this case, the macro base station 3501 and the RRH 3502 use frequencies (resources) some or all of which are identical, thereby improving the total spectral efficiency (transmission capacity) within the area of the coverage established by the macro base station 3501.

The terminal 3504 can perform single-cell communication with the base station 3501 or the RRH 3502 while located near the base station 3501 or the RRH 3502. While located near the edge (cell edge) of the coverage established by the RRH 3502, the terminal 3504 needs to take measures against co-channel interference from the macro base station 3501. There is under study a method for reducing or suppressing interference with the terminal 3504 in the cell-edge area using a CoMP scheme as multi-cell communication (coordinated communication) between the macro base station 3501 and the RRH 3502. In the CoMP scheme, the macro base station 3501 and the RRH 3502 coordinate with each other. The method described in NPL 2 is being studied as the CoMP scheme, by way of example.

FIG. 36 is a diagram illustrating an example of implementation of an uplink CoMP scheme. In FIG. 36, the establishment of a radio communication system having a heterogeneous network configuration using a broad-coverage macro base station 3601 and an RRH (Remote Radio Head) 3602 having a narrower coverage than that macro base station 3601 is illustrated. Consideration is now given to a configuration in which the coverage of the macro base station 3601 includes part or all of the coverage of the RRH 3602. In the example illustrated in FIG. 36, the macro base station 3601 and the RRH 3602 establish a heterogeneous network configuration, and coordinate with each other to perform data communication with a terminal 3604 via an uplink 3605 and an uplink 3606, respectively. The macro base station 3601 is connected to the RRH 3602 via a line 3603, and can transmit and receive a reception signal, a control signal, and a data signal to and from the RRH 3602. The line 3603 may be implemented using a wired line such as a fiber optic line or a wireless line that is based on relay technology. In this case, the macro base station 3601 and the RRH 3602 use frequencies (resources) some or all of which are identical, thereby improving the total spectral efficiency (transmission capacity) within the area of the coverage established by the macro base station 3601.

The terminal 3604 can perform single-cell communication with the base station 3601 or the RRH 3602 while located near the base station 3601 or the RRH 3602. In this case, while the terminal 3604 is located near the base station 3601, the base station 3601 receives and demodulates a signal received via the uplink 3605. While the terminal 3604 is located near the RRH 3602, the RRH 3602 receives and demodulates a signal received via the uplink 3606. In addition, while the terminal 3604 is located near the edge (cell edge) of the coverage established by the RRH 3602 or near a midpoint between the base station 3601 and the RRH 3602, the macro base station 3601 receives a signal received via the uplink 3605, and the RRH 3602 receives a signal received via the uplink 3606. Then, the macro base station 3601 and the RRH 3602 transmit and receive these signals, which have been received from the terminal 3604, to and from each other via the line 3603, combine the signals received from the terminal 3604, and demodulate a composite signal. Through these processing operations, improvements in the performance of data communication are expected. This is a method called Joint Reception, which enables improvements in the performance of data communication in the cell-edge area or an area near a midpoint between the macro base station 3601 and the RRH 3602 using a CoMP scheme in which the macro base station 3601 and the RRH 3602 coordinate with each other for uplink multi-cell (multipoint) communication (also called coordinated communication).

CITATION LIST

Non Patent Literature

NPL 1: 3rd Generation Partnership Project; Technical Specification Group Radio Access Network; Evolved Universal Terrestrial Radio Access (E-UTRA); Multiplexing and channel coding (Release 10), March 2011, 3GPP TS 36.212 V10.1.0 (2011-03).

NPL 2: 3rd Generation Partnership Project; Technical Specification Group Radio Access Network; Evolved Universal Terrestrial Radio Access (E-UTRA); Further Advancements for E-UTRA physical layer aspects (Release 9), March 2010, 3GPP TR 36.814 V9.0.0 (2010-03).

SUMMARY OF INVENTION

Technical Problem

In a radio communication system capable of coordinated communication based on a scheme such as a CoMP scheme, however, the appropriate uplink transmit power differs depending on whether a signal transmitted from a terminal is received at a base station, an RRH, or both the base station and the RRH. For example, transmission of a signal at unnecessarily high power would result in increased interference to another base station, and transmission of a signal at low power could hinder the maintenance of appropriate reception quality, leading to a reduction in the throughput of the entire system.

The present invention has been made in view of the foregoing problems, and an object thereof is to provide a terminal, a communication system, and a communication method that enable measurement of downlink received power and configuration of appropriate uplink transmit power in a radio communication system in which a base station and a terminal communicate with each other, so that the terminal can configure appropriate uplink transmit power.

Solution to Problem (1) This invention has been made in order to overcome the problems described above, and a terminal of the present invention is a terminal for communicating with a base station, including a receiving unit configured to receive a radio resource control signal including information concerning a path loss reference resource and information concerning an uplink power control related parameter configuration; a higher layer processing unit configured to calculate a path loss on the basis of the information concerning the path loss reference resource and the information concerning the uplink power control related parameter configuration; and a transmit power control unit configured to set the uplink transmit power on the basis of the path loss and the information concerning the uplink power control related parameter configuration.

(2) Furthermore, a terminal of the present invention is a terminal for communicating with a base station, including a receiving unit configured to receive a radio resource control signal including information concerning a first path loss reference resource and/or information concerning a second path loss reference resource, and information concerning an uplink power control related parameter configuration; a higher layer processing unit configured to set a first path loss on the basis of the information concerning the first path loss reference resource and to set a second path loss on the basis of the information concerning the second path loss reference resource; and a transmit power control unit configured to set an uplink transmit power on the basis of the first path loss and/or the second path loss and the information concerning the uplink power control related parameter configuration.

(3) Furthermore, a terminal of the present invention is a terminal for communicating with a base station, including a receiving unit configured to receive a radio resource control signal including information concerning a primary cell-specific path loss reference resource and/or information concerning a secondary cell-specific path loss reference resource and information concerning an uplink power control related parameter configuration, and to receive a physical downlink control channel; a higher layer processing unit configured to set a path loss on the basis of the information concerning the primary cell-specific path loss reference resource and the information concerning the uplink power control related parameter configuration in a case where the physical downlink control channel has been detected in a primary cell, and to set a path loss on the basis of the information concerning the secondary cell-specific path loss reference resource and the information concerning the uplink power control related parameter configuration in a case where the physical downlink control channel has been detected in a secondary cell; a transmit power control unit configured to control an uplink transmit power for the primary cell and/or the secondary cell on the basis of the first path loss and/or the second path loss and the information concerning the uplink power control related parameter configuration; and a transmitting unit configured to transmit an uplink signal to the base station at the uplink transmit power.

(4) Furthermore, a terminal of the present invention is a terminal for communicating with a base station, including a receiving unit configured to receive a radio resource control signal including information concerning a first path loss reference resource and/or information concerning a second path loss reference resource, and information concerning an uplink power control related parameter configuration; a higher layer processing unit configured to set a first path loss on the basis of the information concerning the first path loss reference resource and the information concerning the uplink power control related parameter configuration in a case where the physical downlink control channel has been detected in a downlink subframe included in a first subframe subset, and to set a second path loss on the basis of the second path loss reference resource and the uplink power control related parameter configuration in a case where the physical downlink control channel has been detected in a downlink subframe included in a second subframe subset; a transmit power control unit configured to control an uplink transmit power for the first subframe subset and/or the second subframe subset on the basis of the first path loss and/or the second path loss and the information concerning the uplink power control related parameter configuration; and a transmitting unit configured to transmit an uplink signal to the base station at the uplink transmit power in an uplink subframe included in the subframe subset.

(5) Furthermore, the terminal of the present invention transmits an uplink signal to the base station at a first uplink transmit power in a case where a transmission subframe of a periodic uplink signal is included in the first subframe subset, and transmits an uplink signal to the base station at a second uplink transmit power in a case where a transmission subframe of a periodic uplink signal is included in the second subframe subset.

(6) Furthermore, a terminal of the present invention is a terminal for communicating with a base station, including a receiving unit configured to receive a radio resource control signal including information concerning a first path loss reference resource and/or information concerning a second path loss reference resource, and information concerning an uplink power control related parameter configuration; a higher layer processing unit configured to set a first path loss on the basis of the information concerning the first path loss reference resource and the information concerning the uplink power control related parameter configuration in a case where the physical downlink control channel has been detected in a first control channel region, and to set a second path loss on the basis of the information concerning the second path loss reference resource and the information concerning the uplink power control related parameter configuration in a case where the physical downlink control channel has been detected in a second control channel region; and a transmitting unit configured to transmit an uplink signal to the base station at the uplink transmit power on the basis of the first path loss and/or the second path loss and the information concerning the uplink power control related parameter configuration.

(7) Furthermore, in the terminal of the present invention, the information concerning the path loss reference resource includes information concerning an index associated with cell-specific reference signal antenna port 0.

(8) Furthermore, in the terminal of the present invention, the information concerning the path loss reference resource includes information concerning an antenna port index of a channel-state information reference signal.

(9) Furthermore, in the terminal of the present invention, the information concerning the path loss reference resource includes information concerning an index determined using a third reference signal configuration.

(10) Furthermore, in the terminal of the present invention, each of the information concerning the first path loss reference resource and the information concerning the second path loss reference resource includes information concerning a different index.

(11) Furthermore, a communication system of the present invention is a communication system including a base station and a terminal, wherein the base station notifies the terminal of a radio resource control signal including information concerning a path loss reference resource and information concerning an uplink power control related parameter configuration, and notifies the terminal of a physical downlink control channel, and the terminal sets a path loss and an uplink transmit power in accordance with information included in the radio resource control signal on the basis of the information concerning the path loss reference resource and the information concerning the uplink power control related parameter configuration, and transmits an uplink signal to the base station at the uplink transmit power.

(12) Furthermore, a communication system of the present invention is a communication system including a base station and a terminal, wherein the base station transmits to the terminal a radio resource control signal including information concerning an uplink power control related parameter configuration in which information concerning a primary cell-specific path loss reference resource and/or information concerning a secondary cell-specific path loss reference resource is configured, and transmits a physical downlink control channel to the terminal, and the terminal sets, in accordance with information included in the radio resource control signal, a path loss and an uplink transmit power on the basis of the information concerning the primary cell-specific path loss reference resource and the information concerning the uplink power control related parameter configuration in a case where the physical downlink control channel has been detected in a primary cell, sets a path loss and an uplink transmit power on the basis of the information concerning the secondary cell-specific path loss reference resource and the information concerning the uplink power control related parameter configuration in a case where the physical downlink control channel has been detected in a secondary cell, and transmits an uplink signal to the base station at the uplink transmit power.

(13) Furthermore, a communication system of the present invention is a communication system including a base station and a terminal, wherein the base station transmits to the terminal a radio resource control signal including information concerning a first path loss reference resource and/or information concerning a second path loss reference resource, and information concerning an uplink power control related parameter configuration, and transmits a physical downlink control channel to the terminal, and the terminal sets, in accordance with information included in the radio resource control signal, a path loss and an uplink transmit power on the basis of the information concerning the first path loss reference resource and the information concerning the uplink power control related parameter configuration in a case where the physical downlink control channel has been detected in a downlink subframe included in a first subframe subset, sets a path loss and an uplink transmit power on the basis of the information concerning the second path loss reference resource and the information concerning the uplink power control related parameter configuration in a case where the physical downlink control channel has been detected in a downlink subframe included in a second subframe subset, and transmits an uplink signal to the base station at the uplink transmit power in an uplink subframe included in the subframe subset.

(14) Furthermore, a communication system of the present invention is a communication system including a base station and a terminal, wherein the base station transmits to the terminal a radio resource control signal including information concerning an uplink power control related parameter configuration in which information concerning a first path loss reference resource and/or information concerning a second path loss reference resource is configured, and transmits a physical downlink control channel to the terminal, and the terminal sets, in accordance with information included in the radio resource control signal, a path loss and an uplink transmit power on the basis of the information concerning the first path loss reference resource and the information concerning the uplink power control related parameter configuration in a case where the physical downlink control channel has been detected in a first control channel region, sets a path loss and an uplink transmit power on the basis of the information concerning the second path loss reference resource and the information concerning the uplink power control related parameter configuration in a case where the physical downlink control channel has been detected in a second control channel region, and transmits an uplink signal to the base station at the uplink transmit power.

(15) Furthermore, a communication method of the present invention is a communication method for a communication system including a base station and a terminal, including a step in which the base station transmits to the terminal a radio resource control signal including information concerning a path loss reference resource and information concerning an uplink power control related parameter configuration; a step in which the base station transmits a physical downlink control channel to the terminal; a step in which the terminal sets a path loss and an uplink transmit power in accordance with information included in the radio resource control signal on the basis of the information concerning the path loss reference resource and the information concerning the uplink power control related parameter configuration; and a step in which the terminal transmits an uplink signal to the base station at the uplink transmit power.

Advantageous Effects of Invention

According to this invention, in a radio communication system in which a base station and a terminal communicate with each other, the terminal can measure downlink received power and configure appropriate uplink transmit power.

BRIEF DESCRIPTION OF DRAWINGS

FIG. 16 is a diagram illustrating the details of a second measurement target configuration and report configuration in step S403 in FIG. 4.

FIG. 17 is a diagram illustrating the details of the second report configuration.

FIG. 18 is a diagram illustrating an example of a report configuration.

FIG. 28 is a diagram illustrating an example of a first uplink power control related parameter configuration and a second uplink power control related parameter configuration included in each radio resource configuration.

FIG. 29 is a diagram illustrating an example of a second uplink power control related cell-specific parameter configuration.

FIG. 30 is a diagram illustrating an example of a first uplink power control related UE-specific parameter configuration and a second uplink power control related UE-specific parameter configuration.

FIG. 31 is a diagram illustrating an example of the path loss reference resource.

DESCRIPTION OF EMBODIMENTS

First Embodiment

A first embodiment of the present invention will be described hereinafter. A communication system according to the first embodiment includes a macro base station (base station, transmitting device, cell, transmission point, set of transmit antennas, set of transmit antenna ports, set of receive antenna ports, component carrier, eNodeB), an RRH (Remote Radio Head, remote antenna, distributed antenna, base station, transmitting device, cell, transmission point, set of transmit antennas, set of transmit antenna ports, component carrier, eNodeB), and a terminal (terminal device, mobile terminal, reception point, receiver terminal, receiving device, third communication device, set of transmit antenna ports, set of receive antennas, set of receive antenna ports, UE).

Figure 1:
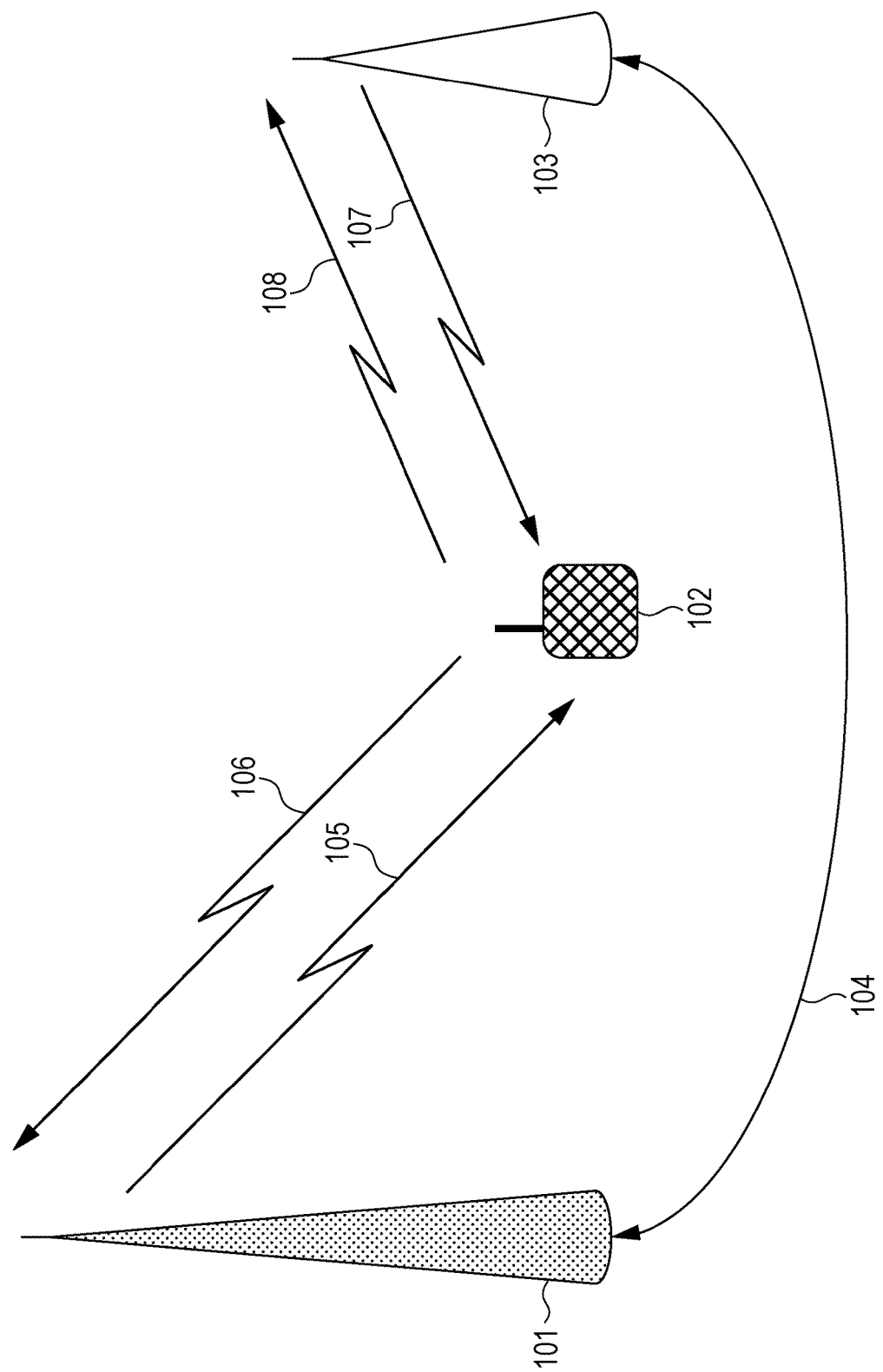
FIG. 1 is a schematic diagram illustrating a communication system for performing data transmission according to a first embodiment of the present invention.

FIG. 1 is a schematic diagram illustrating a communication system for performing data transmission according to the first embodiment of the present invention. In FIG. 1, a base station (macro base station) 101 transmits and receives control information and information data to and from a terminal 102 via a downlink 105 and an uplink 106 in order to perform data communication with the terminal 102. Similarly, an RRH 103 transmits and receives control information and information data to and from the terminal 102 via a downlink 107 and an uplink 108 in order to perform data communication with the terminal 102. A line 104 may be implemented using a wired line such as a fiber optic line or a wireless line that is based on relay technology. In this case, the macro base station 101 and the RRH 103 use frequencies (resources) some or all of which are identical, thereby improving the total spectral efficiency (transmission capacity) within the area of the coverage established by the macro base station 101.

Such a network as established between neighbouring stations (for example, between a macro base station and an RRH) using the same frequency is called a single frequency network (SFN). In FIG. 1, furthermore, the base station 101 notifies the terminal 102 of a cell ID, which is used for a cell-specific reference signal (CRS) or a UE-specific reference signal (UE-RS) described below. The UE-specific reference signal is also referred to as the downlink demodulation reference signal (DL DMRS) or the terminal-specific reference signal. The RRH 103 may also notify the terminal 102 of a cell ID. The cell ID notified by the RRH 103 may or may not be the same as the cell ID notified by the base station 101. In the following description, the base station 101 may represent the base station 101 and the RRH 103 illustrated in FIG. 1. In the following description, the operation between the base station 101 and the RRH 103 may represent the operation between macro base stations or between RRHs.

Figure 2:
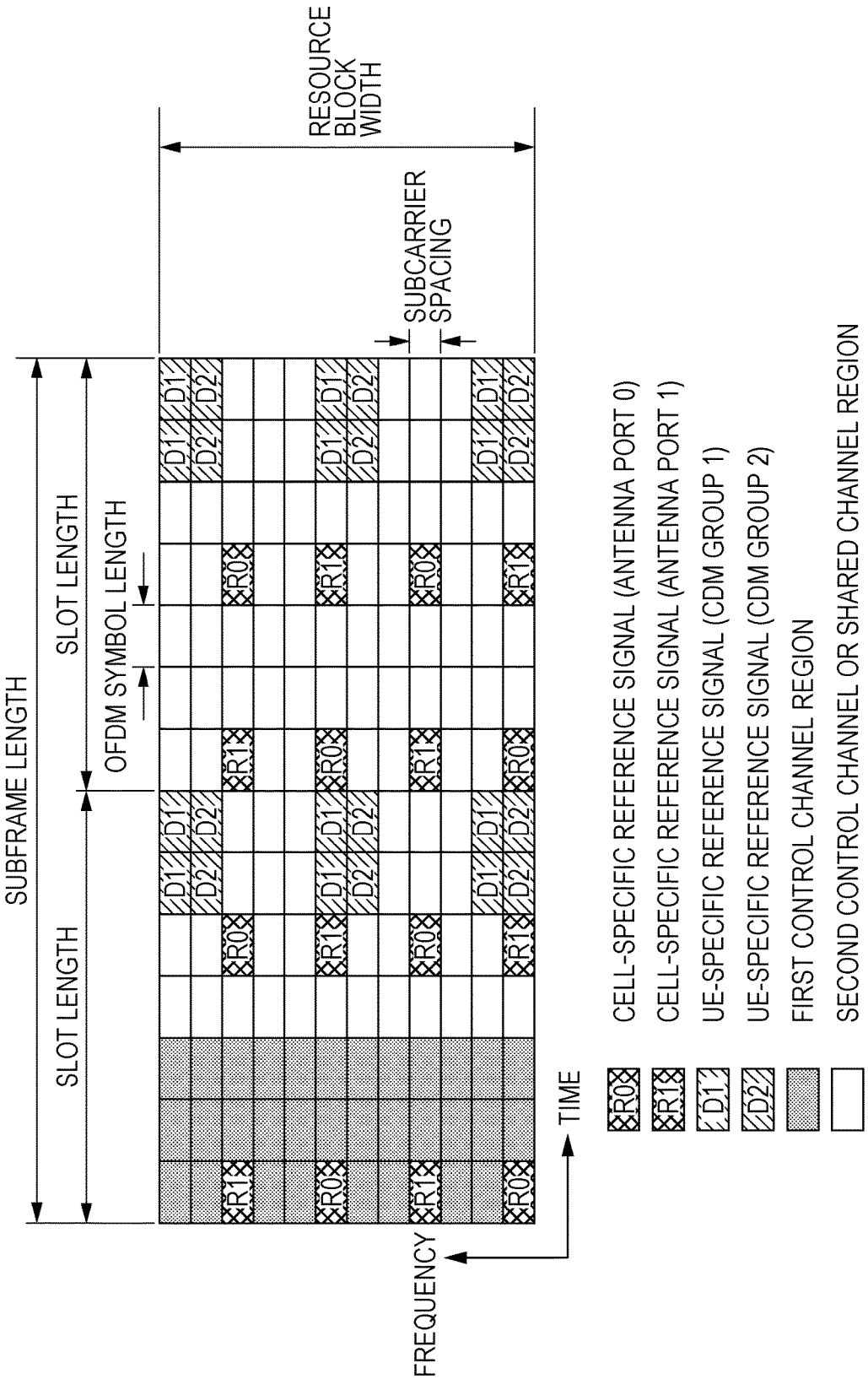
FIG. 2 is a diagram illustrating an example of one resource block pair used for mapping at a base station 101.

FIG. 2 is a diagram illustrating an example of one resource block pair used for mapping at the base station 101 and/or the RRH 103 via the downlink 105 or the downlink 107. FIG. 2 illustrates two resource blocks (resource block pair), each resource block being composed of 12 subcarriers in the frequency domain and 7 OFDM symbols in the time domain. Each subcarrier for a duration of one OFDM symbol is called a resource element (RE). Resource block pairs are arranged in the frequency domain, and the number of resource block pairs may be set for each base station. For example, the number of resource block pairs may be set to 6 to 110. The width of the resource block pairs in the frequency domain is called a system bandwidth. A resource block pair in the time domain is called a subframe. In each subframe, sets of 7 consecutive OFDM symbols in the time domain are each also called a slot. In the following description, resource block pairs are also referred to simply as resource blocks (RBs).

Among the resource elements shown shaded, R0 to R1 represent cell-specific reference signals (CRSs) for antenna ports 0 to 1, respectively. The cell-specific reference signals illustrated in FIG. 2 are used in the case of two antenna ports, the number of which may be changed. For example, a cell-specific reference signal for one antenna port or four antenna ports may be mapped. The cell-specific reference signal can be configured for up to four antenna ports (antenna ports 0 to 3).

The base station 101 and the RRH 103 may allocate the R0 to R1 to different resource elements, or may allocate the R0 to R1 to the same resource element. For example, in a case where the base station 101 and the RRH 103 allocate the R0 to R1 to different resource elements and/or different signal sequences, the terminal 102 can individually calculate the respective received powers (received signal powers) using the cell-specific reference signals. In particular, in a case where cell IDs notified by the base station 101 and the RRH 103 are different, the configuration described above is made feasible. In another example, only the base station 101 may allocate the R0 to R1 to some of the resource elements, and the RRH 103 may allocate the R0 to R1 to none of the resource elements. In this case, the terminal 102 can calculate the received power of the macro base station 101 from the cell-specific reference signals. In particular, in a case where a cell ID is notified only by the base station 101, the configuration described above is made feasible. In another example, in a case where the base station 101 and the RRH 103 allocate the R0 to R1 to the same resource element and the same sequence is transmitted from the base station 101 and the RRH 103, the terminal 102 can calculate combined received power using the cell-specific reference signals. In particular, in a case where the same cell ID is notified by the base station 101 and the RRH 103, the configuration described above is made feasible.

In the description of embodiments of the present invention, for example, the setting of power includes the setting of a power value, the calculation of power includes the calculation of a power value, and the computation of power includes the computation of a power value. In addition, the measurement of power includes the measurement of a power value, and the reporting of power includes the reporting of a power value. In this manner, the term "power" includes the meaning of a power value, as necessary.

Among the resource elements shown shaded, D1 to D2 represent UE-specific reference signals (DL DMRS, UE-RS) in CDM (Code Division Multiplexing) group 1 to CDM group 2. The UE-specific reference signals in CDM group 1 and CDM group 2 are individually subjected to CDM using orthogonal codes such as Walsh codes. In addition, the UE-specific reference signals in CDM group 1 and CDM group 2 are mutually subjected to FDM (Frequency Division Multiplexing). Here, the base station 101 can map UE-specific reference signals for up to rank 8 using eight antenna ports (antenna ports 7 to 14), in accordance with the control signals and data signals to be mapped to the resource block pair. The base station 101 may change the spreading code length for CDM and the number of resource elements to which a UE-specific reference signal is mapped, in accordance with the ranks for which the UE-specific reference signals are mapped.

For example, the UE-specific reference signals for ranks 1 to 2 are formed using spreading codes with a length of 2 chips for antenna ports 7 to 8, and are mapped to CDM group 1. The UE-specific reference signals for ranks 3 to 4 are formed using spreading codes with a length of 2 chips for antenna ports 9 to 10 in addition to antenna ports 7 to 8, and are mapped to CDM group 2. The UE-specific reference signals for ranks 5 to 8 are formed using spreading codes with a length of 4 chips for antenna ports 7 to 14, and are mapped to CDM group 1 and CDM group 2.

In the UE-specific reference signals, a scrambling code is further superimposed on an orthogonal code for each antenna port. The scrambling code is generated based on a cell ID and a scrambling ID, which are notified by the base station 101. The scrambling code is generated based on, for example, a pseudo-noise sequence generated based on a cell ID and a scrambling ID, which are notified by the base station 101. For example, the scrambling ID has the value 0 or 1. Furthermore, a scrambling ID and information indicating the antenna port to be used may be jointly coded, and information indicating them may be indexed.

Among the resource elements shown shaded in FIG. 2, the area composed of the first three OFDM symbols is configured as an area in which a first control channel (PDCCH; Physical Downlink Control Channel) is arranged. The base station 101 may set, for each subframe, the number of OFDM symbols in an area in which the first control channel is arranged. The area including the resource elements in a solid white color represents an area in which a second control channel (X-PDCCH) or a shared channel (PDSCH; Physical Downlink Shared Channel) (physical data channel) is arranged. The base station 101 may set, for each resource block pair, an area in which the second control channel or the shared channel is arranged. The ranks for the control signals to be mapped to the second control channel or the data signals to be mapped to the shared channel may be set to be different from the ranks for the control signals to be mapped to the first control channel.

Here, the number of resource blocks may be changed in accordance with the frequency bandwidth (system bandwidth) that the communication system uses. For example, the base station 101 can use 6 to 110 resource blocks in the system band, the unit of which is also called a component carrier (CC; Component Carrier, Carrier Component). The base station 101 can also configure a plurality of component carriers for the terminal 102 through frequency aggregation (carrier aggregation). For example, the base station 101 can configure five component carriers contiguous and/or non-contiguous in the frequency domain for the terminal 102, each component carrier having a bandwidth of 20 MHz, thereby totaling a bandwidth of 100 MHz, which can be supported by the communication system.

Here, the control information is subjected to processing such as modulation processing and error correction coding processing using a certain modulation scheme and coding scheme to generate a control signal. The control signal is transmitted and received on the first control channel (first physical control channel) or the second control channel (second physical control channel) different from the first control channel. The term physical control channel, as used herein, is a type of physical channel and refers to a control channel defined in a physical frame.

In one aspect, the first control channel is a physical control channel that uses the same transmit port (antenna port) as that used for the cell-specific reference signal. The second control channel is a physical control channel that uses the same transmit port as that used for the UE-specific reference signal. The terminal 102 demodulates a control signal to be mapped to the first control channel using the cell-specific reference signal, and demodulates a control signal to be mapped to the second control channel using the UE-specific reference signal. The cell-specific reference signal is a reference signal common to all the terminals 102 within a cell, and is a reference signal available to any of the terminals 102 since it is included in all the resource blocks in the system band. Accordingly, the first control channel can be demodulated by any terminal 102. In contrast, the UE-specific reference signal is a reference signal included in only allocated resource blocks, and can be adaptively subjected to beamforming processing in the same manner as that for the data signal. Accordingly, adaptive beamforming gain can be obtained on the second control channel.

In a different aspect, the first control channel is a physical control channel over OFDM symbols located in a front part of a physical subframe, and may be arranged in the entire system bandwidth (component carrier (CC)) over these OFDM symbols. The second control channel is a physical control channel over OFDM symbols located after the first control channel in the physical subframe, and may be arranged in part of the system bandwidth over these OFDM symbols. Since the first control channel is arranged on OFDM symbols dedicated to a control channel located in a front part of a physical subframe, the first control channel can be received and demodulated before OFDM symbols located in a rear part of the physical subframe, which are used for a physical data channel. The first control channel can also be received by a terminal 102 that monitors only OFDM symbols dedicated to a control channel. In addition, since the resources used for the first control channel can be scattered and arranged in the entire CC, inter-cell interference for the first control channel can be randomized. In contrast, the second control channel is arranged on OFDM symbols in a rear part, which are used for a shared channel (physical data channel) that a terminal 102 under communication normally receives. The base station 101 can perform frequency division multiplexing on the second control channel to orthogonally multiplex (multiplex without interference) second control channels or the second control channel and the physical data channel.

In a different aspect, furthermore, the first control channel is a common physical control channel, and is a physical channel that both a terminal 102 in the idle state and a terminal 102 in the connected state can acquire. The second control channel is a dedicated physical control channel, and is a physical channel that only a terminal 102 in the connected state can acquire. The term idle state, as used herein, refers to a state (RRC_IDLE state) where data is not immediately transmitted or received, such as a state where no RRC (Radio Resource Control) information is accumulated in the base station 101. The term connected state, in contrast, refers to a state where data can be immediately transmitted or received, such as a state (RRC_CONNECTED state) where network information is held in the terminal 102. The first control channel is a channel that the terminal 102 can receive without depending on dedicated RRC signaling. The second control channel is a channel configured with dedicated RRC signaling, and is a channel that the terminal 102 can receive through dedicated RRC signaling. That is, the first control channel is a channel that any terminal can receive using a pre-limited configuration, and the second control channel is a channel with easily modified dedicated configuration.

Figure 3:
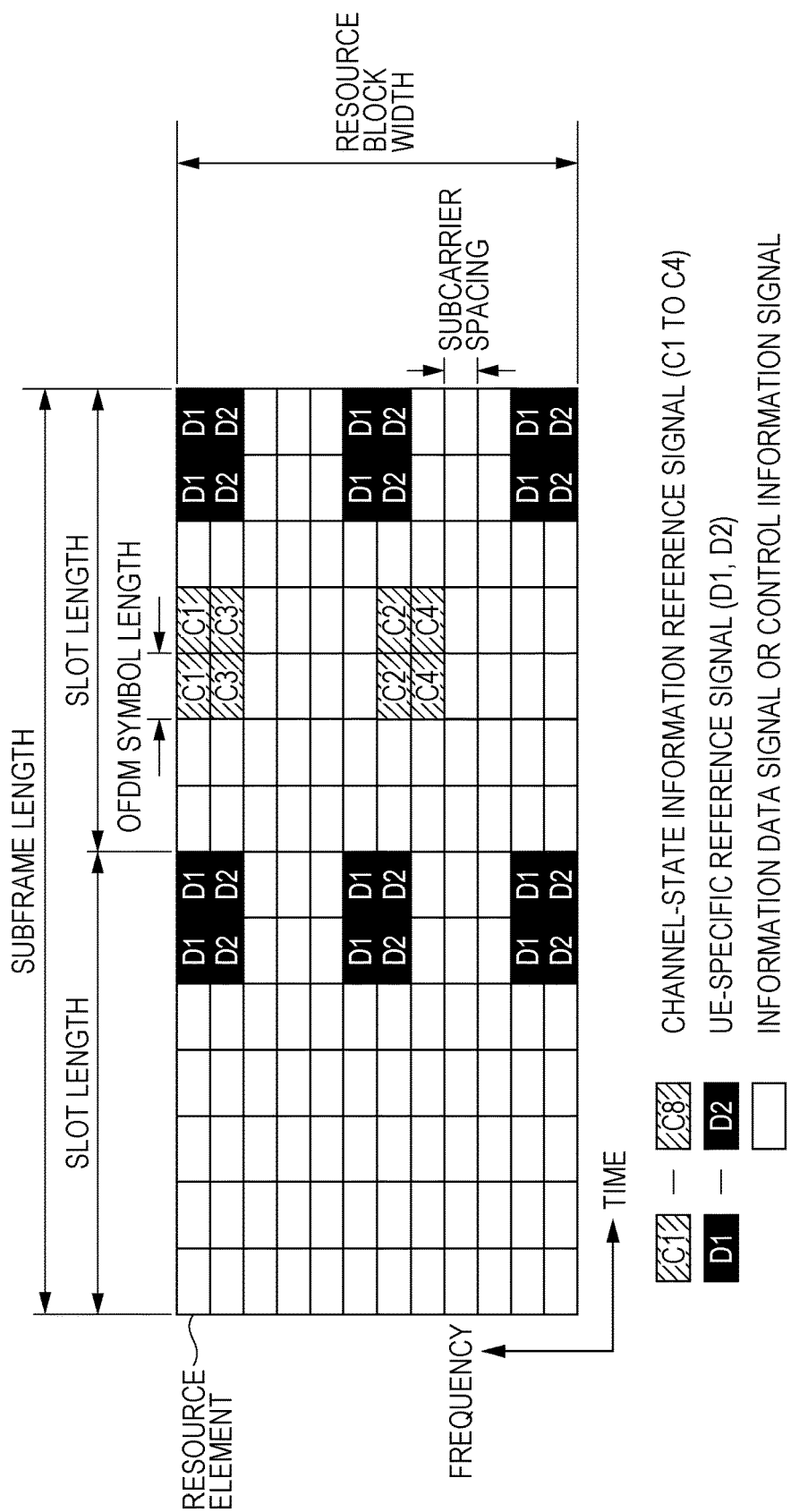
FIG. 3 is a diagram illustrating another example of one resource block pair used for mapping at the base station 101.

FIG. 3 is a diagram illustrating a resource block pair to which channel-state information reference signals (CSI-RS) for eight antenna ports have been mapped. FIG. 3 depicts the mapping of channel-state information reference signals when the number of antenna ports (the number of CSI ports) of a base station is 8. FIG. 3 also depicts two resource blocks within one subframe.

Among the resource elements in a solid color or shaded with oblique lines in FIG. 3, the UE-specific reference signals of CDM group numbers 1 to 2 (reference signals for data signal demodulation) are represented by D1 to D2, respectively, and the channel-state information reference signals of CDM group numbers 1 to 4 are represented by C1 to C4, respectively. In addition, data signals or control signals are mapped to resource elements other than the resource elements to which these reference signals have been mapped.

In the respective CDM groups, the channel-state information reference signals are implemented using 2-chip orthogonal codes (Walsh codes), and each orthogonal code is allocated a CSI port (channel-state information reference signal port (antenna port, resource grid)). Code division multiplexing (CDM) is performed every two CSI ports. In addition, the respective CDM groups are frequency-division multiplexed. The 8-antenna-port channel-state information reference signals for CSI ports 1 to 8 (antenna ports 15 to 22) are mapped using four CDM groups. For example, in the CDM group C1 of the channel-state information reference signals, the channel-state information reference signals for CSI ports 1 and 2 (antenna ports 15 and 16) are subjected to CDM, and are mapped. In the CDM group C2 of the channel-state information reference signals, the channel-state information reference signals for CSI ports 3 and 4 (antenna ports 17 and 18) are subjected to CDM, and are mapped. In the CDM group C3 of the channel-state information reference signals, the channel-state information reference signals for CSI ports 5 and 6 (antenna ports 19 and 20) are subjected to CDM, and are mapped. In the CDM group C4 of the channel-state information reference signals, the channel-state information reference signals for CSI ports 7 and 8 (antenna ports 21 and 22) are subjected to CDM, and are mapped.

If the number of antenna ports of the base station 101 is 8, the base station 101 can configure up to eight layers (ranks, spatial multiplexing layers, DMRS ports) of data signals or control signals, and can configure, for example, two data signal layers and one control signal layer. In the respective CDM groups, the UE-specific reference signals (DL DMRS, UE-RS) are implemented using 2-chip or 4-chip orthogonal codes in accordance with the number of layers, and are subjected to CDM every 2 layers or 4 layers. In addition, each CDM group of the UE-specific reference signals is frequency-division multiplexed. The 8-layer UE-specific reference signals for DMRS ports 1 to 8 (antenna ports 7 to 14) are mapped using two CDM groups.

The base station 101 can transmit the channel-state information reference signal in a case where the number of antenna ports is 1, 2, or 4. The base station 101 can transmit the channel-state information reference signal for one antenna port or two antenna ports using the CDM group C1 of the channel-state information reference signals illustrated in FIG. 3. The base station 101 can transmit the channel-state information reference signal for four antenna ports using the CDM groups C1 and C2 of the channel-state information reference signals illustrated in FIG. 3.

The base station 101 and the RRH 103 may allocate a different resource element to each of the C1 to C4, or may allocate the same resource element to each of the C1 to C4. For example, in a case where the base station 101 and the RRH 103 allocate a different resource element and/or different signal sequence to each of the C1 to C4, the terminal 102 can individually calculate the respective received powers (received signal powers) and the respective channel states of the base station 101 and the RRH 103 using the channel-state information reference signals. In another example, in a case where the base station 101 and the RRH 103 allocate the same resource element to each of the C1 to C4 and the same sequence is transmitted from the base station 101 and the RRH 103, the terminal 102 can calculate combined received power using the channel-state information reference signals.

Figure 4:
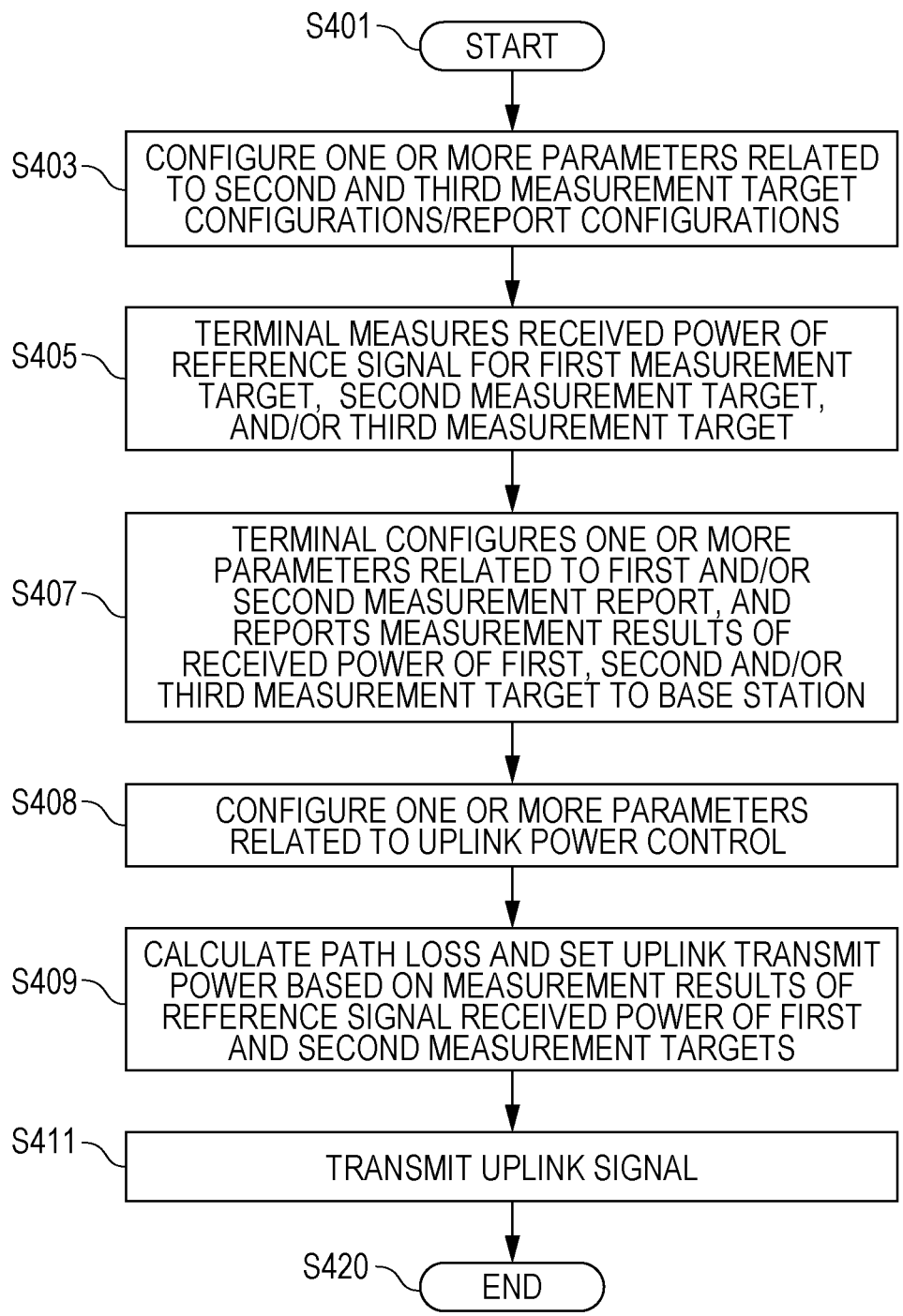
FIG. 4 is a flowchart illustrating the details of an uplink signal transmission process of a terminal according to the first embodiment of the present invention.

A flowchart in FIG. 4 illustrates how the terminal 102 measures reference signals (cell-specific reference signal, channel-state information reference signal), reports a received power to the base station 101, computes a path loss on the basis of the measurement results, computes the uplink transmit power on the basis of the computed path loss, and transmits an uplink signal at the computed uplink transmit power. In step S403, the base station 101 performs parameter configuration for the terminal 102 concerning measurement and reporting of the reference signals. Parameters related to a second measurement target configuration, a second report configuration, a third measurement target configuration, and a third report configuration can be configured in step S403. Although not illustrated here, a first measurement target configuration is pre-configured in the terminal 102. The measurement target of the first measurement target configuration (first measurement target) may be the cell-specific reference signal for antenna port 0 or the cell-specific reference signals for antenna ports 0 and 1. That is, there is a possibility that the first measurement target configuration may target a pre-designated specific reference signal and antenna port.

In contrast, the second measurement target configuration configured by the base station 101 targets the channel-state information reference signal, and a resource (antenna port) that is a measurement target of the second measurement target configuration may be configurable. The second measurement target may include one resource or a plurality of resources. The details of these parameters will be described below. The third measurement target configuration configured by the base station 101 may include a configuration for measuring a reference signal transmitted from an unconnected cell, as described below. For example, a reference signal that is a measurement target of the third measurement target configuration (third measurement target) may be the cell-specific reference signal for antenna port 0 or the cell-specific reference signals for antenna ports 0 and 1. That is, there is a possibility that the third measurement target configuration may target a pre-designated specific reference signal and specific antenna port in an unconnected cell. The term unconnected cell, as used herein, can mean a cell with no parameters configured via RRC. In another aspect, a cell-specific reference signal transmitted from an unconnected cell may be generated using a physical ID (physical cell ID, physical layer cell ID) different from that of a cell-specific reference signal transmitted from the connected cell.

Figure 15:
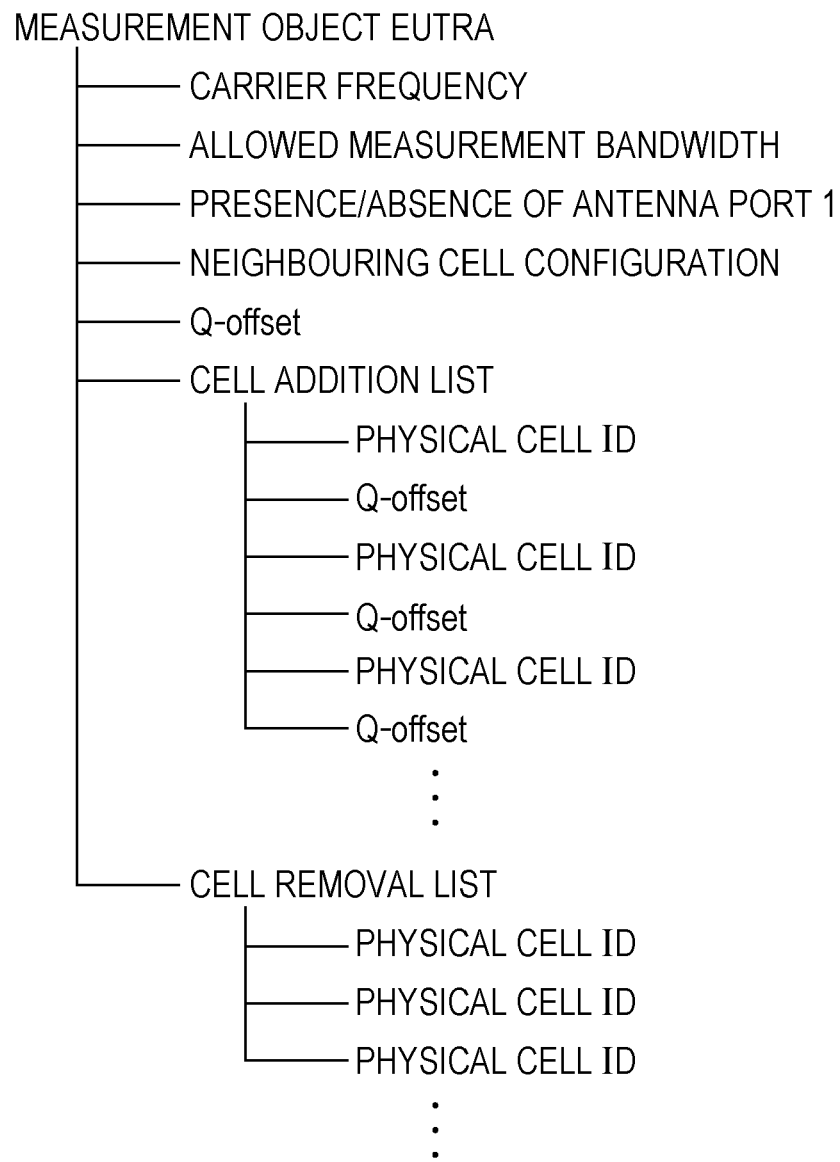
FIG. 15 is a diagram illustrating the details of the measurement object EUTRA.

Here, the base station 101 notifies the terminal 102 of a physical ID (physical cell ID), a carrier frequency (center frequency), and so forth using the third measurement target configuration, allowing the terminal 102 to measure the received signal power of a cell-specific reference signal transmitted from an unconnected cell (a cell with no RRC parameters configured) (see FIG. 15). Each of the second report configuration and the third report configuration includes a configuration related to the timing at which the terminal 102 transmits measurement results in a measurement report, such as an event used as a trigger.

Subsequent description will be made of step S405. In step S405, in a case where the first measurement target configuration described above has been performed, the terminal 102 measures the reference signal received power of the first measurement target configured in the first measurement target configuration. In a case where the second measurement target configuration described above has been performed, the terminal 102 measures the reference signal received power of the second measurement target configured in the second measurement target configuration. In a case where the third measurement target configuration has been performed, the terminal 102 measures the reference signal received power of the third measurement target configured in the third measurement target configuration. Subsequent description will be made of step S407. Parameters related to a first measurement report and/or a second measurement report can be configured in step S407. The first measurement report may relate to the received signal power of the measurement target configured in the first measurement target configuration and/or the third measurement target configuration described above. In contrast, the second measurement report may relate to the received signal power of the measurement target configured in the second measurement target configuration described above.

In addition, the second measurement report described above is associated with some of one or more measurement results of the reference signal received power (RSRP) of the second measurement target configured in the second measurement target configuration. There is a possibility that the second measurement report described above may configure which resource in the second measurement target is to be reported in the measurement result. Which resource is to be reported in the measurement result may be notified by indexes relating to CSI ports 1 to 8 (antenna ports 15 to 22), or may be notified by indexes relating to frequency-time resources. Accordingly, in step S407, in a case where the first measurement report described above has been configured, the measurement result of the reference signal received power of the first measurement target and/or the third measurement target configured in the first measurement target configuration and/or the third measurement target configuration is reported. In a case where the second measurement report described above has been configured, at least one of one or more measurement results of the reference signal received power of the second measurement target configured in the second measurement target configuration is reported. As described above, there is a possibility that the second measurement report may configure of which resource in the second measurement target the measurement result is to be reported.

Subsequent description will be made of step S408. In step S408, parameters related to uplink power control (UplinkPowerControl, TPC Commands, etc.) can be configured. The parameters may include a parameter configuration indicating which of the first path loss based on the received signal power measured and reported using the first measurement target configuration and first measurement report described above and the second path loss based on the received signal power measured and reported using the second measurement target configuration and second measurement report described above is to be used as a path loss to be used for the computation of the uplink transmit power. The details of these parameters will be described below.

Subsequent description will be made of step S409. In step S409, the uplink transmit power is computed. The computation of the uplink transmit power is performed using a downlink path loss between the base station 101 (or the RRH 103) and the terminal 102. The downlink path loss is calculated from the received signal power of the cell-specific reference signal, that is, the measurement results of the first measurement target, or the received signal power of the channel-state information reference signals, that is, the measurement results of the second measurement target, which is measured in step S405. Since the reference signal transmit power is also used for the calculation of a path loss, the second measurement target configuration described above may include information concerning the reference signal transmit power. Accordingly, the terminal 102 holds the first path loss determined on the basis of the reference signal received power of the first measurement target configured in the first measurement target configuration and the second path loss determined on the basis of the reference signal received power of the second measurement target configured in the second measurement target configuration. The terminal 102 computes the uplink transmit power using one of the first path loss and second path loss in accordance with the uplink power control related parameter configuration configured in step S403. Subsequent description will be made of step S411. In step S411, an uplink signal is transmitted at the transmit power value determined in step S409.

Figure 5:
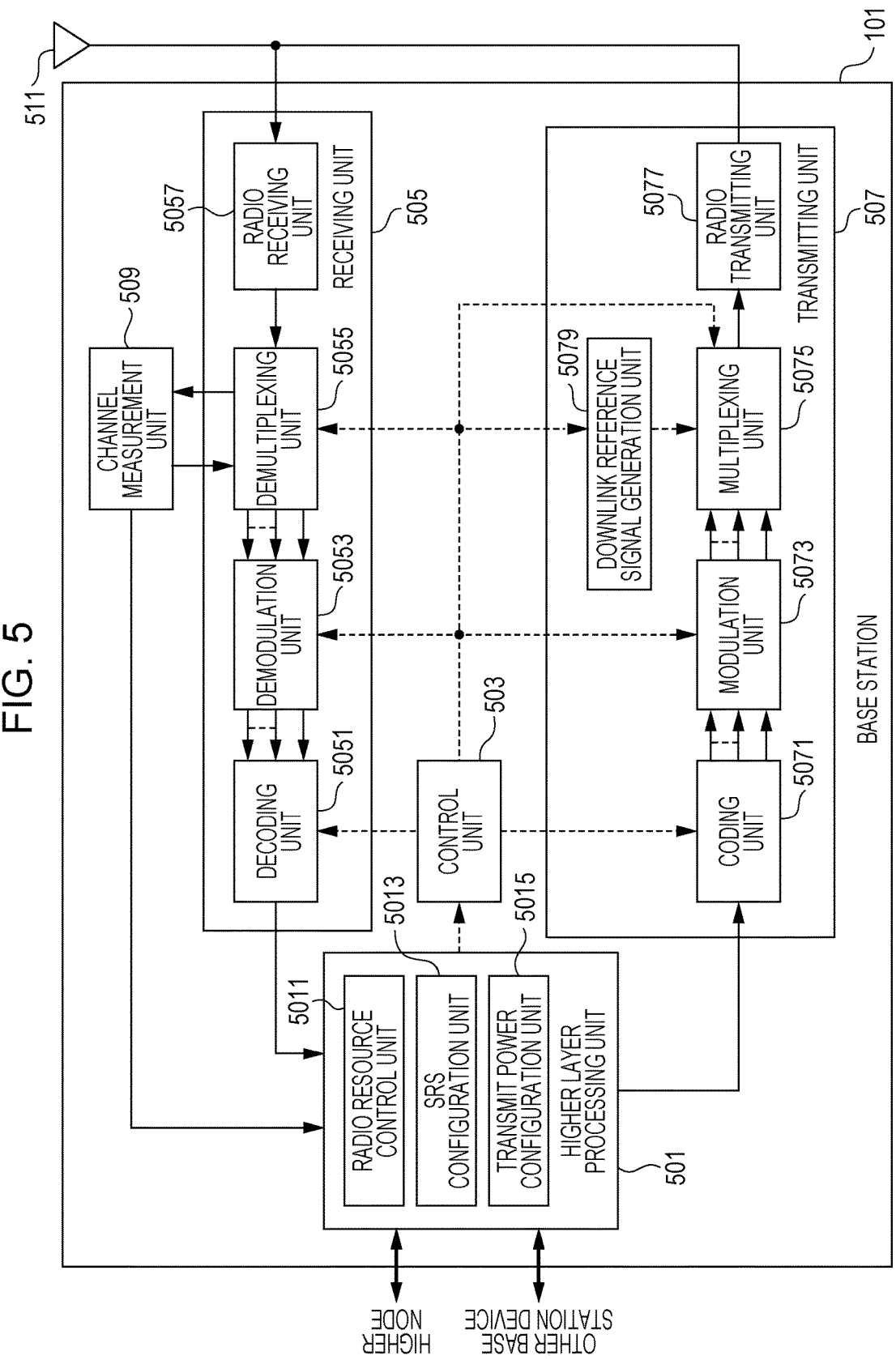
FIG. 5 is a schematic block diagram illustrating a configuration of the base station 101 according to the first embodiment of the present invention.

FIG. 5 is a schematic block diagram illustrating a configuration of the base station 101 of the present invention. As illustrated in FIG. 5, the base station 101 includes a higher layer processing unit 501, a control unit 503, a receiving unit 505, a transmitting unit 507, a channel measurement unit 509, and a transmit/receive antenna 511. The higher layer processing unit 501 includes a radio resource control unit 5011, an SRS configuration unit 5013, and a transmit power configuration unit 5015. The receiving unit 505 includes a decoding unit 5051, a demodulation unit 5053, a demultiplexing unit 5055, and a radio receiving unit 5057. The transmitting unit 507 includes a coding unit 5071, a modulation unit 5073, a multiplexing unit 5075, a radio transmitting unit 5077, and a downlink reference signal generation unit 5079. The base station 101 may comprise each of above units by at least one.

The higher layer processing unit 501 performs processing of the packet data convergence protocol (PDCP) layer, the radio link control (RLC) layer, and the radio resource control (RRC) layer.

The radio resource control unit 5011 included in the higher layer processing unit 501 generates information to be mapped to each channel in the downlink or acquires it from the higher node, and outputs it to the transmitting unit 507. The radio resource control unit 5011 further allocates a radio resource on which the terminal 102 is to arrange a physical uplink shared channel (PUSCH), which is data information in the uplink, from among the uplink radio resources. The radio resource control unit 5011 also determines a radio resource on which a physical downlink shared channel (PDSCH), which is data information in the downlink, is to be arranged from among the downlink radio resources. The radio resource control unit 5011 generates downlink control information indicating the allocation of the radio resources, and transmits the downlink control information to the terminal 102 through the transmitting unit 507. When allocating a radio resource on which a PUSCH is to be arranged, the radio resource control unit 5011 preferentially allocates a radio resource with high channel quality on the basis of the uplink channel measurement results input from the channel measurement unit 509. The format of the downlink control information is formed in accordance with use. The downlink control information format used for PUSCH scheduling or transmit power control may be called an uplink grant. The downlink control information format used for PDSCH scheduling or PUCCH transmit power control may be called a downlink grant (downlink assignment). These downlink control information formats are transmitted from a base station 101 to a terminal 102 on the physical downlink control channel.

The higher layer processing unit 501 generates control information to control the receiving unit 505 and the transmitting unit 507 on the basis of uplink control information (ACK/NACK, channel quality information, scheduling request) notified by the terminal 102 on the physical uplink control channel (PUCCH) and the buffer state notified by the terminal 102 or various types of configuration information on each terminal 102 which are configured by the radio resource control unit 5011, and outputs the control information to the control unit 503.

The SRS configuration unit 5013 configures a sounding subframe, which is a subframe for reserving a radio resource in which the terminal 102 transmits a sounding reference signal SRS, and the bandwidth of the radio resource reserved for the transmission of the SRS in the sounding subframe, generates information concerning the configuration as system information, and broadcasts and transmits the system information on the PDSCH through the transmitting unit 507. The SRS configuration unit 5013 also configures the subframe and frequency band in which a periodic SRS is periodically transmitted to each terminal 102, and the value of cyclic shift used for CAZAC sequences of the periodic SRS, generates a signal including information concerning the configuration as a radio resource control signal (RRC signal), and notifies each terminal 102 of the radio resource control signal on the PDSCH through the transmitting unit 507.

The SRS configuration unit 5013 also configures the frequency band in which an aperiodic SRS is transmitted to each terminal 102, and the value of cyclic shift used for CAZAC sequences of the aperiodic SRS, generates a signal including information concerning the configuration as a radio resource control signal, and notifies each terminal 102 of the radio resource control signal on the PDSCH through the transmitting unit 507. In addition, in order to request the terminal 102 to transmit the aperiodic SRS, the SRS configuration unit 5013 generates an SRS request indicating that the terminal 102 is requested to transmit the aperiodic SRS, and notifies the terminal 102 of the SRS request on the PDCCH through the transmitting unit 507.

The transmit power configuration unit 5015 configures the transmit powers of the PUCCH, PUSCH, periodic SRS, and aperiodic SRS. Specifically, the transmit power configuration unit 5015 configures the transmit power of the terminal 102 in accordance with information indicating the amount of interference from a neighboring base station, information indicating the amount of interference to a neighboring base station 101, which has been notified by the neighboring base station, the channel quality input from the channel measurement unit 509, and so forth so that the PUSCH and the like can satisfy a certain level of channel quality, while taking the interference to a neighboring base station into account. The transmit power configuration unit 5015 transmits information indicating the configuration to the terminal 102 through the transmitting unit 507.

More specifically, the transmit power configuration unit 5015 configures P0_PUSCH given in formula (1), which will be described below, α, PSRS_OFFSET(0) for the periodic SRS (first parameter (pSRS-Offset)), and PSRS_OFFSET(1) for the aperiodic SRS (second parameter (pSRS-OffsetAp-r10)), generates a signal including information indicating the configuration as a radio resource control signal, and notifies each terminal 102 of the radio resource control signal on the PDSCH through the transmitting unit 507. The transmit power configuration unit 5015 also configures a TPC command for calculating f in formulas (1) and (4), generates a signal indicating the TPC command, and notifies each terminal 102 of the generated signal on the PDCCH through the transmitting unit 507. Here, α denotes a coefficient used for the calculation of the transmit power in formulas (1) and (4) together with the path loss value and representing the degree to which the path loss is compensated for, or, in other words, a coefficient to determine the degree to which power is to be increased or decreased in accordance with the path loss. The coefficient α generally takes a value from 0 to 1. If the coefficient α is 0, power compensation is not performed in accordance with the path loss. If the coefficient α is 1, the transmit power of the terminal 102 is increased or decreased so as to reduce the effect of the path loss on the base station 101.

The control unit 503 generates a control signal to control the receiving unit 505 and the transmitting unit 507 on the basis of the control information from the higher layer processing unit 501. The control unit 503 outputs the generated control signal to the receiving unit 505 and the transmitting unit 507 to control the receiving unit 505 and the transmitting unit 507.

The receiving unit 505 demultiplexer, demodulates, and decodes a received signal received from the terminal 102 through the transmit/receive antenna 511 in accordance with the control signal input from the control unit 503, and outputs the decoded information to the higher layer processing unit 501. The radio receiving unit 5057 converts (down-converts) an uplink signal received through the transmit/receive antenna 511 into an intermediate-frequency (IF) signal, removes the unnecessary frequency component, controls the amplification level so that the signal level can be appropriately maintained, performs orthogonal demodulation based on the in-phase component and quadrature component of the received signal, and converts an analog signal obtained by orthogonal demodulation into a digital signal. The radio receiving unit 5057 removes the portion corresponding to the guard interval (GI) from the digital signal obtained by conversion. The radio receiving unit 5057 performs a fast Fourier transform (FFT) on the signal from which the guard interval has been removed to extract the signal of the frequency domain, and outputs the extracted signal to the demultiplexing unit 5055.

The demultiplexing unit 5055 demultiplexer the signal input from the radio receiving unit 5057 into signals such as PUCCH, PUSCH, UL DMRS, and SRS. This demultiplexing operation is based on radio resource allocation information that has been determined in advance by the base station 101 and that each terminal 102 has been notified of by the base station 101. The demultiplexing unit 5055 further performs channel compensation of the PUCCH and PUSCH from estimated channel values input from the channel measurement unit 509. The demultiplexing unit 5055 outputs the UL DMRS and SRS obtained by demultiplexing to the channel measurement unit 509.

The demodulation unit 5053 performs an inverse discrete Fourier transform (IDFT) on the PUSCH to acquire modulation symbols, and performs demodulation on the received signal to demodulate each of the modulation symbols of the PUCCH and PUSCH using a predetermined modulation scheme such as binary phase shift keying (BPSK), quadrature phase shift keying (QPSK), 16 quadrature amplitude modulation (16QAM), or 64 quadrature amplitude modulation (64QAM) or using a modulation scheme that the base station 101 has notified each terminal 102 of in advance using downlink control information.

The decoding unit 5051 decodes the demodulated PUCCH and PUSCH code bits with a predetermined coding rate of a predetermined coding scheme or with a coding rate that the base station 101 has notified the terminal 102 of in advance using an uplink grant (UL grant), and outputs decoded data information and uplink control information to the higher layer processing unit 501.

The channel measurement unit 509 measures estimated channel values, channel quality, and so forth from the demodulated uplink reference signals UL DMRS and SRS input from the demultiplexing unit 5055, and outputs the results to the demultiplexing unit 5055 and the higher layer processing unit 501.

The transmitting unit 507 generates a reference signal for the downlink (a downlink reference signal) in accordance with the control signal input from the control unit 503, codes and modulates the data information and downlink control information input from the higher layer processing unit 501, multiplexes the PDCCH, the PDSCH, and the downlink reference signal, and transmits the signals to the terminal 102 through the transmit/receive antenna 511.

The coding unit 5071 codes the downlink control information and data information input from the higher layer processing unit 501 using codes such as turbo codes, convolutional codes, or block codes. The modulation unit 5073 modulates the coded bits using a modulation scheme such as QPSK, 16QAM, or 64QAM. The downlink reference signal generation unit 5079 generates a sequence known by the terminal 102, which is determined in accordance with a predetermined rule on the basis of a cell identifier (Cell ID) or the like for identifying the base station 101, as a downlink reference signal. The multiplexing unit 5075 multiplexes the respective modulated channels and the generated downlink reference signal.

The radio transmitting unit 5077 performs an inverse fast Fourier transform (IFFT) on the multiplexed modulation symbols to perform OFDM modulation, and adds a guard interval to the OFDM modulated OFDM symbols to generate a baseband digital signal. Then, the radio transmitting unit 5077 converts the baseband digital signal into an analog signal, generates the intermediate-frequency in-phase component and quadrature component from the analog signal, removes the extra frequency component for the intermediate frequency band, converts (up-converts) the intermediate-frequency signal into a high-frequency signal, removes the extra frequency component, amplifies the power, and outputs the resulting signal to the transmit/receive antenna 511 for transmission. Although not illustrated here, the RRH 103 is also considered to have a similar configuration to the base station 101.

Figure 6:
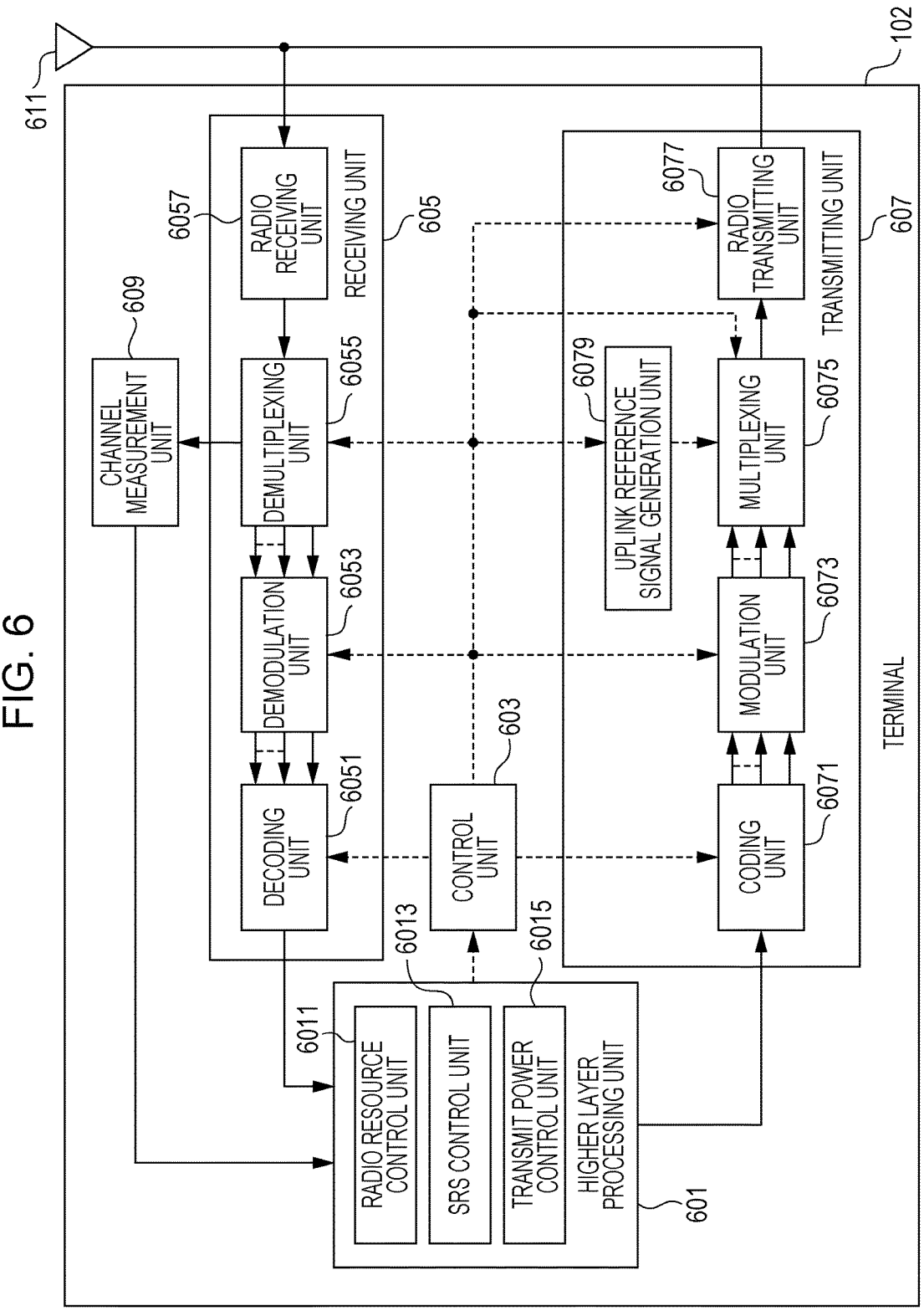
FIG. 6 is a schematic block diagram illustrating a configuration of a terminal 102 according to the first embodiment of the present invention.

FIG. 6 is a schematic block diagram illustrating a configuration of the terminal 102 according to this embodiment. As illustrated in FIG. 6, the terminal 102 includes a higher layer processing unit 601, a control unit 603, a receiving unit 605, a transmitting unit 607, a channel measurement unit 609, and a transmit/receive antenna 611. The higher layer processing unit 601 includes a radio resource control unit 6011, an SRS control unit 6013, and a transmit power control unit 6015. The receiving unit 605 includes a decoding unit 6051, a demodulation unit 6053, a demultiplexing unit 6055, and a radio receiving unit 6057. The transmitting unit 607 includes a coding unit 6071, a modulation unit 6073, a multiplexing unit 6075, a radio transmitting unit 6077, and an uplink reference signal generation unit 6079. The terminal 102 may comprise each of above units by at least one.

The higher layer processing unit 601 outputs uplink data information generated by user operation or the like to the transmitting unit. The higher layer processing unit 601 further performs processing of the packet data convergence protocol layer (i.e., PDCP layer), the radio link control layer (i.e., RLC layer), and the radio resource control layer (i.e., RRC layer).

The radio resource control unit 6011 included in the higher layer processing unit 601 manages various types of configuration information on the terminal 102. The radio resource control unit 6011 further generates information to be mapped to each channel in the uplink, and outputs the generated information to the transmitting unit 607. The radio resource control unit 6011 generates control information to control the receiving unit 605 and the transmitting unit 607 on the basis of the downlink control information notified by the base station 101 on the PDCCH and the various types of configuration information on the terminal 102, which is managed by the radio resource control unit 6011 and is configured using the radio resource control information notified on the PDSCH, and outputs the control information to the control unit 603.

The SRS control unit 6013 included in the higher layer processing unit 601 acquires, from the receiving unit 605, the information indicating a sounding subframe (SRS subframe, SRS transmission subframe), which is a subframe for reserving a radio resource in which the SRS broadcasted by the base station 101 is transmitted, and the bandwidth of the radio resource reserved for the transmission of SRS in the sounding subframe, information indicating the subframe and frequency band in which the periodic SRS that the terminal 102 has been notified of by the base station 101 is transmitted, and the value of cyclic shift used for CAZAC sequences of the periodic SRS, and information indicating the frequency band in which the aperiodic SRS that the terminal 102 has been notified of by the base station 101 is transmitted and the value of cyclic shift used for CAZAC sequences of the aperiodic SRS.

The SRS control unit 6013 controls SRS transmission in accordance with the pieces of information described above. Specifically, the SRS control unit 6013 controls the transmitting unit 607 to transmit the periodic SRS once or periodically in accordance with the information concerning the periodic SRS. In addition, in response to a request to transmit the aperiodic SRS in an SRS request (SRS indicator) input from the receiving unit 605, the SRS control unit 6013 transmits the aperiodic SRS a predetermined number of times (for example, once) in accordance with the information concerning the aperiodic SRS.

The transmit power control unit 6015 included in the higher layer processing unit 601 outputs control information to the control unit 603 to perform transmit power control on the basis of information indicating the configuration of the transmit powers of the PUCCH, PUSCH, periodic SRS, and aperiodic SRS. Specifically, the transmit power control unit

6015 individually controls the transmit power of the periodic SRS and the transmit power of the aperiodic SRS from formula (4) on the basis of P0_PUSCH, α, PSRS_OFFSET (0) for the periodic SRS (first parameter (pSRS-Offset)), PSRS_OFFSET(1) for the aperiodic SRS (second parameter (pSRS-OffsetAp-r10)), and TPC commands, which are acquired from the receiving unit 605. The transmit power control unit 6015 switches parameters for PSRS_OFFSET in accordance with the periodic SRS or the aperiodic SRS.

The control unit 603 generates a control signal to control the receiving unit 605 and the transmitting unit 607 on the basis of the control information from the higher layer processing unit 601. The control unit 603 outputs the generated control signal to the receiving unit 605 and the transmitting unit 607 to control the receiving unit 605 and the transmitting unit 607.

The receiving unit 605 demultiplexes, demodulates, and decodes a received signal received from the base station 101 through the transmit/receive antenna 611 in accordance with the control signal input from the control unit 603, and outputs the decoded information to the higher layer processing unit 601.

The radio receiving unit 6057 converts (down-converts) a downlink signal received through each receive antenna into an intermediate-frequency signal, removes the unnecessary frequency component, controls the amplification level so that the signal level can be appropriately maintained, performs orthogonal demodulation based on the in-phase component and quadrature component of the received signal, and converts an analog signal obtained by orthogonal demodulation into a digital signal. The radio receiving unit 6057 removes the portion corresponding to the guard interval from the digital signal obtained by conversion, and performs a fast Fourier transform on the signal from which the guard interval has been removed to extract the signal of the frequency domain.

The demultiplexing unit 6055 demultiplexer the extracted signal into a physical downlink control channel (PDCCH), a PDSCH, and a downlink reference signal DRS. This demultiplexing operation is based on radio resource allocation information or the like notified using the downlink control information. The demultiplexing unit 6055 further performs channel compensation of the PDCCH and PDSCH from estimated channel values input from the channel measurement unit 609. The demultiplexing unit 6055 outputs the downlink reference signal obtained by demultiplexing to the channel measurement unit 609.

The demodulation unit 6053 demodulates the PDCCH using a QPSK modulation scheme, and outputs the demodulated PDCCH to the decoding unit 6051. The decoding unit 6051 attempts to decode the PDCCH, and outputs the decoded downlink control information to the higher layer processing unit 601 if decoding is successful. The demodulation unit 6053 demodulates the PDSCH using a modulation scheme notified using the downlink control information, such as QPSK, 16QAM, or 64QAM, and outputs the demodulated PDSCH to the decoding unit 6051. The decoding unit 6051 performs decoding with a coding rate notified using the downlink control information, and outputs the decoded data information to the higher layer processing unit 601.

The channel measurement unit 609 measures a downlink path loss from the downlink reference signal input from the demultiplexing unit 6055, and outputs the measured path loss to the higher layer processing unit 601. The channel measurement unit 609 further calculates estimated channel values for the downlink from the downlink reference signal, and outputs the resulting values to the demultiplexing unit 6055.

The transmitting unit 607 generates an UL DMRS and/or an SRS in accordance with the control signal input from the control unit 603, codes and modulates the data information input from the higher layer processing unit 601, multiplexes the PUCCH, the PUSCH, and the generated UL DMRS and/or SRS, adjusts the transmit powers of the PUCCH, PUSCH, UL DMRS, and SRS, and transmits the results to the base station 101 through the transmit/receive antenna 611.

The coding unit 6071 codes the uplink control information and data information input from the higher layer processing unit 601 using codes such as turbo codes, convolutional codes, or block codes. The modulation unit 6073 modulates the coded bits input from the coding unit 6071 using a modulation scheme such as BPSK, QPSK, 16QAM, or 64QAM.

The uplink reference signal generation unit 6079 generates a CAZAC sequence known by the base station 101, which is determined in accordance with a predetermined rule on the basis of a cell identifier for identifying the base station 101, the bandwidth within which the UL DMRS and SRS are arranged, and so forth. The uplink reference signal generation unit 6079 further applies a cyclic shift to the generated CAZAC sequences of the UL DMRS and SRS in accordance with the control signal input from the control unit 603.

The multiplexing unit 6075 rearranges the modulation symbols of the PUSCH into parallel streams in accordance with the control signal input from the control unit 603, and then performs a discrete Fourier transform (DFT) to multiplex the PUCCH and PUSCH signals with the generated UL DMRS and SRS.

The radio transmitting unit 6077 performs an inverse fast Fourier transform on the multiplexed signals to perform SC-FDMA modulation, and adds a guard interval to the SC-FDMA modulated SC-FDMA symbols to generate a baseband digital signal. Then, the radio transmitting unit 6077 converts the baseband digital signal into an analog signal, generates the intermediate-frequency in-phase component and quadrature component from the analog signal, removes the extra frequency component for the intermediate frequency band, converts (up-converts) the intermediate-frequency signal into a high-frequency signal, removes the extra frequency component, amplifies the power, and outputs the resulting signal to the transmit/receive antenna 611 for transmission.

Figure 7:
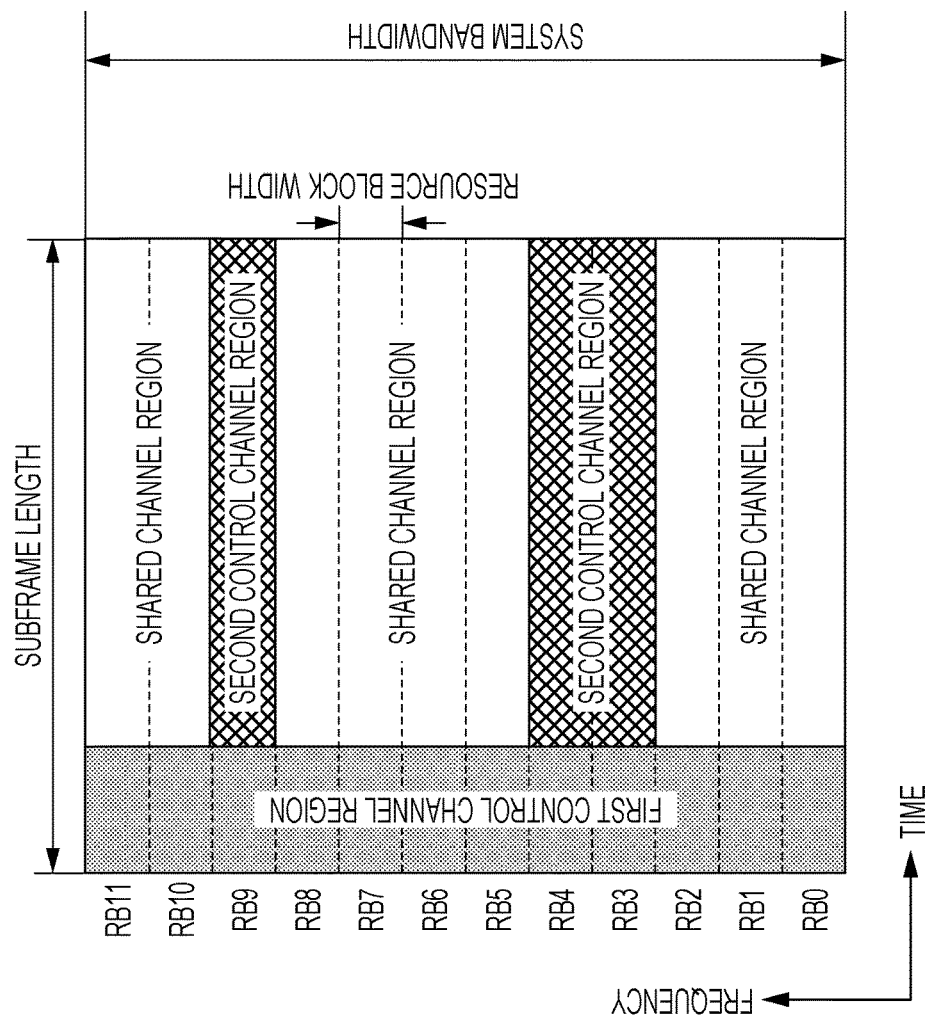
FIG. 7 is a diagram illustrating an example of channels used for mapping at the base station 101.

FIG. 7 is a diagram illustrating an example of channels used for mapping at the base station 101. FIG. 7 depicts a case where the width of a frequency band composed of 12 resource block pairs is used as the system bandwidth. A PDCCH, which is the first control channel, is arranged on the first three OFDM symbols in a subframe. The frequency domain of the first control channel extends over the system bandwidth. A shared channel is arranged on the OFDM symbols other than those for the first control channel in the subframe.

The details of the configuration of the PDCCH will now be described. The PDCCH is composed of a plurality of control channel elements (CCEs). The number of CCEs used on each downlink component carrier depends on the downlink component carrier bandwidth, the number of OFDM symbols included in the PDCCH, and the number of downlink reference signal transmission ports corresponding to the number of transmit antennas at the base station 101 for use in communication. Each CCE is composed of a plurality of downlink resource elements (a resource defined by one OFDM symbol and one subcarrier).

The CCEs used between the base station 101 and the terminal 102 are assigned numbers to identify the respective CCEs. The numbering of the CCEs is based on a predetermined rule. Here, CCE_t denotes the CCE with CCE number t. The PDCCH is constituted by an aggregation of a plurality of CCEs (CCE Aggregation). The number of CCEs in this aggregation is referred to as the "CCE aggregation level." The CCE aggregation level of the PDCCH is set by the base station 101 in accordance with a coding rate configured for the PDCCH and the number of bits of the DCI included in the PDCCH. A combination of CCE aggregation levels that can be possibly used for the terminal 102 is determined in advance. An aggregation of n CCEs is referred to as the "CCE aggregation level n."

One resource element group (REG) is composed of four neighboring downlink resource elements in the frequency domain. Each CCE is composed of nine different resource element groups that are scattered in the frequency domain and the time domain. Specifically, all the resource element groups assigned numbers on the entire downlink component carrier are interleaved using a block interleaver in units of resource element groups, and nine interleaved resource element groups having consecutive numbers constitute one CCE.

Each terminal 102 has configured therein a search space SS in which a PDCCH is searched for. Each SS is composed of a plurality of CCEs. Each SS includes a plurality of CCEs having consecutive numbers, starting from the smallest number, and the number of CCEs with consecutive numbers is determined in advance. An SS for each CCE aggregation level is composed of an aggregate of a plurality of PDCCH candidates. SSs are classified into a CSS (Cell-specific SS) including CCEs with numbers common in a cell, starting from the smallest number, and USS (Up-specific SS) including CCEs with numbers which are terminal-specific, starting from the smallest number. In the CSS, a PDCCH to which control information to be read by a plurality of terminals 102, such as system information or information concerning paging, is assigned, or a PDCCH on which a downlink/uplink grant indicating instructions for a fallback to a low-level transmission scheme or for random access is assigned can be arranged.

The base station 101 transmits a PDCCH using one or more CCEs in an SS configured in the terminal 102. The terminal 102 decodes a received signal using the one or more CCEs in the SS, and performs processing for detecting the PDCCH addressed thereto (referred to as blind decoding). The terminal 102 configures a different SS for each CCE aggregation level. Then, the terminal 102 performs blind decoding using a predetermined combination of CCEs in a different SS for each CCE aggregation level. In other words, the terminal 102 performs blind decoding on each of the PDCCH candidates in a different SS for each CCE aggregation level. The above-described series of processing operations performed in the terminal 102 is referred to as PDCCH monitoring.

The second control channel (X-PDCCH, PDCCH on PDSCH, Extended PDCCH, Enhanced PDCCH, E-PDCCH) is arranged on OFDM symbols other than those for the first control channel. The second control channel and the shared channel are arranged on different resource blocks. The resource blocks on which the second control channel and the shared channel may be arranged are configured for each terminal 102. In the resource block on which the second control channel region may be arranged, the shared channel (data channel) directed to the terminal 102 or another terminal may be configured. The starting position for the OFDM symbols on which the second control channel is to be arranged can be determined using a method similar to that for the shared channel. More specifically, the base station 101 can determine the starting position by configuring some resources in the first control channel as a PCFICH (Physical control format indicator channel) and mapping information indicating the number of OFDM symbols for the first control channel.

The starting position for the OFDM symbols on which the second control channel is to be arranged may be defined in advance, and may be set to, for example, the fourth OFDM symbol from the beginning in the subframe. In this case, if the number of OFDM symbols for the first control channel is less than or equal to 2, the second to third OFDM symbols in the resource block pair in which the second control channel is to be arranged are set to null without being mapped with signals. Other control signals or data signals can further be mapped to the resources set to null. The starting position for the OFDM symbols included in the second control channel may also be configured using higher-layer control information. The subframe illustrated in FIG. 7 is time-multiplexed, and the second control channel can be configured for each subframe.

Similarly to the PDCCH, an SS in which an X-PDCCH is searched for can be composed of a plurality of CCEs. Specifically, a plurality of resource elements in a region configured as the region of the second control channel illustrated in FIG. 7 constitute a resource element group, and, in addition, a plurality of resource element groups constitute a CCE. Accordingly, similarly to the case of the PDCCH described above, an SS in which an X-PDCCH is searched for (monitored) can be formed.

Alternatively, unlike the PDCCH, an SS in which an X-PDCCH is searched for may be composed of one or more resource blocks. Specifically, an SS in which an X-PDCCH is searched for is composed of an aggregation of one or more resource blocks (RB Aggregation), each resource block being included in a region configured as the region of the second control channel illustrated in FIG. 7. The number of RBs in this aggregation is referred to as the "RB aggregation level." An SS is composed of a plurality of RBs with consecutive numbers, starting from the smallest number, and the number of one or more RBs with consecutive numbers is determined in advance. An SS for each RB aggregation level is composed of an aggregate of a plurality of X-PDCCH candidates.

The base station 101 transmits an X-PDCCH using one or more RBs in an SS configured in the terminal 102. The terminal 102 decodes a received signal using the one or more RBs in the SS, and performs processing for detecting the X-PDCCH addressed thereto (performs blind decoding). The terminal 102 configures a different SS for each RB aggregation level. Then, the terminal 102 performs blind decoding using a predetermined combination of RBs in a different SS for each RB aggregation level. In other words, the terminal 102 performs blind decoding on each of the X-PDCCH candidates in a different SS for each RB aggregation level (monitors the X-PDCCH).

In a case where the base station 101 is to notify the terminal 102 of a control signal on the second control channel, the base station 101 configures the monitoring of the second control channel with the terminal 102, and maps the control signal for the terminal 102 to the second control channel. In a case where the base station 101 is to notify the terminal 102 of a control signal on the first control channel, the base station 101 maps the control signal for the terminal 102 to the first control channel without configuring the monitoring of the second control channel with the terminal 102.

On the other hand, in a case where the monitoring of the second control channel is configured by the base station 101, the terminal 102 performs blind decoding on the control signal directed to the terminal 102 for the second control channel. In a case where the monitoring of the second control channel is not configured by the base station 101, the terminal 102 does not perform blind decoding on the control signal directed to the terminal 102 for the second control channel.

Hereinafter, a description will be given of the control signal to be mapped to the second control channel. The control signal to be mapped to the second control channel is processed for each piece of control information on one terminal 102, and is subjected to processing such as, similarly to a data signal, scrambling processing, modulation processing, layer mapping processing, and precoding processing. Further, the control signal to be mapped to the second control channel is subjected to precoding processing specific to the terminal 102 together with the UE-specific reference signal. Preferably, the precoding processing is performed with precoding weights suitable for the terminal 102. For example, common precoding processing is performed on a signal for the second control channel and a UE-specific reference signal in the same resource block.

Furthermore, the control signal to be mapped in the second control channel can be mapped in such a manner that a front slot (first slot) and a rear slot (second slot) in a subframe include different pieces of control information. For example, a control signal including information on the allocation of a data signal on the downlink shared channel (downlink allocation information), which is transmitted from the base station 101 to the terminal 102, is mapped to the front slot in the subframe. Then, a control signal including information on the allocation of a data signal on the uplink shared channel (uplink allocation information), which is transmitted from the terminal 102 to the base station 101, is mapped to the rear slot in the subframe. Note that a control signal including uplink allocation information may be mapped to the front slot in the subframe, and a control signal including downlink allocation information may be mapped to the rear slot in the subframe.

Alternatively, a data signal for the terminal 102 or another terminal 102 may be mapped to the front slot and/or rear slot on the second control channel. A control signal for the terminal 102 or a terminal (including the terminal 102) in which the second control channel has been configured may be mapped to the front slot and/or rear slot on the second control channel.

The base station 101 multiplexes UE-specific reference signals with the control signal to be mapped to the second control channel. The terminal 102 performs demodulation processing on the control signal to be mapped to the second control channel, by using the UE-specific reference signals to be multiplexed. The UE-specific reference signals for some or all of antenna ports 7 to 14 are used. In this case, the control signal to be mapped to the second control channel can be MIMO-transmitted using a plurality of antenna ports.

For example, the UE-specific reference signal on the second control channel is transmitted using a predefined antenna port and a scrambling code. Specifically, the UE-specific reference signal on the second control channel is generated using antenna port 7, which is defined in advance, and a scrambling ID.

In addition, for example, the UE-specific reference signal on the second control channel is generated using an antenna port and a scrambling ID which are notified via RRC signaling or PDCCH signaling. Specifically, either antenna port 7 or antenna port 8 is notified as the antenna port to be used for the UE-specific reference signal on the second control channel via RRC signaling or PDCCH signaling. Any value of 0 to 3 is notified as the scrambling ID to be used for the UE-specific reference signal on the second control channel via RRC signaling or PDCCH signaling.

In the first embodiment, the base station 101 configures the second measurement target configuration for each terminal 102. The terminal 102 holds the first measurement target configuration, and reports the received power of the cell-specific reference signal as the measurement target specified in the first measurement target configuration and the received power of the channel-state information reference signal as the measurement target specified in the second measurement target configuration to the base station 101.

Accordingly, the following advantages can be achieved by using this embodiment of the claimed invention: The cell-specific reference signals illustrated in FIG. 2 are transmitted only from the base station 101 using the downlink 105. In addition, the measurement target configured in the second measurement target configuration and the second report configuration configured in step S403 in FIG. 4 is the channel-state information reference signals illustrated in FIG. 3. For this measurement target, it is assumed that the reference signals have been transmitted only from the RRH 103 using the downlink 107. In this case, the received signal power of the cell-specific reference signal as the measurement target specified in the predetermined first measurement target configuration in step S405 in FIG. 4 and the received signal power of the channel-state information reference signals transmitted only from the RRH 103, which are the measurement target specified in the second measurement target configuration configurable by the base station 101, can be measured to compute a path loss 1, which is a downlink path loss between the base station 101 and the terminal 102, and a path loss 2, which is a downlink path loss between the RRH 103 and the terminal 102. That is, whereas it is possible to configure two types of uplink transmit power, it is possible to configure the uplink transmit power for one of the base station 101 and the RRH 103 (having, for example, a lower path loss, that is, one of the base station 101 and the RRH 103 that is closer to the terminal 102) during uplink coordinated communication.

In this embodiment of the claimed invention, the received signal power of the cell-specific reference signal as the first measurement target described above and the received signal power of the channel-state information reference signal transmitted only from the RRH 103, which is the second measurement target, are reported to the base station 101. Accordingly, the base station 101 can judge (determine) whether an uplink signal from the terminal 102 is to be received by the base station 101 using the uplink 106 or an uplink signal from the terminal 102 is to be received by the RRH 103 using the uplink 108 during uplink coordinated communication. Based on this judgment, the base station 101 can configure parameters related to uplink power control in FIG. 3, and can configure which of the path loss 1 and the path loss 2, described above, is to be used.

In another example, it is assumed that: the cell-specific reference signals illustrated in FIG. 2 are transmitted from the base station 101 and the RRH 103 using the downlink 105 and the downlink 107; two measurement targets are configured in the second measurement target configuration and second report configuration configured in step S403 of FIG. 4; both the configured measurement targets are the channel-state information reference signals illustrated in FIG. 3; and a reference signal has been transmitted only from the base station 101 using the downlink 105 as one of the measurement targets whereas a reference signal has been transmitted only from the RRH 103 using the downlink 107 as the other measurement target. In this case, the received signal power of the cell-specific reference signal as the first measurement target specified in the predetermined first measurement target configuration in step S405 in FIG. 4, the received signal power of the channel-state information reference signal transmitted only from the base station 101, which is one of second measurement targets that are the measurement targets specified in the second measurement target configuration configurable by the base station 101, and the received signal power of the channel-state information reference signal transmitted only from the RRH 103, which is one of the second measurement targets, can be measured to compute a path loss 1, which is the combined value of the downlink path loss between the base station 101 and the terminal 102 and the downlink path loss between the RRH 103 and the terminal 102, and a path loss 2 including the downlink path loss value between the base station 101 and the terminal 102 and the downlink path loss value between the RRH 103 and the terminal 102.

That is, whereas the terminal 102 can configure two types of uplink transmit power, the terminal 102 can configure the uplink transmit power for one of the base station 101 and the RRH 103 (having, for example, a lower path loss, that is, one of the base station 101 and the RRH 103 that is closer to the terminal 102) during uplink coordinated communication. In this embodiment of the claimed invention, the received signal power of the cell-specific reference signal as the first measurement target described above, the received signal power of the channel-state information reference signal transmitted only from the base station 101, which is a second measurement target, and the received signal power of the channel-state information reference signal transmitted only from the RRH 103, which is the other second measurement target, are reported to the base station 101. Accordingly, the base station 101 can determine whether an uplink signal from the terminal 102 is to be received by the base station 101 using the uplink 106 or an uplink signal from the terminal 102 is to be received by the RRH 103 using the uplink 108 during uplink coordinated communication. Based on this determination, the base station 101 can configure parameters related to uplink power control in FIG. 3, and can configure which of the three path losses, namely, the path loss 1 and the two path losses 2 described above, is to be used. In this embodiment of the claimed invention, furthermore, the terminal 102 can perform transmit power control suitable for uplink coordinated communication by computing the uplink transmit power using the path loss 1, which is the combined value of the downlink path loss between the base station 101 and the terminal 102 and the downlink path loss between the RRH 103 and the terminal 102. Additionally, the terminal 102 can perform transmit power control suitable for communication between the base station 101 and the terminal 102 by computing the uplink transmit power using the path loss 2 based on the second measurement target between the base station 101 and the terminal 102.

In addition, the terminal 102 can perform transmit power control suitable for communication between the RRH 103 and the terminal 102 by computing the uplink transmit power using the path loss 2 based on the second measurement target between the RRH 103 and the terminal 102. In this manner, with the use of both the predetermined first measurement configuration and the second measurement target configuration configurable by the base station 101, appropriate uplink power control can be performed regardless of the configuration of the reference signals from the base station 101 and the RRH 103 (for example, in a case where the cell-specific reference signal is transmitted from the base station 101 or in a case where the cell-specific reference signal is transmitted from both the base station 101 and the RRH 103). In this embodiment, furthermore, reporting the received signal power of the cell-specific reference signal specified in the first measurement target configuration and the received signal power of the channel-state information reference signal specified in the second measurement target configuration helps the base station 101 understand the positional relationship (i.e., expected received power or path loss) between the base station 101, the RRH 103, and the terminal 102, which also makes advantages feasible during downlink coordinated communication. For example, if the downlinks 105 and 107 are used, a signal received by the terminal 102 is transmitted from the base station 101, the RRH 103, or both the base station 101 and the RRH 103, which is appropriately selected. Thus, the throughput of the entire system is expected to increase as a result of suppressing unwanted signal transmission.

Second Embodiment

A second embodiment of the present invention will be described hereinafter. The description of this embodiment will be directed to the details of the parameter configuration of a channel-state information reference signal, the second measurement target configuration, second report configuration, third measurement target configuration, and third report configuration in step S403 in FIG. 4, and the parameters related to the first measurement report and the second measurement report in step S407 in FIG. 4. A description will also be given here of the details of a first reference signal configuration for CSI feedback calculation, a second reference signal configuration for specifying a resource element to be excluded from the target of data demodulation when data is demodulated, and a third reference signal configuration for configuring a measurement target for calculating a received signal power.

Figure 8:
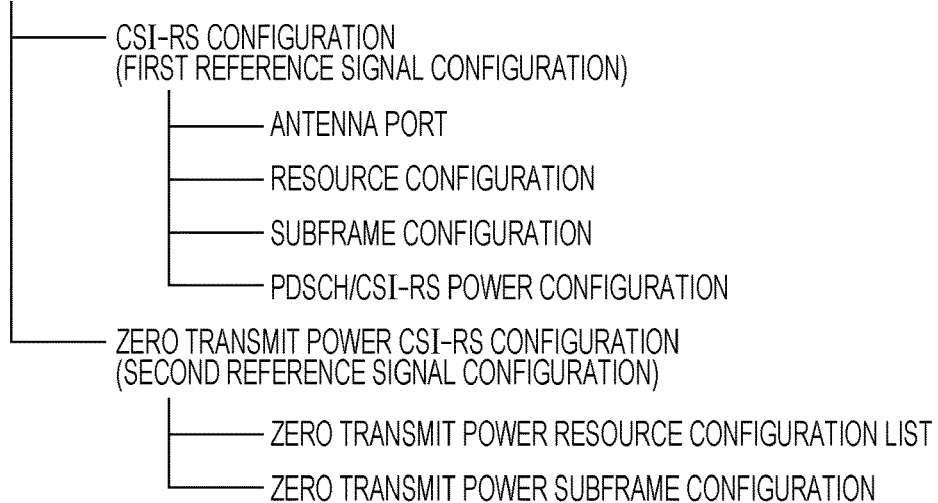
FIG. 8 is a diagram illustrating the details of a channel-state information reference signal configuration.

In FIG. 8, the details of the parameters related to the first reference signal configuration and the second reference signal configuration are illustrated as the details of a channel-state information reference signal. CSI-RS configuration-r10 (CSI-RS-Config-r10) may include a CSI-RS configuration, that is, a first reference signal configuration (csi-RS-r10), and a zero transmit power CSI-RS configuration, that is, a second reference signal configuration (zeroTxPowerCSI-RS-r10). The CSI-RS configuration may include an antenna port (antennaPortsCount-r10), a resource configuration (resourceConfig-r10), a subframe configuration (subframeConfig-r10), and a PDSCH/CSI-RS power configuration (p-C-r10).

The antenna port (antennaPortsCount-r10) specifies the number of antenna ports reserved in the CSI-RS configuration. In an example, any of the values 1, 2, 4, and 8 is selected in the antenna port (antennaPortsCount-r10). In the resource configuration (resourceConfig-r10), the position of the top resource element (minimum block defined by frequency (subcarrier) and time (OFDM symbol) illustrated in FIGS. 2 and 3) for antenna port 15 (CSI port 1) is represented by an index. Accordingly, the resource elements of the channel-state information reference signals allocated to the respective antenna ports are uniquely determined. The details will be described below.

In the subframe configuration (subframeConfig-r10), the position and interval of a subframe including the channel-state information reference signal is represented by an index. For example, if an index in the subframe configuration (subframeConfig-r10) is 5, the channel-state information reference signal is included every ten subframes and the channel-state information reference signal is included in subframe 0 in a radio frame having ten subframes as a unit. In another example, for example, if an index in the subframe configuration (subframeConfig-r10) is 1, the channel-state information reference signal is included every five subframes and the channel-state information reference signal is included in subframes 1 and 6 in a radio frame having ten subframes used as a unit. In the way described above, the subframe configuration uniquely specifies the interval and the position of a subframe including the channel-state information reference signal.

The PDSCH/CSI-RS power configuration (p-C-r10) specifies the power ratio of the PDSCH to the channel-state information reference signal (CSI-RS) (the ratio of EPRE: Energy Per Resource Element), and may be configured in the range from −8 to 15 dB. Although not illustrated here, the base station 101 separately notifies the terminal 102 of cell-specific reference signal transmit power (referenceSignalPower), PA, and PB, using RRC signals. Here, PA denotes an index representing the transmit power ratio of the PDSCH to the cell-specific reference signal in a subframe not including the cell-specific reference signal, and PB denotes an index representing the transmit power ratio of the PDSCH to the cell-specific reference signal in a subframe including the cell-specific reference signal. Combining the PDSCH/CSI-RS power configuration (p-C-r10), the cell-specific reference signal transmit power (referenceSignalPower), and PA allows the terminal 102 to calculate the transmit power of the channel-state information reference signal.

An example of the resource configuration (resourceConfig-r10) will now be given. In the resource configuration (resourceConfig-r10), the position of a resource allocated to the CSI-RS for each antenna port is represented by an index. For example, if index 0 is specified in the resource configuration (resourceConfig-r10), the top resource element for antenna port 15 (CSI port 1) is designated as subcarrier number 9 and subframe number 5. As illustrated in FIG. 3, C1 is allocated to antenna port 15. Accordingly, the resource element with subcarrier number 9 and subframe number 6 is also configured as the channel-state information reference signal for antenna port 15 (CSI port 1). Based on this configuration, the resource elements for the respective antenna ports are also reserved. For example, the resource element with subcarrier number 9 and subframe number 5 and the resource element with subcarrier number 9 and subframe number 6 are allocated to antenna port 16 (CSI port 2). Similarly, the resource element with subcarrier number 3 and subframe number 5 and the resource element with subcarrier number 3 and subframe number 6 are allocated to antenna ports 17 and 18 (CSI ports 3 and 4). Similarly, the resource element with subcarrier number 8 and subframe number 5 and the resource element with subcarrier number 8 and subframe number 6 are allocated to antenna ports 19 and 20 (CSI ports 5 and 6). Similarly, the resource element with subcarrier number 2 and subframe number 5 and the resource element with subcarrier number 2 and subframe number 6 are allocated to antenna ports 21 and 22 (CSI ports 7 and 8). If any other index is specified in the resource configuration (resourceConfig-r10), the top resource element for antenna port 15 (CSI port 1) is differently configured, and the resource elements allocated to the respective antenna ports are also different accordingly.

The zero transmit power CSI-RS configuration (second reference signal configuration) may include a zero transmit power resource configuration list (zeroTxPowerResourceConfigList-r10) and a zero transmit power subframe (zeroTxPowerSubframeConfig-r10) configuration. In the zero transmit power resource configuration list, one or a plurality of indexes included in the resource configuration (resourceConfig-r10) described above are specified by bitmap. In the zero transmit power subframe configuration, as described above, the position and interval of a subframe including the channel-state information reference signal is represented by an index. Accordingly, appropriate configuration of the zero transmit power resource configuration list and the zero transmit power subframe configuration allows the terminal 102 to specify a resource element to be excluded from the target of demodulation processing when demodulating the PDSCH (downlink shared channel, downlink data channel, downlink data signal, Physical Downlink Shared Channel) as a resource of the channel-state information reference signal. By way of example, the index specified in the zero transmit power resource configuration list supports the resource configuration (resourceConfig-r10) for four antenna ports (antennaPortsCount-r10). In other words, the resource configuration (resourceConfig-r10) is notified by 16 indexes in the case of four antenna ports. Accordingly, the zero transmit power resource configuration list specifies a 16-bit bitmap to make notification of the resources of the channel-state information reference signals represented by the 16 indexes described above. For example, if indexes 0 and 2 are notified by bitmap, the resource elements corresponding to indexes 0 and 2 are excluded from the target of demodulation processing when demodulation is performed.

Now, the details of the parameters related to the second measurement target configuration in step S403 in FIG. 4 will be described with reference to FIG. 9. The reference signal measurement configuration in FIG. 9, that is, the third reference signal configuration or the second measurement target configuration, may include a reference signal measurement configuration-addition/modification list and a reference signal measurement configuration-removal list. The reference signal measurement configuration-addition/modification list may include a CSI-RS measurement index and a CSI-RS measurement configuration. The reference signal measurement configuration-removal list may include a CSI-RS measurement index. The CSI-RS measurement index and the CSI-RS measurement configuration are configured in combination, and one or a plurality of combinations each including a CSI-RS measurement index and a CSI-RS measurement configuration are configured in the reference signal measurement configuration-addition/modification list. The CSI-RS measurement configuration or configurations configured in the reference signal measurement configuration-addition/modification list are the measurement targets. A CSI-RS measurement index is an index associated with a CSI-RS measurement configuration, and is an index for distinguishing a plurality of measurement targets configured in the third reference signal configuration from one another. In accordance with this index, the corresponding CSI-RS measurement configuration is deleted from the measurement target using the reference signal measurement configuration-removal list, or, in a measurement report described below, a measurement report and a measurement target specified by the index are associated with each other. The CSI-RS measurement configuration will be described below with reference to FIGS. 11 and 12.

Figure 10:
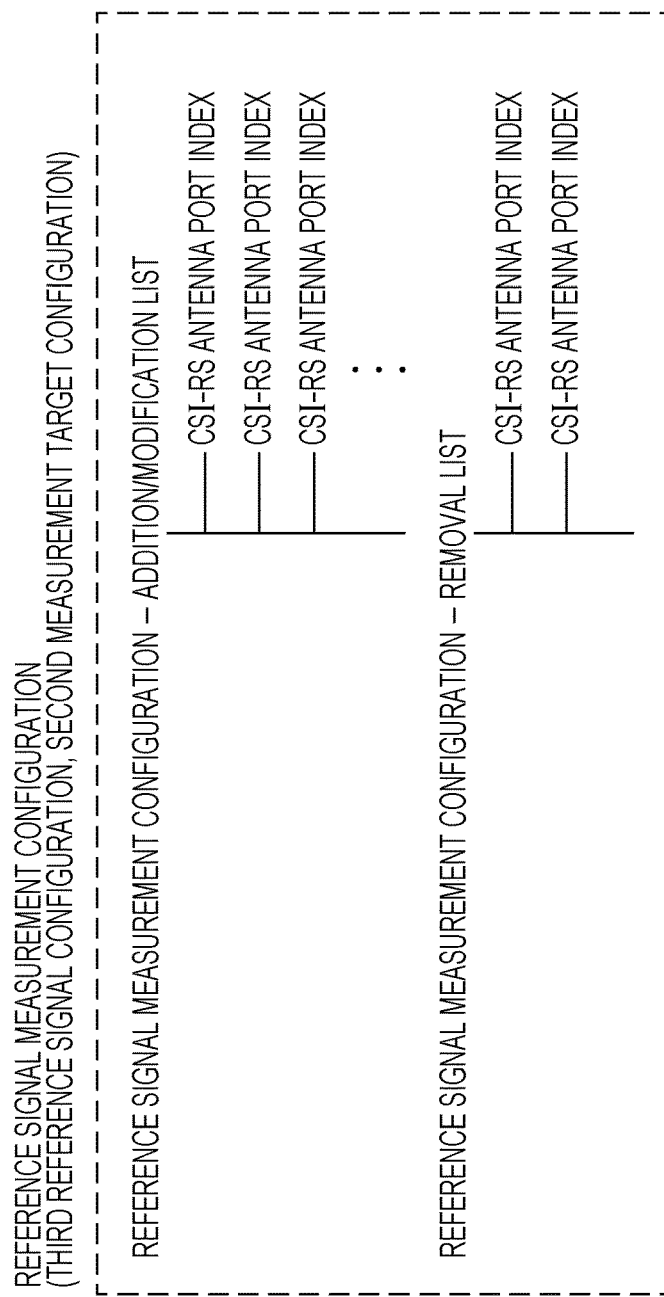
FIG. 10 is a diagram illustrating another example of the details of the parameters related to a second measurement target configuration in step S403 in FIG. 4.

In another example, as illustrated in FIG. 10, only a CSI-RS antenna port index may be configured in the reference signal measurement configuration-addition/modification list and the reference signal measurement configuration-removal list. The CSI-RS antenna port index is an index associated with each of the antenna port numbers (antenna ports 15 to 22) for the channel-state information reference signal illustrated in FIG. 3. The CSI-RS antenna port index configured in the third reference signal configuration in FIG. 10 may be included in the channel-state information reference signal configured in the first reference signal configuration illustrated in FIG. 8 or may not necessarily be included in the channel-state information reference signal configured in the first reference signal configuration. If the CSI-RS antenna port index is not included in the channel-state information reference signal configured in the first reference signal configuration, the third reference signal configuration targets a channel-state information reference signal if the CSI-RS antenna port index configured in the third reference signal configuration is included in the channel-state information reference signal configured in the first reference signal configuration.

Figure 11:
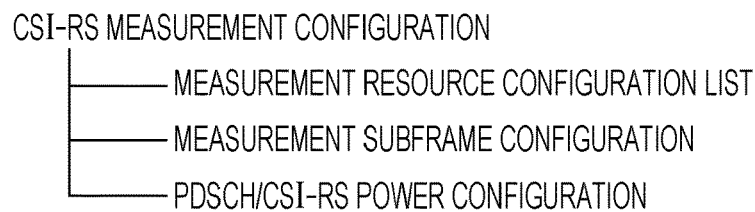
FIG. 11 is a diagram illustrating an example of the details of a CSI-RS measurement configuration.
Figure 12:
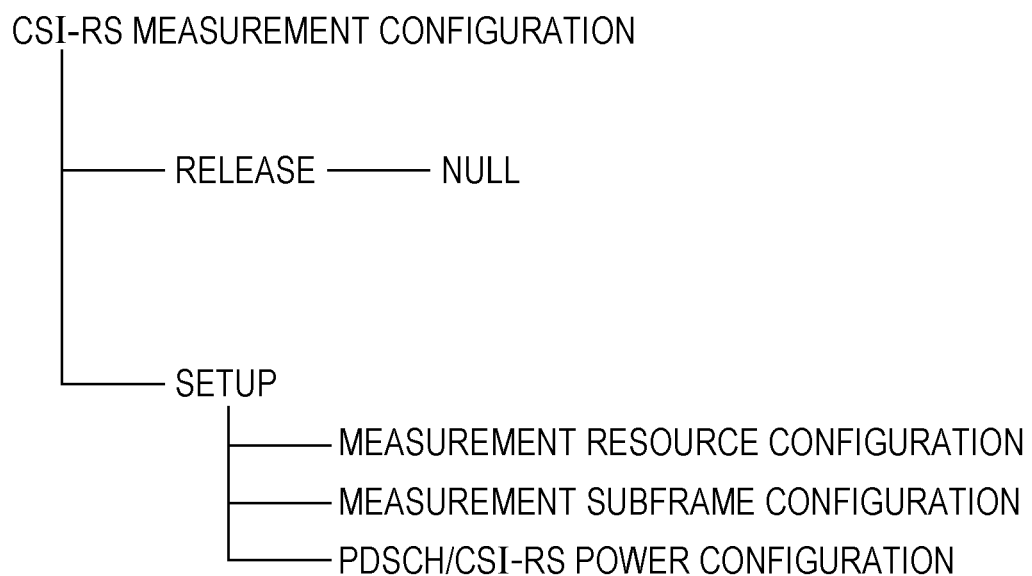
FIG. 12 is a diagram illustrating another example of the details of a CSI-RS measurement configuration.

Next, the details of the CSI-RS measurement configuration in FIG. 9 will be described with reference to FIGS. 11 and 12. In an example, as illustrated in FIG. 11, the CSI-RS measurement configuration may include a measurement resource configuration list, a measurement subframe configuration, and a PDSCH/CSI-RS power configuration. The measurement resource configuration list and the measurement subframe configuration may be considered to be similar to the zero transmit power resource configuration list (zeroTxPowerResourceConfigList-r10) and the zero transmit power subframe (zeroTxPowerSubframeConfig-r10) configuration illustrated in FIG. 8. The PDSCH/CSI-RS power configuration may be considered to be similar to the PDSCH/CSI-RS power configuration (p-C-r10) illustrated in FIG. 8. In another example, as illustrated in FIG. 12, the CSI-RS measurement configuration may include a measurement resource configuration, a measurement subframe configuration, and a PDSCH/CSI-RS power configuration. The measurement resource configuration, the measurement subframe configuration, and the PDSCH/CSI-RS power configuration may be considered to be similar to the resource configuration (resourceConfig-r10), the subframe configuration (subframeConfig-r10), and the PDSCH/CSI-RS power configuration (p-C-r10) illustrated in FIG. 8. While the PDSCH/CSI-RS power configuration is assumed in FIGS. 11 and 12, CSI-RS transmit power (channel-state information reference signal transmit power) may be notified instead.

Now, the details of the third measurement target configuration and the third report configuration in step S403 in FIG. 4 will be described with reference to FIG. 13. In an example, an RRC connection reconfiguration (RRCConnectionReconfiguration) may include an RRC connection reconfiguration-r8-IEs (RRCConnectionReconfiguration-r8-IEs), and the RRC connection reconfiguration-r8-IEs may include a measurement configuration (MeasConfig: Measurement Config). The measurement configuration may include a measurement object removal list (MeasObjectToRemoveList), a measurement object addition/modification list (MeasObjectToAddModList), a measurement ID removal list, a measurement ID addition/modification list, a report configuration removal list (ReportConfigToRemoveList), and a report configuration addition/modification list (ReportConfigToAddModList). The third measurement target configuration illustrated in step S403 in FIG. 4 is assumed to specify the measurement object removal list, the measurement object addition/modification list, the measurement ID removal list, and the measurement ID addition/modification list, and the third report configuration is assumed to specify the report configuration removal list and the report configuration addition/modification list. The measurement ID addition/modification list may include a measurement ID, a measurement object ID, and a report configuration ID, and the measurement ID removal list may include a measurement ID.

Figure 14:
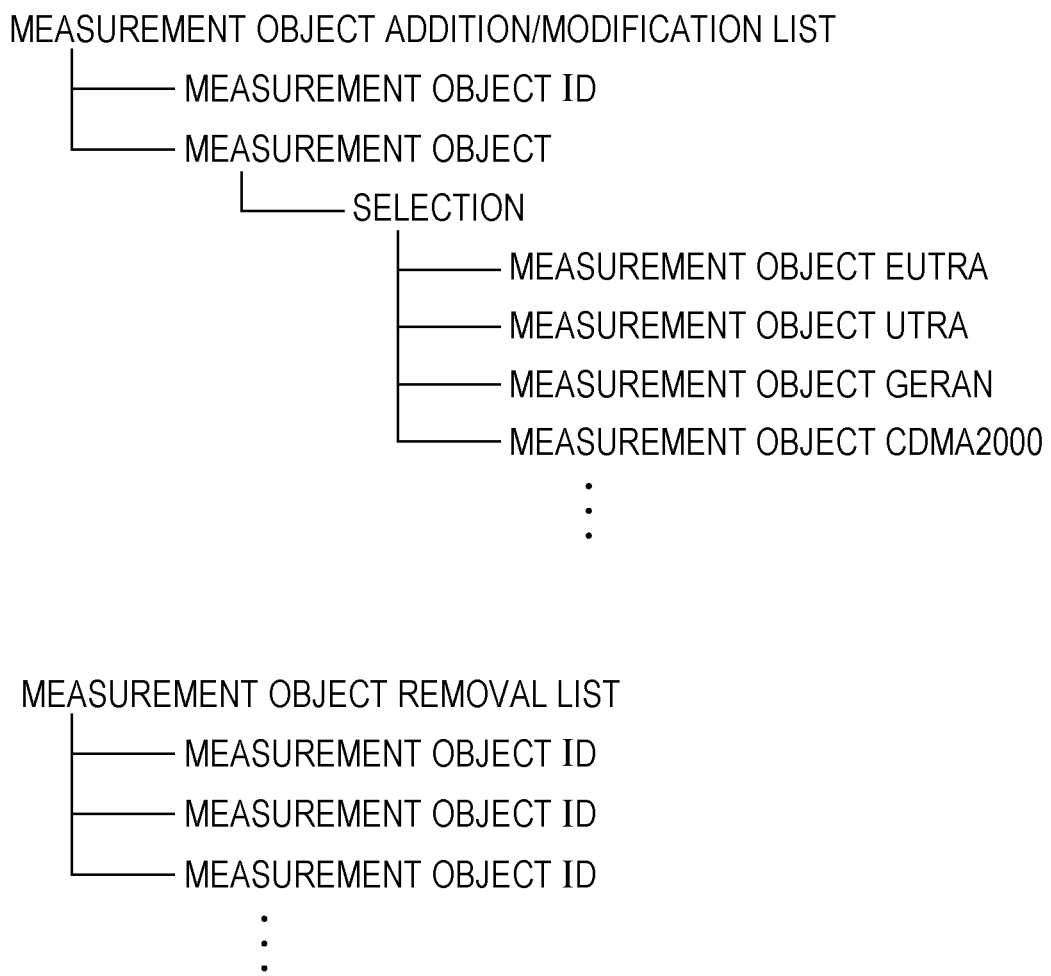
FIG. 14 is a diagram illustrating an example of the details of a third measurement target configuration.

The measurement object ID is associated with a measurement object described below, and the report configuration ID is associated with a report configuration ID described below. In the measurement object addition/modification list, as illustrated in FIG. 14, a measurement object ID and a measurement object are selectable. A measurement object can be selected from measurement targets such as the measurement object EUTRA, the measurement object UTRA, the measurement object GERAN, and the measurement object CDMA2000. For example, for the measurement object EUTRA, the base station 101 notifies the terminal 102 of a carrier frequency (center frequency) and so forth, allowing the terminal 102 to measure the received signal power of a cell-specific reference signal transmitted from an unconnected cell (a cell with no RRC parameters configured) (see FIG. 15). That is, the third measurement target configuration and the third report configuration allow measurement of the received signal power of a cell-specific reference signal of an unconnected cell.

The measurement object removal list includes a measurement object ID. Once a measurement object ID is specified, the associated measurement object can be deleted from the measurement targets. The measurement target configuration described above is included in the RRC connection reconfiguration, and is thus configured using RRC signals at the time of the reconfiguration of RRC connection (RRC Connection Reconfiguration). The RRC connection reconfiguration described above and a variety of information elements/a variety of configurations included in the RRC connection reconfiguration may be configured for each terminal 102 using RRC signals (e.g., dedicated signaling). The physical configuration described above may be configured for each terminal 102 using RRC messages. The RRC reconfiguration and RRC re-establishment described above may be configured for each terminal 102 using RRC messages.

Now, the details of the second measurement target configuration and second report configuration in step S403 in FIG. 4 will be described with reference to FIG. 16. In an example, a dedicated physical configuration (PhysicalConfigDedicated) may include a measurement configuration, and the measurement configuration may include a measurement object removal list, a measurement object addition/modification list, a measurement ID removal list, a measurement ID addition/modification list, a report configuration removal list, and a report configuration addition/modification list. The second measurement target configuration illustrated in step S403 in FIG. 4 specifies the measurement object removal list and the measurement object addition/modification list, and may further include the measurement ID removal list and the measurement ID addition/modification list. The second report configuration is assumed to specify the report configuration removal list and the report configuration addition/modification list. The measurement object removal list and the measurement object addition/modification list given here are considered to be similar to the reference signal measurement configuration-addition/modification list and the reference signal measurement configuration-removal list illustrated in FIG. 9 or FIG. 10.

While the dedicated physical configuration (PhysicalConfigDedicated), which is a dedicated physical configuration, is illustrated in FIG. 16, a dedicated physical configuration for SCell (PhysicalConfigDedicatedSCell-r11), which is a dedicated physical configuration allocated to a secondary cell, may be used. The dedicated physical configuration described above is configured using RRC signals at the time of the re-establishment of the RRC connection (RRC Connection Reestablishment) or at the time of the reconfiguration of the RRC connection (RRC Connection Reconfiguration). On the other hand, the dedicated physical configuration for SCell may be included in the SCell addition/modification list, and is configured using RRC signals when a SCell is added and when the configuration is modified. In this manner, the second measurement target configuration and the second report configuration allow measurement of the received signal power of a configured channel-state information reference signal of a connected cell. The measurement object addition/modification list and the measurement object removal list (second measurement target configuration) illustrated in FIG. 16 may be similar in content to the reference signal measurement configuration-addition/modification list and the reference signal measurement configuration-removal list (third reference signal configuration) illustrated in FIG. 9 or FIG. 10.

Figure 9:
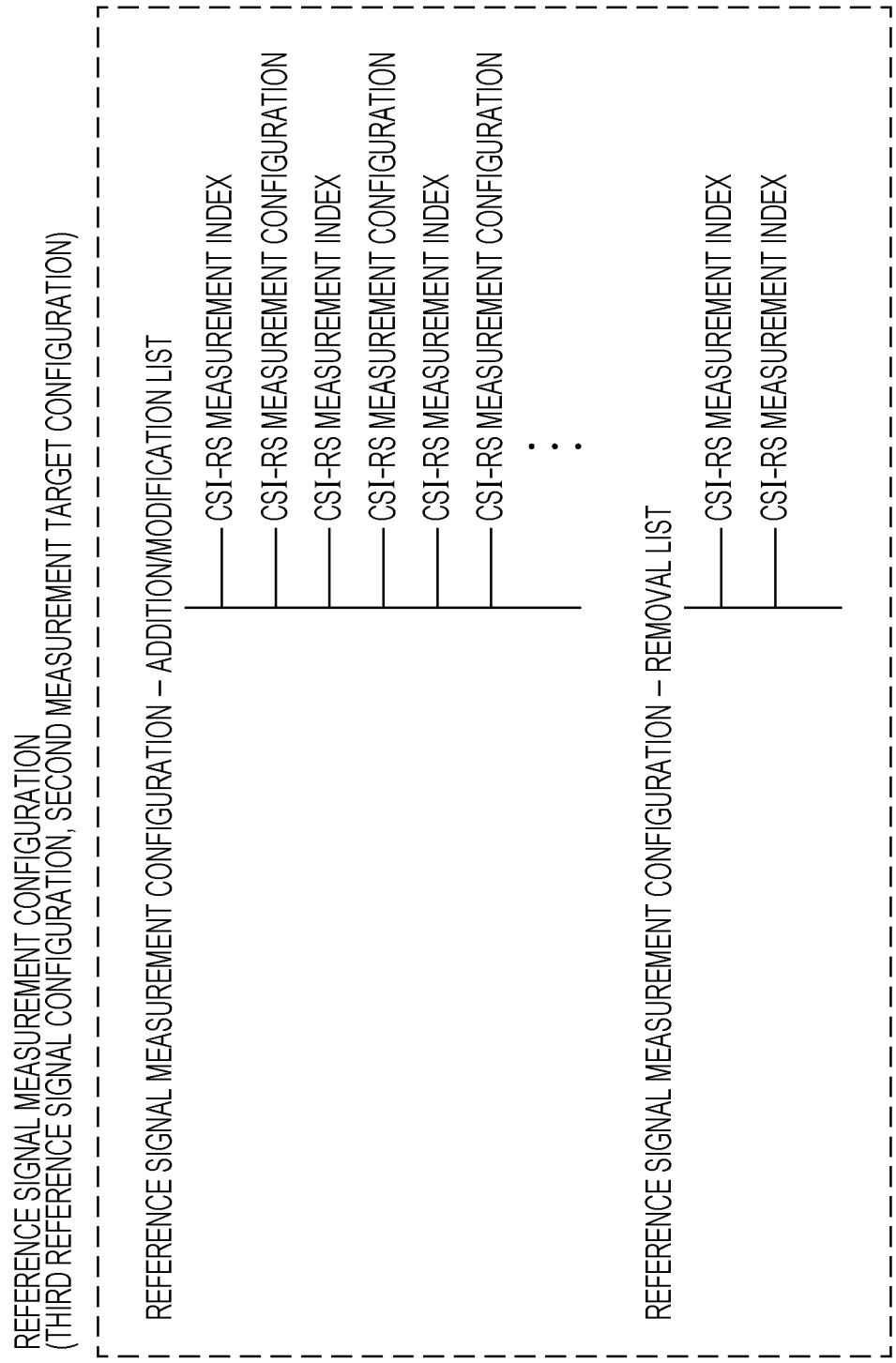
FIG. 9 is a diagram illustrating an example of the details of parameters related to a second measurement target configuration in step S403 in FIG. 4.

More specifically, in the measurement object addition/modification list and the measurement object removal list illustrated in FIG. 16, a third reference signal is configured using the CSI-RS measurement configuration (see FIGS. 11 and 12) identified by the CSI-RS measurement index illustrated in FIG. 9, or a third reference signal is configured using the CSI-RS antenna port index illustrated in FIG. 10. While it is assumed in FIG. 16 that the dedicated physical configuration (PhysicalConfigDedicated) or the dedicated physical configuration for SCell (PhysicalConfigDedicated-SCell-r11), which is a dedicated physical configuration allocated to a secondary cell, includes the second measurement target configuration, the second measurement target configuration may be included in the CSI-RS configuration-r10 of FIG. 8 described above. In another example, it is assumed that the second measurement target configuration is included. The second measurement target configuration may be included in the measurement configuration in FIG. 13 described above. The physical configuration described above may be configured for each terminal using RRC signals (e.g., dedicated signaling).

The details of the second report configuration in FIG. 16 will now be described with reference to FIG. 17. In an example, the report configuration-addition/modification list includes a combination including a report configuration ID and a report configuration. The report configuration-removal list includes a report configuration ID. The report configuration-addition/modification list may include a plurality of combinations each including a report configuration ID and a report configuration or one combination including a report configuration ID and a report configuration. The report configuration-removal list may include a plurality of report configuration IDs or one report configuration ID. As in FIG. 17, the report configuration addition/modification list in FIG. 13 includes one or a plurality of combinations each including a report configuration ID and a report configuration, and the content of the report configuration is similar to that of the report configuration. The report configuration removal list in FIG. 13 also includes one or a plurality of report configuration IDs, as in FIG. 17.

The report configuration in FIG. 17 will now be described with reference to FIG. 18. In an example, the report configuration includes a trigger type. The trigger type includes the configuration of information such as a threshold used for an event for performing reporting and a report interval.

Figure 19:
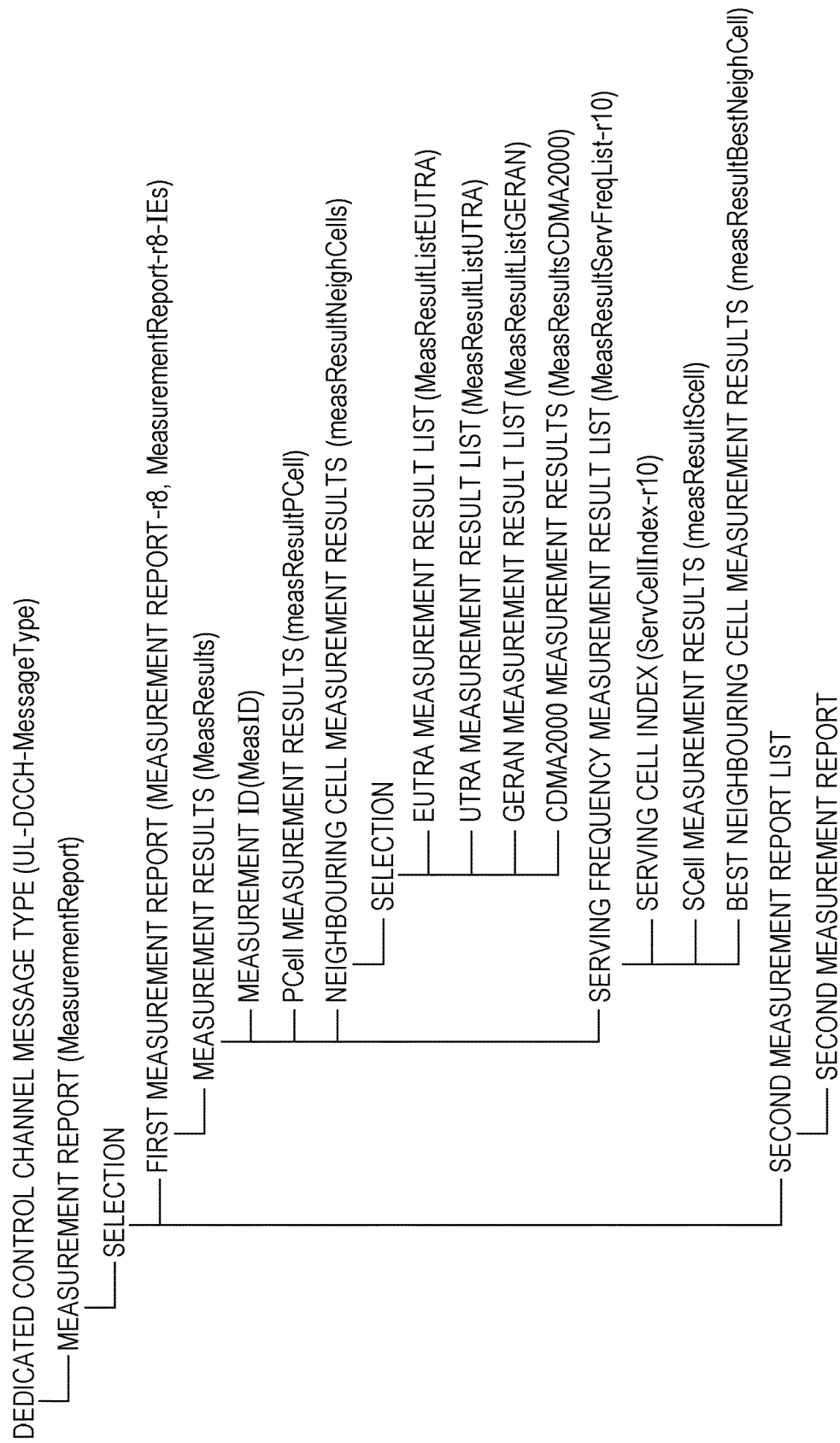
FIG. 19 is a diagram illustrating the details of measurement reports.

Next, the configuration related to the first measurement report and the second measurement report in step S407 in FIG. 4, namely, a first measurement report and a second measurement report list, will be described with reference to FIG. 19. A dedicated control channel message type (UL-DCCH-MessageType) illustrated in FIG. 19 is one of the RRC messages transmitted from a terminal to the base station 101. The dedicated control channel message type described above includes at least a measurement report (MeasurementReport). A report included in the measurement report is selectable. At least a first measurement report (measurement report-r8, MeasurementReport-r8-IEs) and a second measurement report list can be selected. The first measurement report may include measurement results (MeasResults), and the measurement results may include a measurement ID (MeasID), PCell measurement results (measResultPCell), neighbouring cell measurement results (measResultNeighCells), and a serving frequency measurement result list. A EUTRA measurement result list (MeasResultListEUTRA), a UTRA measurement result list (MeasResultListUTRA), a GERAN measurement result list (MeasResultListGERAN), or CDMA2000 measurement results (MeasResultsCDMA2000) are selectable as the neighbouring cell measurement results. The serving frequency measurement result list may include a serving cell index, SCell measurement results, and best neighbouring cell measurement results. While it is assumed in FIG. 19 that the first measurement report and the second measurement report list are arranged in parallel and one of them is selected, the measurement results of the first measurement report may include the second measurement report.

Figure 20:
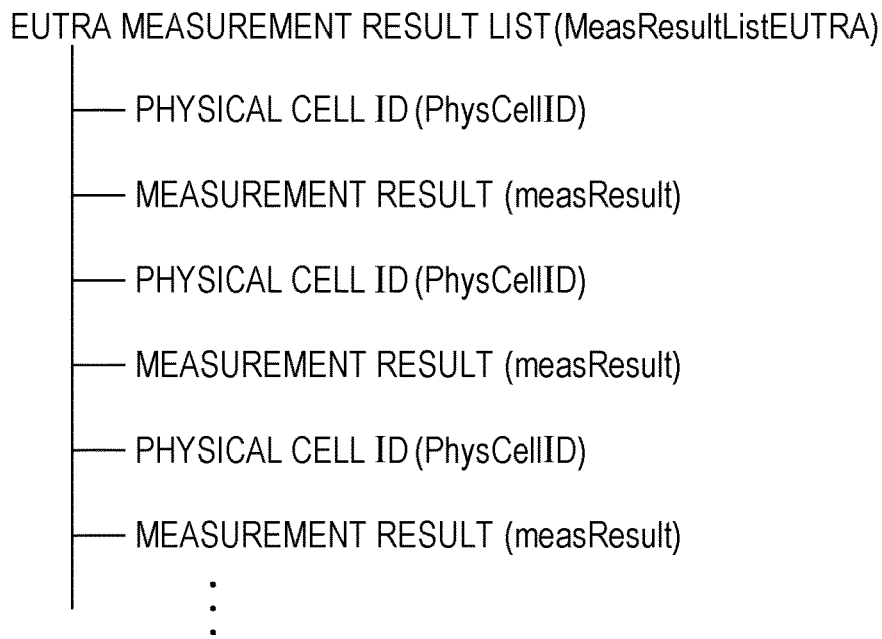
FIG. 20 is a diagram illustrating the details of a EUTRA measurement result list.

The details of the EUTRA measurement result list illustrated in FIG. 19 will now be described with reference to FIG. 20. The EUTRA measurement result list includes a physical cell ID (PhysCellID) and a measurement result (measResult). The physical cell ID and the measurement result are used in combination, allowing the terminal 102 to notify the base station 101 of on which neighboring cell the measurement information is being notified. The EUTRA measurement result list may include a plurality of physical cell IDs and a plurality of measurement results, or may include one physical cell ID and one measurement result. The PCell measurement results and the serving frequency measurement result list included in the illustration of FIG. 19 are obtained as a result of the measurement of the measurement target specified in the first measurement target configuration described above. The measurement results included in the EUTRA measurement result list included in the illustration of FIG. 20 or the like are obtained as a result of the measurement of the measurement target specified in the third measurement target configuration in FIG. 13.

Figure 13:
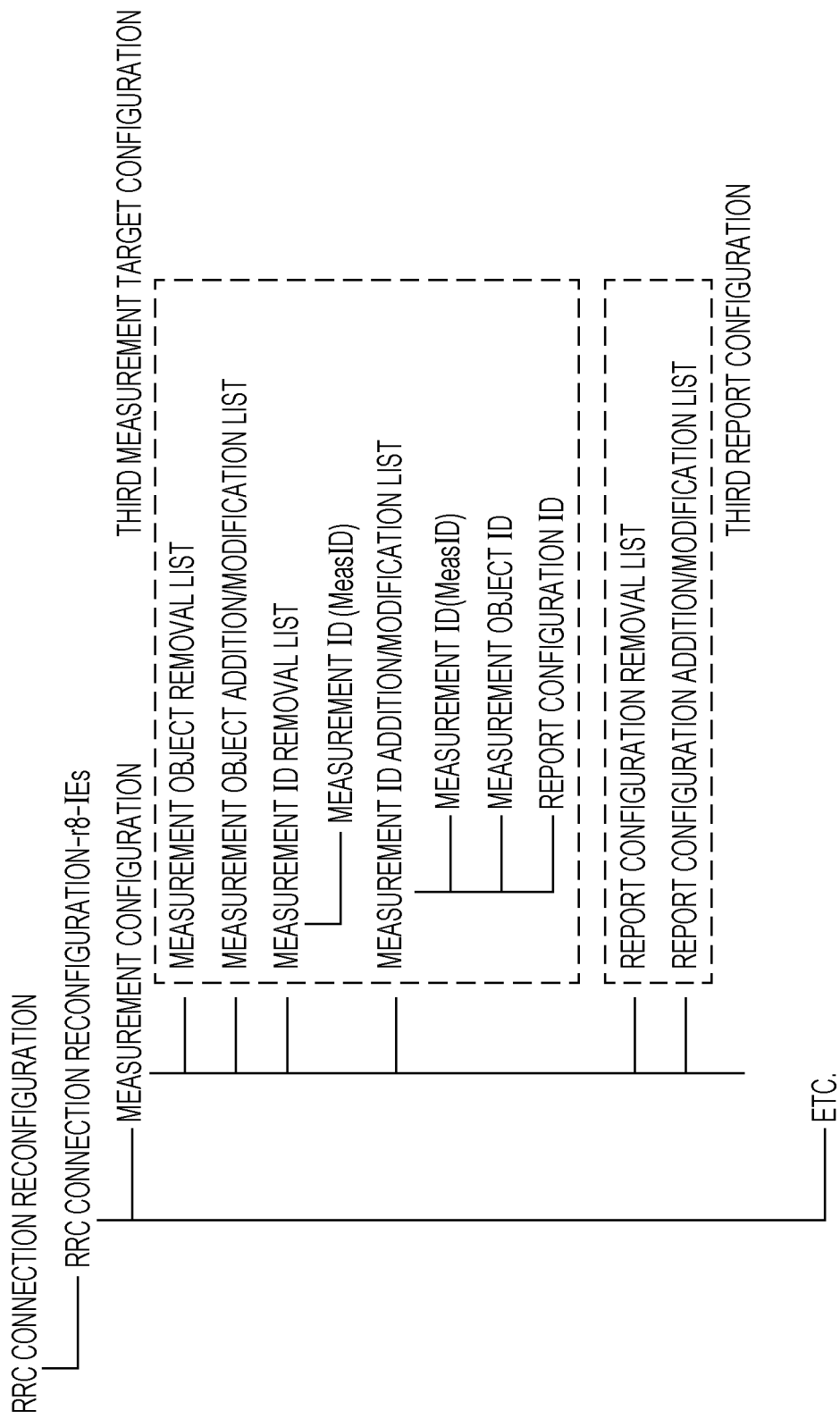
FIG. 13 is a diagram illustrating the details of a third measurement target configuration and report configuration in step S403 in FIG. 4.

The measurement ID illustrated in FIG. 19 represents the measurement ID illustrated in FIG. 13, and is therefore associated with the measurement object included in the third measurement target configuration and the measurement report configuration included in the third report configuration. The relationship between the measurement report and the first to third measurement target configurations will now be described. The terminal 102 can report the received signal power at antenna port 0 for the cell-specific reference signal of the PCell and the received signal power at antenna port 0 for the cell-specific reference signal of the SCell to the base station 101 using the PCell measurement result and the SCell measurement result included in the first measurement report. These are the measurement targets specified in the first measurement target configuration. In contrast, the terminal 102 can report the received signal power at antenna port 0 for the cell-specific reference signal of a neighboring cell to the base station 101 using a physical cell ID and a measurement result included in the EUTRA measurement result list. These are the measurement targets specified in the third measurement target configuration. That is, the first measurement report and the third measurement target configuration allow the terminal 102 to report the received signal power at antenna port 0 for the cell-specific reference signal of an unconnected cell (a cell with no RRC parameters configured, neighboring cell) to the base station 101. That is, the terminal 102 can report the received signal power at antenna port 0 for the cell-specific reference signal of each cell (primary cell, secondary cell, and/or neighboring cell) to the base station 101 using the first measurement report.

Figure 21:
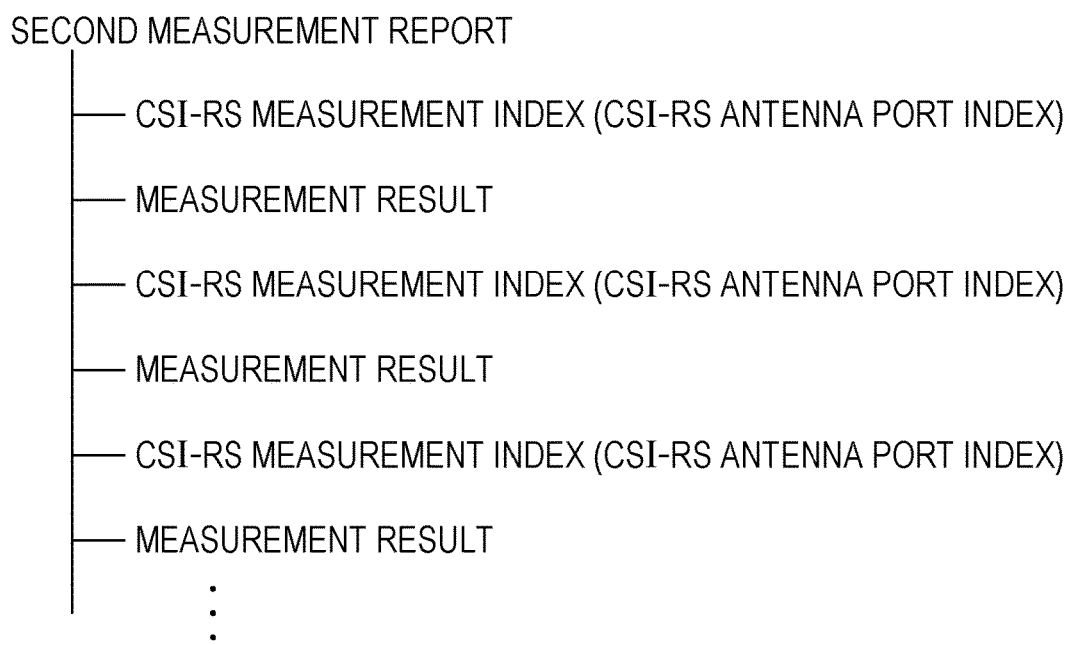
FIG. 21 is a diagram illustrating the details of a second measurement report.

The details of the second measurement report list illustrated in FIG. 19 will now be described with reference to FIG. 21. The second measurement report included in the second measurement report list includes a CSI-RS measurement index and a measurement result. In place of the CSI-RS measurement index, a CSI-RS antenna port index may be included. The CSI-RS measurement index and the CSI-RS antenna port index, as used here, specify the CSI-RS measurement index and the CSI-RS antenna port index depicted in FIGS. 9 and 10. Accordingly, the terminal 102 can report the received signal power of the measurement target configured in the third reference signal configuration to the base station 101 using the measurement results of the second measurement report. For example, in a case where antenna port 15 for the channel-state information reference signal is specified in the third reference signal configuration, the terminal 102 can report the received signal power at antenna port 15 for the channel-state information reference signal to the base station 101.

More specifically, the terminal 102 can report the received signal power of a configured channel-state information reference signal (for example, antenna port 15 for the channel-state information reference signal, etc.) of a connected cell (primary cell, secondary cell) to the base station 101 using the second measurement report. Although not illustrated here, an index specifying a specific cell (carrier component), such as a serving cell index, may be included in the second measurement report illustrated in FIG. 21. In this case, the serving cell index, the CSI-RS measurement index, and the measurement results are used in combination, allowing the terminal 102 to report for which channel-state information reference signal the result of measurement has been obtained and in which cell the channel-state information reference signal is included to the base station 101.

In the second embodiment, the base station 101 configures, for each terminal 102, a second measurement target configuration for only measuring a channel information reference signal configured by the base station 101, and configures, for each terminal 102, a third measurement target configuration for measuring a cell-specific reference signal generated using a physical ID different from the physical ID of the cell to which the terminal 102 is connected. The physical ID is also referred to as the physical layer ID. The terminal 102 reports the received signal of the reference signal as the measurement target specified in the second measurement target configuration and the received signal of the reference signal as the measurement target specified in the third measurement target configuration to a base station 101.

In the second embodiment, furthermore, the base station 101 configures, for each of the terminals, a first reference signal configuration for configuring a measurement target used for channel-state reporting (channel-state information reporting), configures, for each terminal 102, a second reference signal configuration for specifying a resource element to be excluded from the target of data demodulation when the terminal 102 demodulates data, and configures, for each terminal 102, a third reference signal configuration for configuring a measurement target as which the terminal 102 measures the received power of the reference signal. The terminal 102 receives the information configured by the base station 101, reports the channel state to the base station 101 on the basis of the first reference signal configuration, determines a resource element to be excluded from the target of data demodulation when data is demodulated on the basis of the second reference signal configuration, demodulates the data, and measures the reference signal received power on the basis of the third reference signal configuration.

Accordingly, the following advantages can be achieved by using the embodiment of the claimed invention described above. It is assumed that the cell-specific reference signals illustrated in FIG. 2 and antenna ports 15, 16, 17, and 18 for the channel-state information reference signal illustrated in FIG. 3 are transmitted only from the base station 101 using the downlink 105. It is also assumed that the measurement target configured in the second measurement target configuration and second report configuration configured in step S403 in FIG. 4, that is, the measurement target configured in the third reference signal configuration in FIG. 9, is antenna port 19 for the channel-state information reference signal illustrated in FIG. 3, and that, for this measurement target, the channel-state information reference signal has been transmitted only from the RRH 103 using the downlink 107. In this case, the received signal power of the cell-specific reference signal as the first measurement target in step S405 in FIG. 4 and the received signal power of the channel-state information reference signal transmitted only from the RRH 103, which is the second measurement target, can be measured to compute a path loss 1, which is the downlink path loss between the base station 101 and the terminal 102, and a path loss 2, which is the downlink path loss between the RRH 103 and the terminal 102.

The first reference signal configuration is directed to antenna ports 15, 16, 17, and 18. Accordingly, Rank information (RI: Rank Indication), precoding information (PMI: Precoding Matrix Indicator), and channel quality information (CQI: Channel Quality Indicator) based on the first reference signal configuration are notified and are used for the precoding of the UE-specific reference signal and data signal and for the modulation and coding scheme (MCS) of the data signal. In contrast, measurement and reporting of the received signal power are performed for antenna port 19 for the channel-state information reference signal as the measurement target configured in the third reference signal configuration. In the communication system, accordingly, it is possible to configure an antenna port (or measurement target) on which the received power (and path loss) is measured, separately from an antenna port on which communication is actually taking place in the downlink. For example, the base station 101 can reduce the frequency with which a reference signal for the antenna port used for the measurement of only the received power is transmitted, compared to a reference signal for the antenna port on which communication is taking place in the downlink, and can suppress an increase in the system overhead for reference signals.

Furthermore, if the received signal power at antenna port 19 for the channel-state information reference signal increases (i.e., the path loss between the RRH 103 and a terminal decreases), the base station 101 can reconfigure the channel-state information reference signal configured in the first reference signal configuration to an antenna port allocated to the RRH 103. Accordingly, a downlink signal can be transmitted from an appropriate transmission point (i.e., the base station 101 or the RRH 103). In another point of view, while antenna ports 15, 16, 17, and 18 for the channel-state information reference signal configured in the first reference signal configuration can be used for signal transmission in the downlink, the path loss determined from antenna port 19 for the channel-state information reference signal configured in the third reference signal configuration can also be used for signal transmission in the uplink. This enables the terminal 102 to receive a downlink signal from the base station 101 via the downlink 105 and to transmit an uplink signal to the RRH 103 using the uplink 108. In this manner, a first reference signal configuration for configuring a measurement target for calculating CSI feedback including at least one of CQI, PMI, and RI, and a third reference signal configuration for configuring a measurement target for calculating a received signal power are configured. In addition, at least some of the resources configured in the third reference signal configuration are not included in the resources configured in the first reference signal configuration. Accordingly, the communication system can be flexibly designed such that the destinations of the downlink signal and the uplink signal are changed.

In another point of view, it is assumed that the cell-specific reference signals illustrated in FIG. 2 are transmitted only from the base station 101 using the downlink 105. It is also assumed that the measurement target configured in the second measurement target configuration and second report configuration configured in step S403 in FIG. 4 is the channel-state information reference signals illustrated in FIG. 3, and that, for this measurement target, the channel-state information reference signals have been transmitted only from the RRH 103 using the downlink 107. It is further assumed that the base station 101 and the RRH 103 are carrying out carrier aggregation, and are performing communication using two carrier components (Carrier Component, CC, Cell, cell) having different center frequencies for uplink and downlink. These carrier components are called a first carrier component and a second carrier component, and the base station 101 and the RRH 103 are assumed to be capable of individual communication and coordinated communication by using these carrier components. In this case, the terminal 102 sets up a connection with the base station 101 using the first carrier component.

At the same time, a measurement target is measured in accordance with parameters related to predetermined first measurement. The measurement target is antenna port 0 for the cell-specific reference signal of a connected cell. At the same time, parameters related to third measurement and third report are configured, and a measurement target is measured. The measurement target is antenna port 0 for the cell-specific reference signal of an unconnected cell. Then, in step S407 in FIG. 4, the terminal 102 reports the first measurement report illustrated in FIG. 19 to the base station 101. That is, the received power on antenna port 0 for the cell-specific reference signal of the connected cell described above and the received power on antenna port 0 for the cell-specific reference signal of the unconnected cell described above are reported to the base station 101 via the first measurement report. Meanwhile, after the connection to the first carrier component (i.e., primary cell), a second measurement configuration for the first carrier component is configured individually using the dedicated physical configuration, or a second measurement configuration for the second carrier component is configured when a second carrier component (i.e., secondary cell) is added (when the dedicated physical configuration for SCell is configured).

More specifically, whereas the third measurement target configuration allows the terminal 102 to measure antenna port 0 for the cell-specific reference signal of an unconnected cell and to report the measurement result to the base station 101, the second measurement configuration and the second measurement report allow the terminal 102 to measure a configured antenna port of a channel-state information reference signal of a connected cell and to report the measurement result to the base station 101 via the second measurement report. Accordingly, the terminal 102 and the base station 101 can search for an optimum base station 101 and cell by only using the third measurement target configuration, the third report configuration, and the first measurement report, and can search for an optimum transmission point (for example, the base station 101 or the RRH 103) or measure the path loss on the basis of the first measurement target configuration and second measurement target configuration. The term connected cell, as used herein, refers to a cell with parameters configured using RRC signals, that is, the primary cell (e.g., first carrier component) or the secondary cell (e.g., second carrier component), and the term unconnected cell refers to a cell with no parameters configured using RRC signals, such as a neighbouring cell.

Third Embodiment

A third embodiment will now be described. The description of the third embodiment will be directed to the processing of step S408 to step S409 in FIG. 4 in detail. Particularly, the processing of a communication system in a case where parameters related to a plurality of types of uplink power control are configured will be described in detail. Here, in particular, a path loss (first path loss) is set on the basis of information concerning the first measurement target configuration and information concerning the uplink power control related parameter configuration, and a first uplink transmit power is set on the basis of the first path loss and the information concerning the uplink power control related parameter configuration. Furthermore, the terminal 102 sets a path loss (second path loss) on the basis of information concerning the second measurement target configuration and the information concerning the uplink power control related parameter configuration, and sets a second uplink transmit power on the basis of the second path loss and the information concerning the uplink power control related parameter configuration. That is, the information concerning the first measurement target configuration, the information concerning the second measurement target configuration, the first uplink transmit power, and the second uplink transmit power are implicitly (fixedly) configured.

An uplink transmit power computation method will be described. The terminal 102 determines the PUSCH uplink transmit power in a subframe i in a serving cell c using formula (1).

[Math. 1]

$$P_{PUSCH,c}(i) = \min\begin{cases} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases} \quad (1)$$

PCMAX,c denotes the maximum transmit power in the serving cell c. MPUSCH,c denotes the transmission bandwidth (the number of resource blocks in the frequency domain) of the serving cell c. PO_PUSCH,c denotes the nominal power of the PUSCH in the serving cell c. PO_PUSCH,c is determined from PO_NOMINAL_PUSCH,c and PO_UE_PUSCH,c. PO_NOMINAL_PUSCH,c is a cell-specific parameter related to uplink power control. PO_UE_PUSCH,c is a UE-specific parameter related to uplink power control. α is an attenuation coefficient (channel loss compensation coefficient) used for the fractional transmit power control of the entire cell. PLc is a path loss which is determined from the reference signal transmitted at known power and from the RSRP. In the present invention, PLc may be a computational result of the path loss determined in the first embodiment or the second embodiment. ΔTF,c is determined using formula (2).

[Math. 2]

$$\Delta_{TF,c}(i) = 10 \log_{10}((2^{BPRE \cdot K_s} - 1) \cdot \beta_{offset}^{PUSCH}) \quad (2)$$

BPRE denotes the number of bits that can be allocated to the resource element. Ks is a parameter related to uplink power control which is notified by the higher layer using RRC signals, and is a parameter dependent on the modulation and coding scheme (MCS) of the uplink signal (deltaMCS-Enabled). In addition, fc is determined from accumulation-enabled, which is a parameter related to uplink power control, and a TPC command included in the uplink grant (i.e., PUSCH power control adjustment state).

The terminal 102 determines the PUCCH uplink transmit power in the subframe i using formula (3).

[Math. 3]

$$P_{PUCCH}(i) = \min\begin{cases} P_{CMAX,c}(i), \\ P_{O\_PUCCH} + PL_c + h(n_{CQI}, n_{HARQ}, n_{SR}) + \\ \Delta_{F\_PUCCH}(F) + \Delta_{TxD}(F') + g(i) \end{cases} \quad (3)$$

PO_PUCCH denotes the nominal power of the PUCCH. PO_PUCCH is determined from PO_NOMINAL_PUCCH and PO_UE_PUCCH. PO_NOMINAL_PUCCH is a cell-specific parameter related to uplink power control. PO_UE_PUCCH is a UE-specific parameter related to uplink power control. nCQI denotes the number of bits of the CQI, nHARQ denotes the number of bits of the HARQ, and nSR denotes the number of bits of the SR. h(nCQI, nHARQ, nSR) is a parameter defined to be dependent on the respective numbers of bits, that is, PUCCH format. ΔF_PUCCH is a parameter notified by the higher layer (deltaFList-PUCCH). ΔTxD is a parameter notified by the higher layer in a case where transmit diversity is configured. g is a parameter used to adjust PUCCH power control (i.e., PUCCH power control adjustment state).

The terminal 102 determines the SRS uplink transmit power using formula (4).

[Math. 4]

$$P_{SRS,c}(i) = \min\{P_{CMAX,c}(i), P_{SRS\_OFFSET,c}(m) + 10 \log_{10}(M_{SRS,c}) + P_{O\_PUSCH,c}(j) + \alpha_c(j) \cdot PL_c + f_c(i)\} \quad (4)$$

PSRS_OFFSET is an offset for adjusting the SRS transmit power, and may be configured as the uplink power control parameters (uplink power control related UE-specific parameter configuration). MSRS,c denotes the bandwidth (the number of resource blocks in the frequency domain) of the SRS arranged in the serving cell c.

Figure 22:
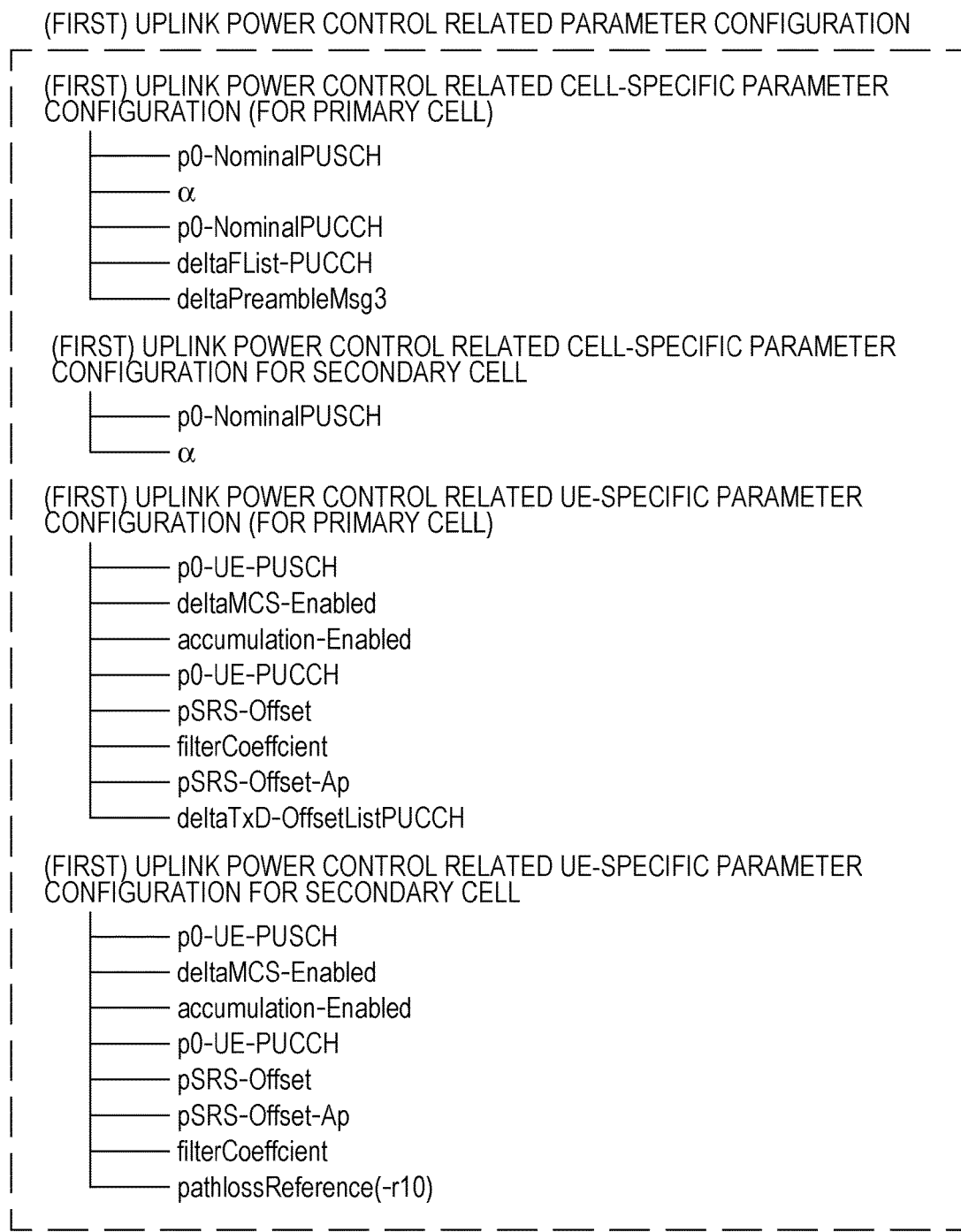
FIG. 22 is a diagram illustrating an example of the details of an uplink power control related parameter configuration.

FIG. 22 is a diagram illustrating an example of information elements included in the (first) uplink power control related parameter configuration (UplinkPowerControl). The uplink power control related parameter configuration includes a common configuration (uplink power control related cell-specific parameter configuration (UplinkPowerControlCommon)) and a dedicated configuration (uplink power control related UE-specific parameter configuration (UplinkPowerControlDedicated)), and each configuration includes parameters related to uplink power control (information elements) configured to be cell-specific or UE-specific. The cell-specific configuration includes nominal PUSCH power (p0-NominalPUSCH), which is cell-specific configurable PUSCH power, an attenuation coefficient (channel loss compensation coefficient) α (alpha) for fractional transmit power control, nominal PUCCH power (p0-NominalPUCCH), which is cell-specific configurable PUCCH power, ΔF_PUCCH (deltaFList-PUCCH) included in formula (3), and a power adjustment value (deltaPreambleMsg3) in a case where preamble message 3 is transmitted.

The UE-specific configuration includes UE-specific PUSCH power (p0-UE-PUSCH), which is UE-specific configurable PUSCH power, a parameter (deltaMCS-Enabled) related to the power adjustment value Ks based on the modulation and coding scheme, which is used in formula (2), a parameter (accumulationEnabled) related to a TPC command, UE-specific PUCCH power (p0-UE-PUCCH), which is UE-specific configurable PUCCH power, a power offset PSRS_OFFSET of the periodic and aperiodic SRS (pSRS-Offset, pSRS-OffsetAp-r10), and a filter coefficient (filterCoefficient) of the reference signal received power RSRP. These configurations are configurable for a primary cell, and may be also configurable for a secondary cell in a similar manner. The dedicated configuration for the secondary cell further includes a parameter (pathlossReference-r10) specifying the computation of a path loss using a path loss measurement reference signal for the primary cell or secondary cell (for example, a cell-specific reference signal).

Figure 23:
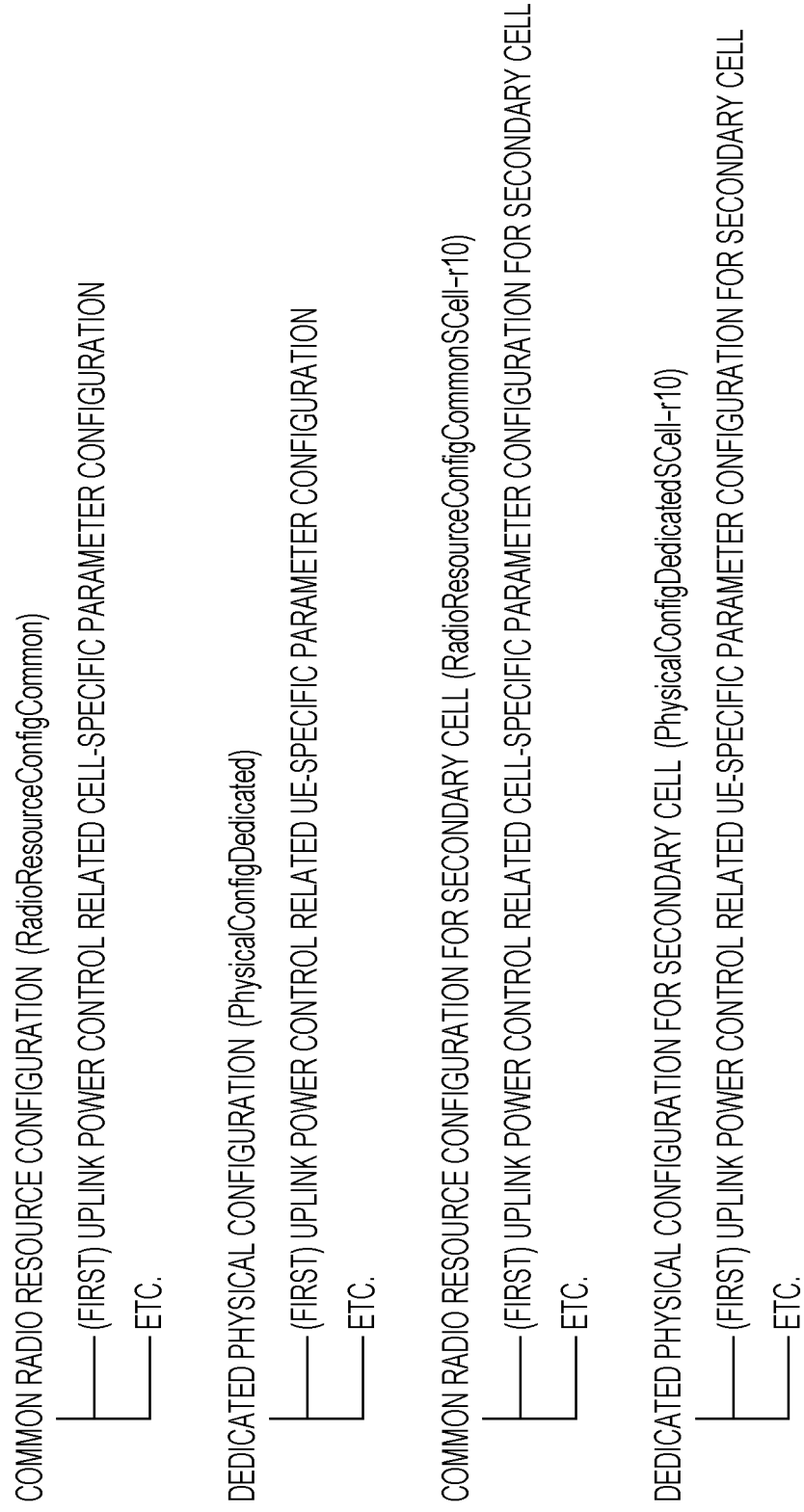
FIG. 23 is a diagram illustrating another example of the details of an uplink power control related parameter configuration.

FIG. 23 illustrates an example of information including an uplink power control related parameter configurations (first uplink power control related parameter configuration). A (first) uplink power control related cell-specific parameter configuration (UplinkPowerControlCommon1) is included in a common radio resource configuration (RadioResourceConfigCommon). A (first) uplink power control related UE-specific parameter configuration (UplinkPowerControlDedicated1) is included in a dedicated physical configuration (PhysicalCofigDedicated). A (first) uplink power control related cell-specific parameter configuration (UplinkPowerControlCommonSCell-r10-1) is included in a common radio resource configuration for the secondary cell (RadioResourceConfigCommonSCell-r10). A (first) uplink power control related UE-specific parameter configuration for the secondary cell (UplinkPowerControlDedicatedS-Cell-r10-1) is included in a dedicated physical configuration for the secondary cell (PhysicalConfigDedicatedSCell-r10).

A dedicated physical configuration (for the primary cell) is included in a dedicated radio resource configuration (for the primary cell) (RadioResourceCofigDedicated). A dedicated physical configuration for the secondary cell is included in a dedicated radio resource configuration for the secondary cell (RadioResourceConfigDedicatedSCell-r10). The common radio resource configuration and the dedicated radio resource configuration, described above, may be included in the RRC connection reconfiguration (RRCConnectionReconfiguration) or RRC re-establishment (RRCConnectionReestablishment) described in the second exemplary embodiment. The common radio resource configuration for the secondary cell and the dedicated radio resource configuration for the secondary cell, described above, may be included in the SCell addition/modification list described in the second exemplary embodiment.

The common radio resource configuration and the dedicated radio resource configuration, described above, may be configured for each terminal using RRC signals (e.g., dedicated signaling). The RRC connection reconfiguration and the RRC re-establishment may be configured for each terminal 102 using RRC messages. The uplink power control related cell-specific parameter configuration described above may be configured in the terminal 102 using system information. The uplink power control related UE-specific parameter configuration described above may be configured for each terminal 102 using RRC signals (e.g., dedicated signaling).

In the third embodiment, the terminal 102 can set the uplink transmit power (PPUSCH1, PPUCCH1, PSRS1) for a variety of uplink signals (PUSCH, PUCCH, SRS) on the basis of the first measurement target configuration and second measurement target configuration described in the first embodiment and second embodiment. The variety of uplink signals may also be a plurality of types of uplink physical channels. The variety of uplink physical channels include at least one uplink physical channel among the pieces of uplink control information (CQI, PMI, RI, Ack/Nack) included in PUSCH, PUCCH, UL DMRS, SRS, PRACH, and PUCCH.

In the third embodiment, the base station 101 notifies the terminal 102 of the first measurement target configuration, the second measurement target configuration, and the uplink power control related parameter configuration. In an example, the terminal 102 computes a path loss (first path loss) in accordance with the notified information on the basis of the first measurement target configuration and the uplink power control related parameter configuration, and computes a first uplink transmit power on the basis of the first path loss and the uplink power control related parameter configuration. The terminal 102 also computes a path loss (second path loss) on the basis of the second measurement target configuration and the uplink power control related parameter configuration, and computes a second uplink transmit power on the basis of the second path loss and the uplink power control related parameter configuration. That is, the first uplink transmit power may be computed on the basis of the measurement target notified using the first measurement target configuration, and the second uplink transmit power may be computed on the basis of the measurement target notified using the second measurement target configuration.

More specifically, the first uplink transmit power may be computed on the basis of antenna port 0 for the cell-specific reference signal as the measurement target notified using the first measurement target configuration, and the second uplink transmit power may be computed on the basis of a specified resource (or antenna port) of the channel-state information reference signal as the measurement target notified using the second measurement target configuration. In another example, in a case where a plurality of measurement targets (for example, a plurality of specified resources or antenna ports for the channel-state information reference signal) are specified in the second measurement target configuration, notification as to whether to compute the second uplink transmit power using one of the measurement targets may be given.

In this case, a path loss reference resource, which will be described below with reference to FIG. 24, may be configured in the first uplink power control related cell-specific parameter configuration, the first uplink power control related cell-specific parameter configuration for the secondary cell, the first uplink power control related UE-specific parameter configuration, or the first uplink power control related UE-specific parameter configuration for the secondary cell illustrated in FIG. 22. In another example, the first uplink transmit power may be computed on the basis of antenna port 0 (or antenna ports 0 and 1) for the cell-specific reference signal regardless of the first measurement target configuration. Furthermore, the terminal 102 may perform control to determine whether to transmit an uplink signal at the first uplink transmit power described above or to transmit an uplink signal at the second uplink transmit power described above, in accordance with the frequency resource or the timing in which the uplink grant has been detected.

In this manner, the first uplink transmit power and second uplink transmit power may be fixedly associated with the first measurement target configuration and second measurement target configuration (and the measurement targets specified in the measurement target configurations).

In a more specific example, in a case where carrier aggregation, which allows communication using a plurality of carrier components (here, two carrier components), is possible, the first measurement target configuration or second measurement target configuration may be associated with a carrier component. That is, the first measurement target configuration may be associated with the first carrier component, and the second measurement target configuration may be associated with the second carrier component. In a case where the first carrier component is configured for the primary cell and the second carrier component is configured for the secondary cell, the first measurement target configuration may be associated with the primary cell and the second measurement target configuration may be associated with the secondary cell.

That is, the base station 101 may configure the first measurement target configuration and second measurement target configuration on a cell-by-cell basis. In a case where the uplink grant has been detected from the primary cell, the terminal 102 computes a first path loss and a first uplink transmit power from the first measurement target configuration, the uplink power control related cell-specific parameter configuration for the primary cell, and the uplink power control related UE-specific parameter configuration for the primary cell. In a case where the uplink grant has been detected from the secondary cell, the terminal 102 computes a second path loss and a second uplink transmit power from the second measurement target configuration, the uplink power control related cell-specific parameter configuration for the secondary cell, and the uplink power control related UE-specific parameter configuration for the secondary cell.

In another aspect, for example, if a terminal 102 that communicates with the base station 101 is represented by terminal A and a terminal 102 that communicates with the RRH 103 is represented by terminal B, dynamic uplink signal transmission control for the terminal A is performed only in the primary cell, and dynamic uplink signal transmission control for the terminal B is performed only in the secondary cell. More specifically, in order to cause the terminal 102 to transmit an uplink signal to the base station 101, the base station 101 notifies the terminal 102 of an uplink grant that is included in the primary cell. In order to cause the terminal 102 to transmit an uplink signal to the RRH 103, the base station 101 notifies the terminal 102 of an uplink grant that is included in the secondary cell. In addition, the base station 101 can utilize a TPC command, which is a correction value for uplink signal transmit power control included in the uplink grant, to perform uplink signal transmit power control for the base station 101 or the RRH 103.

The base station 101 configures a TPC command value included in the uplink grant so as to be suitable for the base station 101 or the RRH 103 in accordance with the cell (carrier component, component carrier) in which the base station 101 notifies the terminal 102 of the uplink grant. More specifically, in order to increase the uplink transmit power for the base station 101, the base station 101 sets the power correction value of the TPC command in the primary cell to be high. In order to decrease the uplink transmit power for the RRH 103, the base station 101 sets the power correction value of the TPC command in the secondary cell to be low. The base station 101 performs uplink signal transmission and uplink transmit power control for the terminal A using the primary cell, and performs uplink signal transmission and uplink transmit power control for the terminal B using the secondary cell. More specifically, the base station 101 performs inter-cell uplink transmit power control by setting the power correction value of the TPC command (transmit power control command) in the primary cell to a first value and setting the power correction value of the TPC command in the secondary cell to a second value. The base station 101 may set the first value to be higher than the second value in terms of power correction value. That is, the base station 101 may perform power control based on TPC commands independently for each cell.

By way of example, a downlink subframe is considered to be divided into a first subset and a second subset. If an uplink grant is received in subframe n (n is a natural number), the terminal 102 transmits an uplink signal in subframe n+4. Accordingly, an uplink subframe is naturally considered to be divided into a first subset and a second subset. For example, if downlink subframes 0 and 5 are included in the first subset and downlink subframes 1, 2, 3, 4, 6, 7, 8, and 9 are included in the second subset, naturally, uplink subframes 4 and 9 are included in the first subset and uplink subframes 1, 2, 3, 5, 6, 7, and 8 are included in the second subset. In this case, if the first subset includes the downlink subframe index in which the uplink grant has been detected, the terminal 102 computes a first path loss and a first uplink transmit power on the basis of the first measurement target configuration and the uplink power control related parameter configuration. If the second subset includes the downlink subframe index in which the uplink grant has been detected, the terminal 102 computes a second path loss and a second uplink transmit power on the basis of the second measurement target configuration and the uplink power control related parameter configuration. That is, the terminal 102 can perform control to determine whether to transmit an uplink signal at the first uplink transmit power or to transmit an uplink signal at the second uplink transmit power in accordance with whether the first subset or the second subset includes the downlink subframe in which the uplink grant has been detected.

The first subset may be composed of downlink subframes including a P-BCH (Physical Broadcast Channel), a PSS (Primary Synchronization Signal), and an SSS (Secondary Synchronization Signal). The second subset may be composed of subframes not including a P-BCH, a PSS, or an SSS.

In another aspect, for example, if a terminal 102 that communicates with the base station 101 is represented by terminal A and a terminal 102 that communicates with the RRH 103 is represented by terminal B, dynamic uplink signal transmission control for the terminal A is performed only in the first subframe subset, and dynamic uplink signal transmission control for the terminal B is performed only in the second subframe subset. More specifically, in order to cause the terminal 102 to transmit an uplink signal to the base station 101, the base station 101 notifies the terminal 102 of an uplink grant that is included in the first subframe subset. In order to cause the terminal 102 to transmit an uplink signal to the RRH 103, the base station 101 notifies the terminal 102 of an uplink grant that is included in the second subframe subset. In addition, the base station 101 can utilize a TPC command, which is a correction value for uplink signal transmit power control included in the uplink grant, to perform uplink signal transmit power control for the base station 101 or the RRH 103. The base station 101 configures a TPC command value included in the uplink grant so as to be suitable for the base station 101 or the RRH 103 in accordance with the subframe subset in which the base station 101 notifies the terminal 102 of the uplink grant.

More specifically, in order to increase the uplink transmit power for the base station 101, the base station 101 sets the power correction value of the TPC command in the first subframe subset to be high. In order to decrease the uplink transmit power for the RRH 103, the base station 101 sets the power correction value of the TPC command in the second subframe subset to be low. The base station 101 performs uplink signal transmission and uplink transmit power control for the terminal A using the first subframe subset, and performs uplink signal transmission and uplink transmit power control for the terminal B using the second subframe subset. More specifically, the base station 101 performs inter-cell uplink transmit power control by setting the power correction value of the TPC command (transmit power control command) in the first subframe subset to a first value and setting the power correction value of the TPC command in the second subframe subset to a second value. The base station 101 may set the first value to be higher than the second value in terms of power correction value. That is, the base station 101 may perform power control based on TPC commands independently for each subframe subset.

By way of example, in a case where the physical downlink control channel (uplink grant) has been detected in the first control channel region, the terminal 102 sets a first path loss and a first uplink transmit power on the basis of information concerning the first measurement target configuration and information concerning the uplink power control related parameter configuration. In a case where the physical downlink control channel (uplink grant) has been detected in the second control channel region, the terminal 102 sets a second path loss and a second uplink transmit power on the basis of information concerning the second measurement target configuration and information concerning the uplink power control related parameter configuration. That is, the terminal 102 can perform control to determine whether to transmit an uplink signal at the first uplink transmit power or to transmit an uplink signal at the second uplink transmit power in accordance with the control channel region in which the physical downlink control channel has been detected.

In another aspect, for example, if a terminal 102 that communicates with the base station 101 is represented by terminal A and a terminal 102 that communicates with the RRH 103 is represented by terminal B, dynamic uplink signal transmission control for the terminal A is performed only in the first control channel (PDCCH) region, and dynamic uplink signal transmission control for the terminal B is performed only in the second control channel (X-PDCCH) region. More specifically, in order to cause the terminal 102 to transmit an uplink signal to the base station 101, the base station 101 notifies the terminal 102 of an uplink grant that is included in the first control channel region. In order to cause the terminal 102 to transmit an uplink signal to the RRH 103, the base station 101 notifies the terminal 102 of an uplink grant that is included in the second control channel region. In addition, the base station 101 can utilize a TPC command, which is a correction value for uplink signal transmit power control included in the uplink grant, to perform uplink signal transmit power control for the base station 101 or the RRH 103.

The base station 101 configures a TPC command value included in the uplink grant so as to be suitable for the base station 101 or the RRH 103 in accordance with the control channel region in which the base station 101 notifies the terminal 102 of the uplink grant. More specifically, in order to increase the uplink transmit power for the base station 101, the base station 101 sets the power correction value of the TPC command in the first control channel region to be high. In order to decrease the uplink transmit power for the RRH 103, the base station 101 sets the power correction value of the TPC command in the second control channel region to be low. The base station 101 performs uplink signal transmission and uplink transmit power control for the terminal A using the first control channel region, and performs uplink signal transmission and uplink transmit power control for the terminal B using the second control channel. More specifically, the base station 101 performs inter-cell uplink transmit power control by setting the power correction value of the TPC command (transmit power control command) in the first control channel region to a first value and setting the power correction value of the TPC command in the second control channel region to a second value. The base station 101 may set the first value to be higher than the second value in terms of power correction value. That is, the base station 101 may perform power control based on TPC commands independently for each control channel region.

In the third embodiment, furthermore, the base station 101 notifies the terminal 102 of a radio resource control signal including the first measurement target configuration and second measurement target configuration, and notifies the terminal 102 of a radio resource control signal including the uplink power control related parameter configuration. The terminal 102 computes a first path loss and a first uplink transmit power on the basis of the first measurement target included in the first measurement target configuration and the uplink power control related parameter configuration, and computes a second path loss and a second uplink transmit power on the basis of the second measurement target included in the second measurement target configuration and the uplink power control related parameter configuration. The terminal 102 transmits an uplink signal to the base station 101 at the first uplink transmit power or second uplink transmit power.

Now referring to FIG. 1, it is assumed that the base station 101 and the RRH 103 are carrying out carrier aggregation, and are performing communication using two carrier components (Carrier Component, CC, Cell, cell) having different center frequencies for uplink and downlink. These carrier components are called a first carrier component and a second carrier component, and the base station 101 and the RRH 103 are assumed to be capable of individual communication and coordinated communication by using these carrier components. It is also assumed that the first carrier component is used for communication between the base station 101 and the terminal 102 and the second carrier component is used for communication between the RRH 103 and the terminal 102. That is, the downlink 105 or the uplink 106 is connected using the first carrier component, and the downlink 107 or the uplink 108 is connected using the second carrier component.

In this case, in a case where the uplink grant has been detected from the downlink 105 via the first carrier component, the terminal 102 can perform transmission to the uplink 106 at the first uplink transmit power using the first carrier component. In a case where the uplink grant has been detected from the downlink 107 via the second carrier component, the terminal 102 can perform transmission to the uplink 108 at the second uplink transmit power using the second carrier component. If the detected uplink grant includes a carrier indicator, the terminal 102 may calculate a path loss and an uplink transmit power using a path loss reference resource associated with the carrier (e.g., cell, primary cell, secondary cell, serving cell index) indicated by the carrier indicator.

Furthermore, the base station 101 schedules different carrier components for a terminal 102 that communicates with the base station 101 and a terminal 102 that communicates with the RRH 103, and configures the first measurement target configuration or second measurement target configuration for each of the carrier components. Accordingly, the base station 101 can implement control to perform appropriate uplink transmit power control for the terminal 102.

Now referring to FIG. 1, an uplink subframe subset in which the terminal 102 transmits an uplink signal to the base station 101, and an uplink subframe subset in which the terminal 102 transmits an uplink signal to the RRH 103 are configured. That is, the terminal 102 is controlled to transmit an uplink signal to the base station 101 at timing different from that at which the terminal 102 transmits an uplink signal to the RRH 103 so as to avoid the uplink signal transmitted from the terminal 102 from causing interference to reception at other terminals 102. It is assumed that the subframe subset in which an uplink signal is transmitted to the base station 101 is represented by a first subset and that the subframe subset in which an uplink signal is transmitted to the RRH 103 is represented by a second subset. In this case, the terminal 102 implements transmission in the uplink 106 using the first subset, and transmission in the uplink 108 using the second subset. In order to transmit an uplink signal using the first subset, the terminal 102 computes a first path loss and a first uplink transmit power using the first measurement target configuration and the uplink power control related parameter configuration. In order to transmit an uplink signal using the second subset, the terminal 102 computes a second path loss and computes a second uplink transmit power using the second measurement target configuration and the uplink power control related parameter configuration.

In addition, the base station 101 makes the timing (subframe subset) of communication between the base station 101 and the terminal 102 different from the timing (subframe subset) of communication between the RRH 103 and the terminal 102, and performs appropriate transmit power control for the respective subsets. Accordingly, the base station 101 can configure an appropriate uplink transmit power for the uplink 106 or the uplink 108 in the terminal 102.

Now referring to FIG. 1, the terminal 102 can determine the timing at which the terminal 102 performs transmission using the uplink 106 or the uplink 108 in response to the detection of the uplink grant, in accordance with whether the control channel region in which the uplink grant has been detected is the first control channel region or the second control channel region. That is, in a case where the uplink grant has been detected in the first control channel region of subframe n, the terminal 102 can transmit an uplink signal to the base station 101 in subframe n+4 at the first uplink transmit power. In a case where the uplink grant has been detected in the second control channel region of subframe n+1, the terminal 102 can transmit an uplink signal to the RRH 103 in subframe n+5 at the second uplink transmit power.

In a case where the uplink grant has been detected in the first control channel region, the terminal 102 can transmit an uplink signal to the uplink 106 at the first uplink transmit power. If the uplink grant has been detected in the second control channel region, the terminal 102 can transmit an uplink signal to the uplink 108 at the second uplink transmit power.

In addition, the base station 101 appropriately schedules the uplink grant in the first control channel region and the second control channel region on the downlinks 105 and 107. Accordingly, the base station 101 can configure an appropriate uplink transmit power for the uplink 106 or the uplink 108 in the terminal 102.

In this manner, the terminal 102 can separate uplink transmission to the base station 101 and uplink transmission to the RRH 103 in accordance with the frequency resource or timing in which the uplink grant is detected. Accordingly, even if terminals having greatly different uplink transmit powers are configured, the terminals 102 can be controlled not to interfere with each other.

(Exemplary Modification 1 of Third Embodiment)

Next, Exemplary Modification 1 of the third embodiment will be described. In Exemplary Modification 1 of the third embodiment, the base station 101 can specify a reference signal (for example, the cell-specific reference signal or the channel-state information reference signal) to be used for the computation of a path loss and a resource (or antenna port) as the measurement target using the information concerning the uplink power control related parameter configuration. The reference signal to be used for the computation of a path loss may be indicated by the information concerning the first measurement target configuration or the information concerning the second measurement target configuration, described in the first embodiment or the second embodiment. The following description will be made of the details of a method for configuring the reference signal to be used for the computation of a path loss and the resource as the measurement target.

It is assumed that the base station 101 and the RRH 103 are carrying out carrier aggregation, and are performing communication using two carrier components (Carrier Component, CC, Cell, cell) having different center frequencies for uplink and downlink. These carrier components are called a first carrier component and a second carrier component, and the base station 101 and the RRH 103 are assumed to be capable of individual communication and coordinated communication by using these carrier components. The base station 101 may configure the first carrier component as the primary cell and configure the second carrier component as the secondary cell. The base station 101 may specify, for the primary cell and the secondary cell, the resource of the reference signal to be used for the computation of a path loss using a path loss reference resource such as an index.

The term path loss reference resource, as used herein, refers to an information element specifying the reference signal to be used (referred to) for the computation of a path loss and specifying the resource (or antenna port) as the measurement target, and refers to a measurement target configured in the first measurement target configuration or second measurement target configuration described in the first embodiment or the second embodiment. Accordingly, the base station 101 may associate the path loss to be used for the calculation of the uplink transmit power with the measurement target (the reference signal and the antenna port index or measurement index) to be used for the computation of the path loss, by using the path loss reference resource. Alternatively, the path loss reference resource may be antenna port index 0 for the cell-specific reference signal or the CSI-RS antenna port (or CSI-RS measurement index) for the channel-state information reference signal described in the first embodiment or the second embodiment. More specifically, if the index specified by the path loss reference resource is 0, the path loss reference resource represents antenna port index 0 for the cell-specific reference signal. If the index is any other value, the path loss reference resource may be associated with the CSI-RS measurement index for the channel-state information reference signal or with the CSI-RS antenna port index.

In addition, the path loss reference resource described above may be associated with the pathlossReference described with reference to FIG. 22. More specifically, in a case where the second carrier component (SCell, secondary cell) is specified by the pathlossReference and the CSI-RS measurement index 1 for the channel-state information reference signal is specified by the path loss reference resource, a path loss may be computed on the basis of the resource corresponding to the CSI-RS measurement index 1 included in the second carrier component, and the uplink transmit power may be calculated. In another example, if the first carrier component (PCell, primary cell) is specified by the pathlossReference and the CSI-RS measurement index 1 for the channel-state information reference signal is specified by the path loss reference resource, a path loss may be computed on the basis of the resource corresponding to the CSI-RS measurement index 1 included in the first carrier component, and the uplink transmit power may be calculated. In addition, in a case where the detected uplink grant includes a carrier indicator, the terminal 102 may calculate a path loss and an uplink transmit power using the path loss reference resource associated with the carrier (cell, primary cell, secondary cell, serving cell index) indicated by the carrier indicator.

In accordance with the foregoing procedure, the terminal 102 can compute a path loss on the basis of the content of the path loss reference resource notified by the base station 101, and can compute the uplink transmit power on the basis of the path loss and the uplink power control related parameter configuration.

Figure 24:
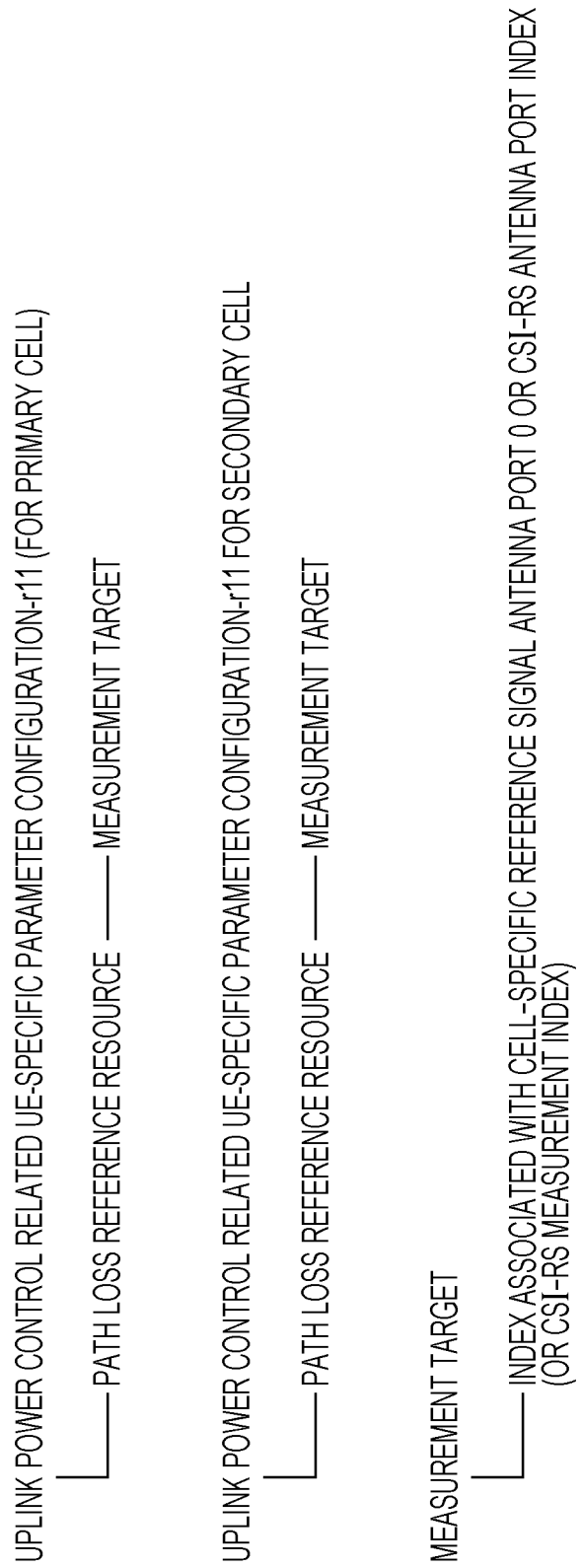
FIG. 24 is a diagram illustrating the details of a path loss reference resource.

FIG. 24 is a diagram illustrating the details of the path loss reference resource. The path loss reference resource is an information element to be added to the uplink power control related UE-specific parameter configuration (for the primary cell) and the uplink power control related UE-specific parameter configuration for the secondary cell. In the path loss reference resource, a downlink reference signal (measurement target) to be used for the measurement of a path loss, which is configured in the measurement target configuration, is specified. The base station 101 can specify the measurement target specified in the measurement target configuration, described in the first embodiment or second embodiment, for the terminal 102 using the path loss reference resource. More specifically, the base station 101 can select a measurement resource for use in path loss measurement for the primary cell (first carrier component, PCell) and the secondary cell (second carrier component, SCell), from the measurement target configured in the measurement target configuration. The terminal 102 can compute a path loss for computing the uplink transmit power in the primary cell and the secondary cell in accordance with the instructions, and can compute the uplink transmit power for the primary cell or the secondary cell on the basis of the path loss and the uplink power control related parameter configuration.

In another aspect, for example, if a terminal 102 that communicates with the base station 101 is represented by terminal A and a terminal 102 that communicates with the RRH 103 is represented by terminal B, dynamic uplink signal transmission control for the terminal A is performed only in the primary cell, and dynamic uplink signal transmission control for the terminal B is performed only in the secondary cell. More specifically, in order to cause the terminal 102 to transmit an uplink signal to the base station 101, the base station 101 transmits a physical downlink control channel (uplink grant) to the terminal 102 using the primary cell. In order to cause the terminal 102 to transmit an uplink signal to the RRH 103, the base station 101 transmits a physical downlink control channel to the terminal 102 using the secondary cell. In addition, the base station 101 can utilize information concerning a TPC command, which is a correction value for uplink signal transmit power control included in the physical downlink control channel, to perform uplink signal transmit power control for the base station 101 or the RRH 103.

The base station 101 configures a TPC command value included in the uplink grant so as to be suitable for the base station 101 or the RRH 103 in accordance with the cell (carrier component, component carrier) in which the base station 101 notifies the terminal 102 of the physical downlink control channel (uplink grant). More specifically, in order to increase the uplink transmit power for the base station 101, the base station 101 sets the power correction value of the TPC command in the primary cell to be high. In order to decrease the uplink transmit power for the RRH 103, the base station 101 sets the power correction value of the TPC command in the secondary cell to be low. The base station 101 performs uplink signal transmission and uplink transmit power control for the terminal A using the primary cell, and performs uplink signal transmission and uplink transmit power control for the terminal B using the secondary cell. More specifically, the base station 101 performs inter-cell uplink transmit power control by setting the power correction value of the TPC command (transmit power control command) in the primary cell to a first value and setting the power correction value of the TPC command in the secondary cell to a second value. The first value and the second value may be set to be different from each other. The base station 101 may set the first value to be higher than the second value in terms of power correction value. That is, the base station 101 may perform power correction using TPC commands independently for each cell.

Figure 25:
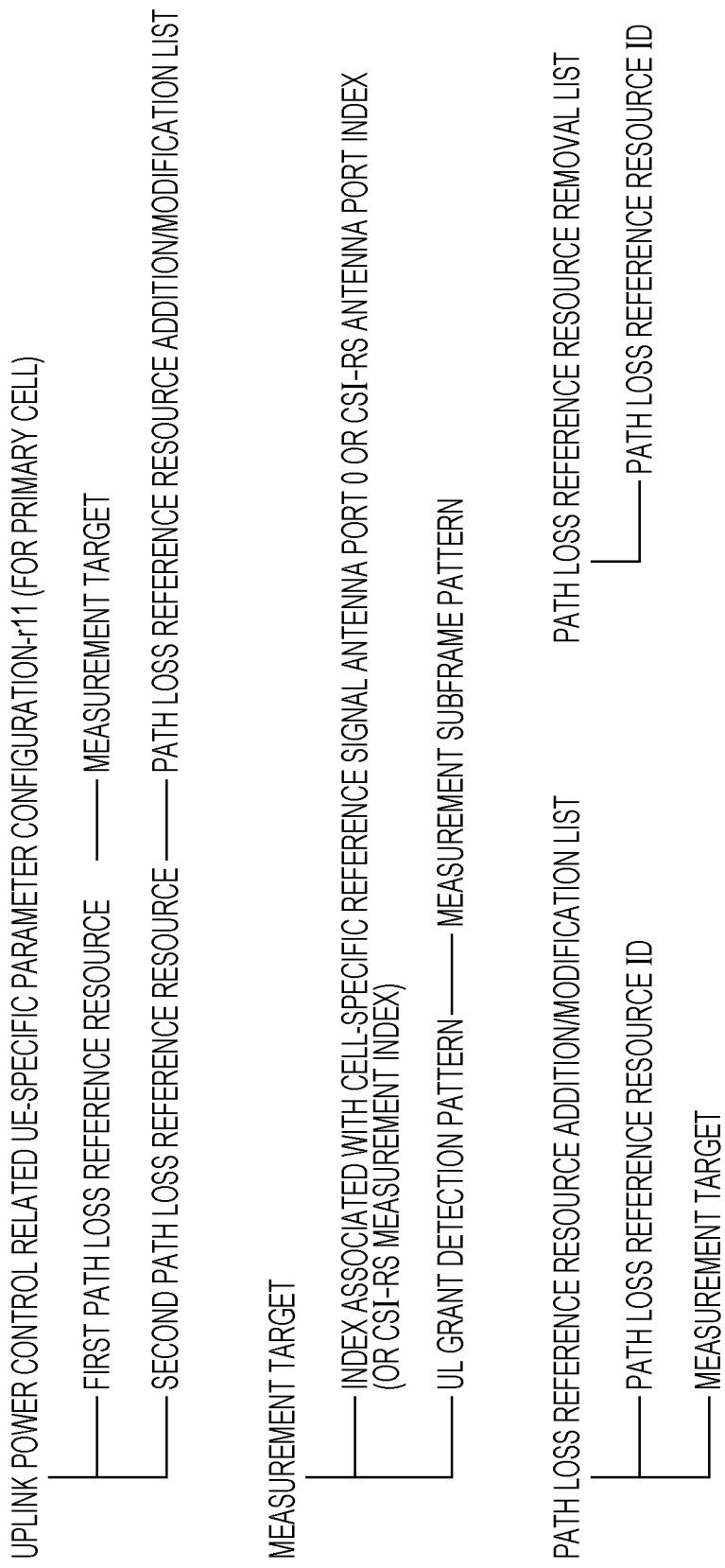
FIG. 25 is a diagram illustrating the details of path loss reference resources based on the timing at which the terminal 102 has detected an uplink grant.

FIG. 25 is a diagram illustrating the details of the path loss reference resource based on the timing at which the terminal 102 detected the physical downlink control channel (uplink grant). The base station 101 can configure two or more path loss reference resources (a first path loss reference resource and a second path loss reference resource) for the terminal 102. The second path loss reference resource is a parameter that can be added at any time using an addition/modification list. The path loss reference resource is associated with the measurement target configured in the measurement target configuration. For example, it is assumed that an uplink grant detection subframe subset (uplink grant detection pattern) is configured in the measurement target and that an uplink grant has been detected in the downlink subframe included in the uplink grant detection pattern. In this case, the terminal 102 computes a path loss using the measurement target associated with the uplink grant detection subframe subset, and computes the uplink transmit power on the basis of the path loss. Specifically, in a case where a plurality of path loss reference resources (a first path loss reference resource and a second path loss reference resource) are configured, the terminal 102 associates the uplink grant detection subframe subset with the path loss reference resources.

More specifically, the first path loss reference resource is associated with the first subframe subset. Also, the second path loss reference resource is associated with the second subframe subset. In addition, the terminal 102 selects a measurement target configuration on which the computation of the uplink transmit power is based from the path loss reference resources, and computes the uplink transmit power on the basis of the path loss computed based on the received signal power of the measurement target specified in the measurement target configuration. In an example, the first path loss reference resource may specify the first measurement target configuration, that is, antenna port 0 for the cell-specific reference signal, and may be transmitted from the base station 101. The second path loss reference resource may specify the second measurement target configuration, that is, antenna port 15 for the channel-state information reference signal, and may be transmitted from the RRH 103. Accordingly, different measurement targets are referred to in accordance with the subframe in which the uplink grant is detected. As a result, in a case where an uplink signal has been detected in the first subframe subset, the transmit power suitable for the base station 101 is configured. In a case where an uplink signal has been detected in the second subframe subset, the transmit power suitable for the RRH 103 is configured. Accordingly, appropriate uplink transmit power control can be performed while the measurement target to be used for the path loss computation is switched at the timing at which the uplink grant is detected.

The second path loss reference resource is a path loss reference resource that can be added from a path loss reference resource addition/modification list. That is, the base station 101 may define a plurality of path loss reference resources for one cell (for example, the primary cell). The base station 101 may instruct the terminal 102 to simultaneously compute path losses for a plurality of path loss reference resources. The base station 101 may add the second path loss reference resource by configuring the path loss reference resource ID and the measurement target using the path loss reference resource addition/modification list, so that the second path loss reference resource can be added at any time. If it is no longer necessary to compute path losses for a plurality of path loss reference resources, the base station 101 may remove an unnecessary path loss reference resource using a path loss reference resource removal list. An example of the method for computing the second path loss in this case will now be given. The second path loss reference resource may specify a plurality of first measurement target configuration or second measurement target configuration, that is, for example, antenna ports 15 and 16 for the channel-state information reference signal, etc., in the path loss reference resource addition/modification list.

In this case, a second path loss may be computed on the basis of the received signal power at antenna ports 15 and 16 for the channel-state information reference signal. In this case, the path loss calculated from antenna port 15 and the path loss calculated from antenna port 16 may be averaged to determine a second path loss, or the larger or smaller one of the two path loss values may be used as a second path loss. Alternatively, the two path losses may be subjected to linear processing to obtain a second path loss. The path losses described above may be calculated from antenna port 0 for the cell-specific reference signal and antenna port 15 for the channel-state information reference signal. In another example, the second path loss reference resource may specify a plurality of second measurement target configurations, that is, antenna ports 15 and 16 for the channel-state information reference signal, etc., in the path loss reference resource addition/modification list. In this case, a second path loss and a third path loss may be computed on the basis of the received signal power at antenna ports 15 and 16 for the channel-state information reference signal. In this case, the first path loss, the second path loss, and the third path loss may be associated with the first subframe subset, the second subframe subset, and the third subframe subset, respectively.

The measurement target included in the first path loss reference resource and second path loss reference resource may be antenna port 0 for the cell-specific reference signal or the CSI-RS antenna port index (CSI-RS measurement index) described in the first embodiment or the second embodiment.

The measurement target may include an uplink grant detection pattern. The uplink grant detection pattern may be implemented using a measurement subframe pattern (MeasSubframePattern-r10) included in the measurement object SUTRA in the measurement object in FIG. 14.

In the foregoing, the measurement target is associated with the uplink grant detection pattern. In another example, the measurement target may include no uplink grant detection pattern, and the measurement target may be associated with the transmission timing of the measurement report. Specifically, the terminal 102 may associate the measurement result of the measurement target with the subframe pattern that the terminal 102 notifies the base station 101 of. In a case where an uplink grant has been detected in the downlink subframe associated with the subframe pattern, the terminal 102 can compute a path loss using the measurement target, and can compute the uplink transmit power.

While a description has been given here of the addition to the uplink power control related UE-specific parameter configuration for the primary cell, a similar configuration may be added for the secondary cell. For the secondary cell, however, since a path loss reference (pathlossReference-r10) is configured, a path loss is computed based on the reference signal included in either the primary cell or the secondary cell. Specifically, if the primary cell is selected, a path loss is computed based on the path loss reference resource in the uplink power control related UE-specific parameter configuration for the primary cell. If the secondary cell is selected, a path loss is computed based on the path loss reference resource in the uplink power control related UE-specific parameter configuration for the secondary cell.

In addition, the path loss reference resource described above may be associated with the path loss reference (pathlossReference-r10). More specifically, if the second carrier component (SCell, secondary cell) is specified in the path loss reference (pathlossReference-r10) and if the CSI-RS measurement index 1 for the channel-state information reference signal is specified in the path loss reference resource, a path loss may be computed on the basis of the resource corresponding to the CSI-RS measurement index 1 included in the second carrier component, and the uplink transmit power may be calculated. In another example, if the first carrier component (PCell, primary cell) is specified in the path loss reference (pathlossReference-r10) and if CSI-RS measurement index 1 for the channel-state information reference signal is specified in the path loss reference resource, a path loss may be computed on the basis of the resource corresponding to the CSI-RS measurement index 1 included in the first carrier component, and the uplink transmit power may be calculated.

In another aspect, for example, if a terminal 102 that communicates with the base station 101 is represented by terminal A and a terminal 102 that communicates with the RRH 103 is represented by terminal B, dynamic uplink signal transmission control for the terminal A is performed only in the first subframe subset, and dynamic uplink signal transmission control for the terminal B is performed only in the second subframe subset. More specifically, in order to cause the terminal 102 to transmit an uplink signal to the base station 101, the base station 101 notifies the terminal 102 of an uplink grant that is included in the first subframe subset. In order to cause the terminal 102 to transmit an uplink signal to the RRH 103, the base station 101 notifies the terminal 102 of an uplink grant that is included in the second subframe subset. In addition, the base station 101 can utilize a TPC command, which is a correction value for uplink signal transmit power control included in the uplink grant, to perform uplink signal transmit power control for the base station 101 or the RRH 103. The base station 101 configures a TPC command value included in the uplink grant so as to be suitable for the base station 101 or the RRH 103 in accordance with the subframe subset in which the base station 101 notifies the terminal 102 of the uplink grant.

More specifically, in order to increase the uplink transmit power for the base station 101, the base station 101 sets the power correction value of the TPC command in the first subframe subset to be high. In order to decrease the uplink transmit power for the RRH 103, the base station 101 sets the power correction value of the TPC command in the second subframe subset to be low. For example, in a case where a plurality of values (a first value, a second value, etc.)

are configured in the TPC command, the base station 101 may perform control to select a first value for the power correction value of the TPC command in the first subframe subset and to select a second value for the power correction value of the TPC command in the second subframe subset in accordance with the communication state. The base station 101 performs uplink signal transmission and uplink transmit power control for the terminal A using the first subframe subset, and performs uplink signal transmission and uplink transmit power control for the terminal B using the second subframe subset. More specifically, the base station 101 performs inter-cell uplink transmit power control by setting the power correction value of the TPC command (transmit power control command) in the first subframe subset to a first value and setting the power correction value of the TPC command in the second subframe subset to a second value. In this case, the base station 101 may set the first value and the second value to different values. The base station 101 may set the first value to be higher than the second value in terms of power correction value. That is, the base station 101 may perform power correction using TPC commands independently for each subframe subset.

Figure 26:
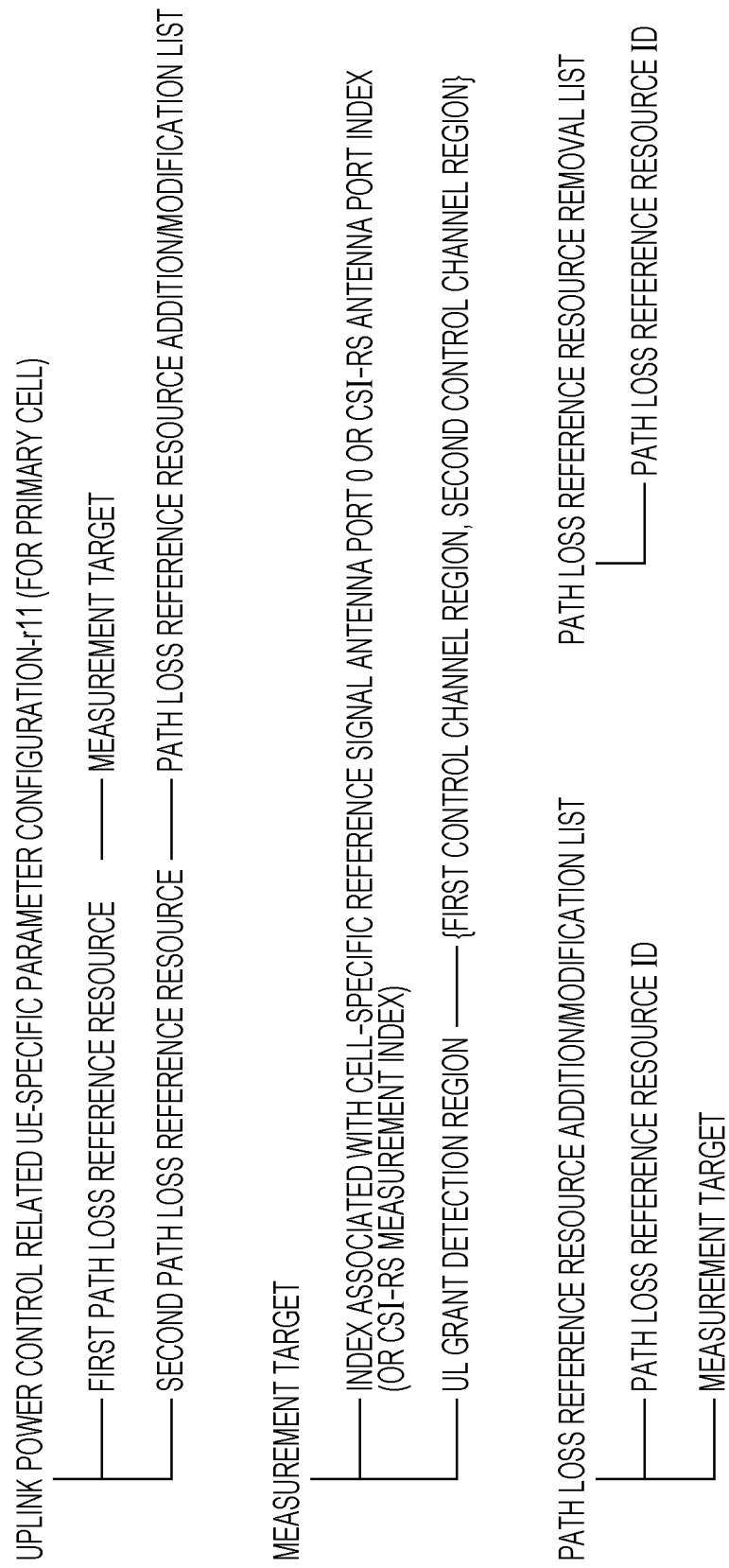
FIG. 26 is a diagram illustrating the details of path loss reference resources based on a control channel region in which the terminal 102 detects an uplink grant.

FIG. 26 is a diagram illustrating the details of the path loss reference resource based on a control channel region in which the terminal 102 detects the uplink grant. As in FIG. 25, the base station 101 may configure two or more path loss reference resources (a first path loss reference resource and a second path loss reference resource) for the terminal 102. The second path loss reference resource is a parameter that can be added at any time using an addition/modification list. The path loss reference resource is associated with the measurement target configured in the measurement target configuration. For example, it is assumed that an uplink grant detection region (a first control channel region and a second control channel region) is configured in the measurement target and that an uplink grant has been detected in the downlink control channel region included in the uplink grant detection region. In this case, the terminal 102 computes a path loss using the measurement target associated with the uplink grant detection region, and computes the uplink transmit power on the basis of the path loss. Specifically, in a case where a plurality of path loss reference resources (a first path loss reference resource and a second path loss reference resource) are configured, the terminal 102 associates the uplink grant detection region with the path loss reference resource.

More specifically, the first path loss reference resource is associated with the first control channel region. Also, the second path loss reference resource is associated with the second control channel region. In addition, the terminal 102 selects a measurement target configuration on which the computation of the uplink transmit power is based from the path loss reference resources, and computes the uplink transmit power on the basis of the path loss computed based on the received signal power of the measurement target specified in the measurement target configuration. Accordingly, the terminal 102 can transmit an uplink signal at the uplink transmit power computed in accordance with the measurement target using the region in which the uplink grant has been detected (i.e., the region in which the physical downlink control channel has been detected). An example of a method for computing the second path loss in a case where a plurality of second measurement target configurations are associated with the second path loss reference resource will further be given. The second path loss reference resource may specify a plurality of first measurement target configuration or second measurement target configuration, that is, for example, antenna ports 15 and 16 for the channel-state information reference signal, etc., in the path loss reference resource addition/modification list. In this case, a second path loss may be computed on the basis of the received signal power at antenna ports 15 and 16 for the channel-state information reference signal.

In this case, the path loss calculated from antenna port 15 and the path loss calculated from antenna port 16 may be averaged to determine a second path loss. Alternatively, the larger or smaller one of the two path loss values may be selected as a second path loss. Alternatively, the two path losses may be subjected to linear processing to obtain a second path loss. As described above, furthermore, antenna port 0 for the cell-specific reference signal and antenna port 15 for the channel-state information reference signal may be used. In another example, the second path loss reference resource may specify a plurality of second measurement target configurations, that is, antenna ports 15 and 16 for the channel-state information reference signal, etc., in the path loss reference resource addition/modification list. In this case, a second path loss and a third path loss may be computed on the basis of the received signal power at antenna ports 15 and 16 for the channel-state information reference signal. In this case, the first path loss, the second path loss, and the third path loss may be associated with the first subframe subset, the second subframe subset, and the third subframe subset, respectively.

The path loss measurement resource may be the cell-specific reference signal antenna port 0 or the CSI-RS antenna port index (CSI-RS measurement index) described in the first embodiment or the second embodiment.

In another aspect, for example, if a terminal 102 that communicates with the base station 101 is represented by terminal A and a terminal that communicates with an RRH is represented by terminal B, dynamic uplink signal transmission control for the terminal A is performed only in the first control channel (PDCCH) region, and dynamic uplink signal transmission control for the terminal B is performed only in the second control channel (X-PDCCH) region. More specifically, in order to cause the terminal 102 to transmit an uplink signal to the base station 101, the base station 101 notifies the terminal 102 of a physical downlink control channel (uplink grant) that is included in the first control channel region. In order to cause the terminal 102 to transmit an uplink signal to the RRH 103, the base station 101 notifies the terminal 102 of a physical downlink control channel (uplink grant) that is included in the second control channel region. In addition, the base station 101 can utilize a TPC command, which is a correction value for uplink signal transmit power control included in the uplink grant, to perform uplink signal transmit power control for the base station 101 or the RRH 103. The base station 101 configures a TPC command value included in the uplink grant so as to be suitable for the base station 101 or the RRH 103 in accordance with the control channel region in which the base station 101 notifies the terminal 102 of the uplink grant.

More specifically, in order to increase the uplink transmit power for the base station 101, the base station 101 sets the power correction value of the TPC command in the first control channel region to be high. In order to decrease the uplink transmit power for the RRH 103, the base station 101 sets the power correction value of the TPC command in the second control channel region to be low. The base station 101 performs uplink signal transmission and uplink transmit power control for the terminal A using the first control channel region, and performs uplink signal transmission and uplink transmit power control for the terminal B using the second control channel. More specifically, the base station 101 performs inter-cell uplink transmit power control by setting the power correction value of the TPC command (transmit power control command) in the first control channel region to a first value and setting the power correction value of the TPC command in the second control channel region to a second value. In this case, the first value and the second value may be set to be different from each other. The base station 101 may set the first value to be higher than the second value in terms of power correction value. That is, the base station 101 may perform power correction using TPC commands independently for each control channel region.

In Exemplary Modification 1 of the third embodiment, the base station 101 transmits a radio resource control signal including information concerning the path loss reference resource and information concerning the uplink power control related parameter configuration to the terminal 102, and transmits a physical downlink control channel (uplink grant) to the terminal 102. The terminal 102 sets a path loss and an uplink transmit power in accordance with the information included in the radio resource control signal on the basis of the information concerning the path loss reference resource and the information concerning the uplink power control related parameter configuration, and transmits an uplink signal to the base station 101 at the uplink transmit power.

In Exemplary Modification 1 of the third embodiment, furthermore, the base station 101 transmits a radio resource control signal including information concerning the first path loss reference resource and/or information concerning the second path loss reference resource and information concerning the uplink power control related parameter configuration to the terminal 102. Further, the terminal 102 sets a first path loss on the basis of the information concerning the first path loss reference resource and the information concerning the uplink power control related parameter configuration, sets a second path loss on the basis of the information concerning the second path loss reference resource and the information concerning the uplink power control related parameter configuration, and sets the uplink transmit power on the basis of the first path loss and/or second path loss and the information concerning the uplink power control related parameter configuration.

In Exemplary Modification 1 of the third embodiment, furthermore, the base station 101 transmits a radio resource control signal including information concerning the primary cell-specific path loss reference resource and/or information concerning the secondary cell-specific path loss reference resource and information concerning the uplink power control related parameter configuration to the terminal 102, and transmits a physical downlink control channel (uplink grant) to the terminal 102. The terminal 102 receives the radio resource control signal including the information concerning the primary cell-specific path loss reference resource and/or the information concerning the secondary cell-specific path loss reference resource and the information concerning the uplink power control related parameter configuration. In a case where the physical downlink control channel (uplink grant) has been detected in the primary cell, the terminal 102 sets a path loss and an uplink transmit power on the basis of the information concerning the primary cell-specific path loss reference resource and the information concerning the uplink power control related parameter configuration. In a case where the physical downlink control channel has been detected in the secondary cell, the terminal 102 sets a path loss and an uplink transmit power on the basis of the information concerning the secondary cell-specific path loss reference resource and the information concerning the uplink power control related parameter configuration. The terminal 102 transmits an uplink signal to the base station 101 at the uplink transmit power set for the cell in which the uplink grant has been detected.

In Exemplary Modification 1 of the third embodiment, furthermore, the base station 101 transmits a radio resource control signal including information concerning the first path loss reference resource and/or information concerning the second path loss reference resource and information concerning the uplink power control related parameter configuration to the terminal 102, and transmits a physical downlink control channel (uplink grant) to the terminal 102. In a case where the physical downlink control channel has been detected in the downlink subframe included in the first subframe subset, the terminal 102 sets a path loss and an uplink transmit power in accordance with the information included in the radio resource control signal on the basis of the information concerning the first path loss reference resource and the information concerning the uplink power control related parameter configuration. In a case where the physical downlink control channel has been detected in the downlink subframe included in the second subframe subset, the terminal 102 sets a path loss and an uplink transmit power on the basis of the information concerning the second path loss reference resource and the information concerning the uplink power control related parameter configuration. The terminal 102 transmits an uplink signal to the base station 101 in the uplink subframe included in the subframe subset at the uplink transmit power.

In Exemplary Modification 1 of the third embodiment, furthermore, in a case where the physical downlink control channel (uplink grant) has been detected in the first control channel region, the terminal 102 sets a first path loss and a first uplink transmit power on the basis of information concerning the first path loss reference resource and information concerning the uplink power control related parameter configuration. In a case where the physical downlink control channel has been detected in the second control channel region, the terminal 102 sets a second path loss and a second uplink transmit power on the basis of the information concerning the second path loss reference resource and the information concerning the uplink power control related parameter configuration. The terminal 102 transmits an uplink signal to the base station 101 at the first uplink transmit power or the second uplink transmit power in accordance with the timing at which the physical downlink control channel was detected.

Now referring to FIG. 1 in more detail, in a case where a plurality of path loss reference resources (a first path loss reference resource and a second path loss reference resource) are configured, the terminal 102 associates the control channel region in which the uplink grant is detected with the path loss reference resources. More specifically, the first path loss reference resource is associated with the first control channel region. Also, the second path loss reference resource is associated with the second control channel region. In addition, the terminal 102 selects a measurement target configuration on which the computation of the uplink transmit power is based from the path loss reference resources, and computes the uplink transmit power on the basis of the path loss based on the received signal power of the measurement target specified in the measurement target configuration. In an example, the first path loss reference resource specifies the first measurement target configuration, that is, antenna port 0 for the cell-specific reference signal, and may be transmitted from the base station 101. The second path loss reference resource specifies the second measurement target configuration, that is, antenna port 15 for the channel-state information reference signal, and may be transmitted from the RRH 103.

Accordingly, different measurement targets are referred to in accordance with the control channel region in which the uplink grant is detected. As a result, in a case where an uplink signal has been detected in the first control channel region, the transmit power suitable for the base station 101 is configured. In a case where an uplink signal has been detected in the second control channel region, the transmit power suitable for the RRH 103 is configured. Accordingly, appropriate uplink transmit power control can be performed while the measurement target to be used for the path loss computation is switched in accordance with the control channel region in which the uplink grant is detected. In addition, referring to different measurement targets in accordance with the control channel region may not need for a base station to notify the terminal 102 of the subframe pattern described above.

In another example, the base station 101 may reconfigure a variety of uplink power control related parameter configurations for the terminal 102 in order to perform appropriate uplink transmit power control for a base station or the RRH 103. In order to perform appropriate uplink transmit power control for transmission to a base station or an RRH, as described above, the base station 101 needs to switch between path loss measurement based on the first measurement target configuration and path loss measurement based on the second measurement target configuration. However, in a case where the terminal 102 performs communication with either a base station or an RRH on the order of several tens to several hundreds of subframes and performs switching semi-statically, the base station 101 can perform appropriate uplink transmit power control by updating the measurement target configuration (first measurement target configuration, second measurement target configuration) described above and the parameter configuration related to the path loss reference resource described above. That is, it is possible to configure appropriate transmit power for the base station 101 or the RRH 103 by configuring only the first path loss reference resources illustrated in FIG. 25 or FIG. 26 and by performing appropriate configuration.

(Exemplary Modification 2 of Third Embodiment)

In Exemplary Modification 2 of the third embodiment, a plurality of uplink power control related parameter configurations are configured, and the terminal 102 can compute the uplink transmit power of a variety of uplink signals (PUSCH, PUCCH, SRS) (PPUSCH, PPUCCH, PSRS) using the respective uplink power control related parameter configurations.

In Exemplary Modification 2 of the third embodiment, the base station 101 configures a plurality of pieces of information concerning uplink power control related parameter configurations (for example, information concerning a first uplink power control related parameter configuration and information concerning a second uplink power control related parameter configuration), and notifies the terminal 102 of the pieces of information. The terminal 102 sets a path loss in accordance with the notified pieces of information on the basis of the information concerning the first uplink power control related parameter configuration, and sets the uplink transmit power on the basis of the path loss and the information concerning the first uplink power control related parameter configuration. The terminal 102 further sets a path loss on the basis of the information concerning the second uplink power control related parameter configuration, and sets the uplink transmit power on the basis of the path loss and the information concerning the second uplink power control related parameter configuration. Here, the uplink transmit power set on the basis of the information concerning the first uplink power control related parameter configuration is represented by a first uplink transmit power, and the uplink transmit power set on the basis of the information concerning the second uplink power control related parameter configuration is represented by a second uplink transmit power.

The terminal 102 performs control to determine whether to transmit an uplink signal at the first uplink transmit power or to transmit an uplink signal at the second uplink transmit power in accordance with the frequency resource and timing in which the physical downlink control channel (uplink grant) has been detected.

Figure 27:
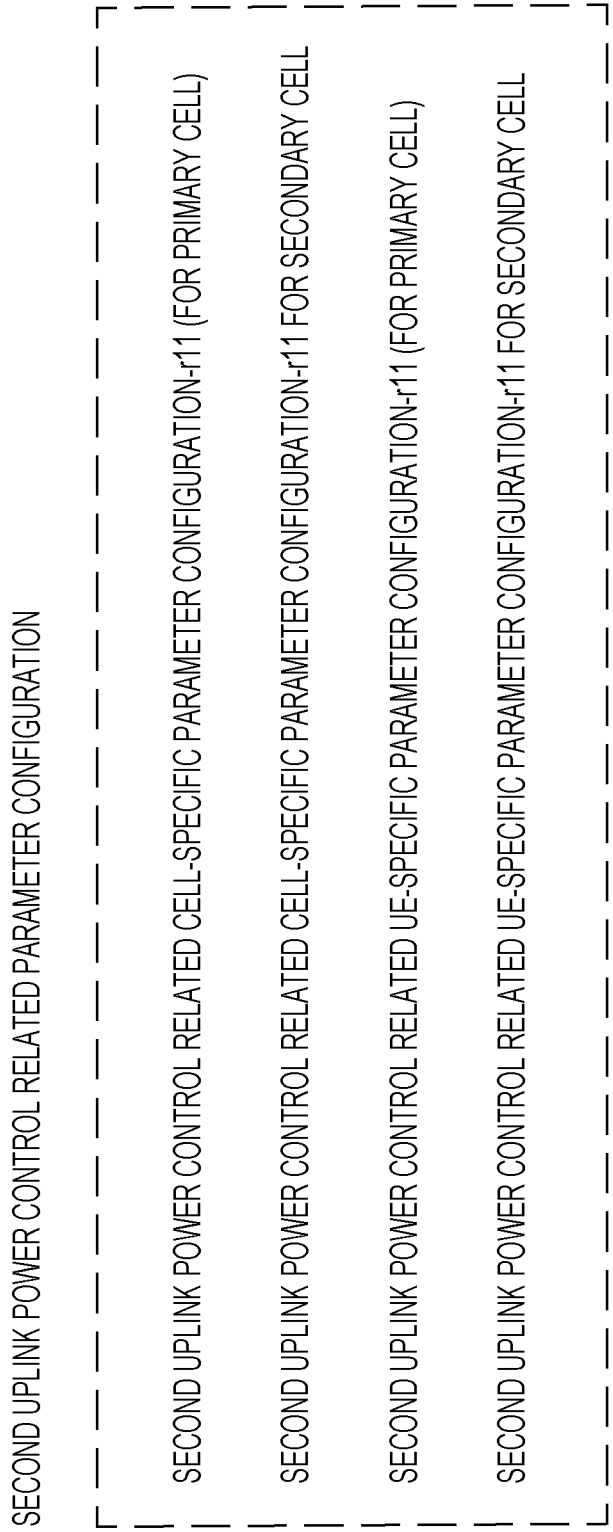
FIG. 27 is a diagram illustrating an example of a second uplink power control related parameter configuration according to this embodiment of the claimed invention.

The base station 101 may individually configure the information elements included in each of the first uplink power control related parameter configuration and the second uplink power control related parameter configuration. A specific description will now be given with reference to, for example, FIGS. 27 to 30. FIG. 27 is a diagram illustrating an example of the second uplink power control related parameter configuration according to this embodiment of the claimed invention. The second uplink power control related parameter configuration is composed of a second uplink power control related cell-specific parameter configuration-r11 (for the primary cell), a second uplink power control related cell-specific parameter configuration-r11 for the secondary cell, a second uplink power control related UE-specific parameter configuration-r11 (for the primary cell), and a second uplink power control related UE-specific parameter configuration-r11 for the secondary cell. The first uplink power control related parameter configuration is similar to that illustrated in FIGS. 22 and 24. In this embodiment of the claimed invention, a first uplink power control related cell-specific parameter configuration-r11 (for the primary cell), a first uplink power control related cell-specific parameter configuration-r11 for the secondary cell, a first uplink power control related UE-specific parameter configuration-r11 (for the primary cell), and a first uplink power control related UE-specific parameter configuration-r11 for the secondary cell may be included.

FIG. 28 is a diagram illustrating an example of the first uplink power control related parameter configuration and the second uplink power control related parameter configuration included in each radio resource configuration. The common radio resource configuration (for the primary cell) includes a first uplink power control related cell-specific parameter configuration (for the primary cell) and a second uplink power control related cell-specific parameter configuration-r11 (for the primary cell). A first uplink power control related cell-specific parameter configuration-r11 (for the primary cell) may also be included. The common radio resource configuration for the secondary cell includes a first uplink power control related cell-specific parameter configuration for the secondary cell and a second uplink power control related cell-specific parameter configuration-r11 for the secondary cell. A first uplink power control related cell-specific parameter configuration-r11 for the secondary cell may also be included. The dedicated physical configuration (for the primary cell) includes a first uplink power control related UE-specific parameter configuration (for the primary cell) and a second uplink power control related UE-specific parameter configuration-r11 (for the primary cell). A first uplink power control related cell-specific parameter configuration-r11 (for the primary cell) may also be included.

The dedicated physical configuration for the secondary cell includes a first uplink power control related UE-specific parameter configuration for the secondary cell and a second uplink power control related UE-specific parameter configuration-r11 for the secondary cell. A first uplink power control related UE-specific parameter configuration-r11 for the secondary cell may also be included. In addition, the dedicated physical configuration (for the primary cell) is included in a dedicated radio resource configuration (for the primary cell) (RadioResourceCofigDedicated). In addition, the dedicated physical configuration for the secondary cell is included in a dedicated radio resource configuration for the secondary cell (RadioResourceConfigDedicatedSCell-r10). The common radio resource configuration and the dedicated radio resource configuration, described above, may be included in the RRC connection reconfiguration (RRCConnectionReconfiguration) or RRC re-establishment (RRCConnectionReestablishment) described in the second exemplary embodiment. The common radio resource configuration for the secondary cell and the dedicated radio resource configuration for the secondary cell, described above, may be included in the SCell addition/modification list described in the second exemplary embodiment. The common radio resource configuration and the dedicated radio resource configuration, described above, may be configured for each terminal 102 using RRC signals (e.g., dedicated signaling). The RRC connection reconfiguration and the RRC re-establishment may be configured for each terminal using RRC messages.

FIG. 29 is a diagram illustrating an example of the second uplink power control related cell-specific parameter configuration. The information elements included in the second uplink power control related cell-specific parameter configuration-r11 (for the primary cell) or the second uplink power control related cell-specific parameter configuration-Ell for the secondary cell may be configured such that all the information elements illustrated in FIG. 29 are included. Alternatively, the information elements included in the second uplink power control related cell-specific parameter configuration-r11 (for the primary cell) or the second uplink power control related cell-specific parameter configuration-Ell for the secondary cell may be configured such that at least one information element among the information elements illustrated in FIG. 29 is included. Alternatively, none of the information elements included in the second uplink power control related cell-specific parameter configuration-r11 (for the primary cell) or the second uplink power control related cell-specific parameter configuration-r11 for the secondary cell may be included. In this case, the base station 101 selects a release, and notifies the terminal 102 of information concerning the release. An information element that is not configured in the second uplink power control related cell-specific parameter configuration may be shared with the first uplink power control related cell-specific parameter configuration.

FIG. 30 is a diagram illustrating an example of the first uplink power control related UE-specific parameter configuration and the second uplink power control related UE-specific parameter configuration. A path loss reference resource is configured in the first uplink power control related UE-specific parameter configuration for the primary cell and/or secondary cell. In addition to the information elements illustrated in FIG. 22, a path loss reference resource is configured in the second uplink power control related UE-specific parameter configuration for the primary cell and/or secondary cell. The information elements included in the second uplink power control related UE-specific parameter configuration-r11 (for the primary cell) or the second uplink power control related UE-specific parameter configuration-Ell for the secondary cell may be configured such that all the information elements illustrated in FIG. 30 are included.

Alternatively, the information elements included in the second uplink power control related UE-specific parameter configuration-r11 (for the primary cell) or the second uplink power control related UE-specific parameter configuration-r11 for the secondary cell may be configured such that only at least one information element among the information elements illustrated in FIG. 30 is included. Alternatively, none of the information elements included in the second uplink power control related UE-specific parameter configuration-r11 (for the primary cell) or the second uplink power control related UE-specific parameter configuration-r11 for the secondary cell may be included. In this case, the base station 101 selects a release, and notifies the terminal 102 of information concerning the release. An information element that is not configured in the second uplink power control related UE-specific parameter configuration may be shared with the first uplink power control related UE-specific parameter configuration. Specifically, if a path loss reference resource is not configured in the second uplink power control related UE-specific parameter configuration, the path loss is computed based on the path loss reference resource configured in the first uplink power control related UE-specific parameter configuration.

Figure 32:
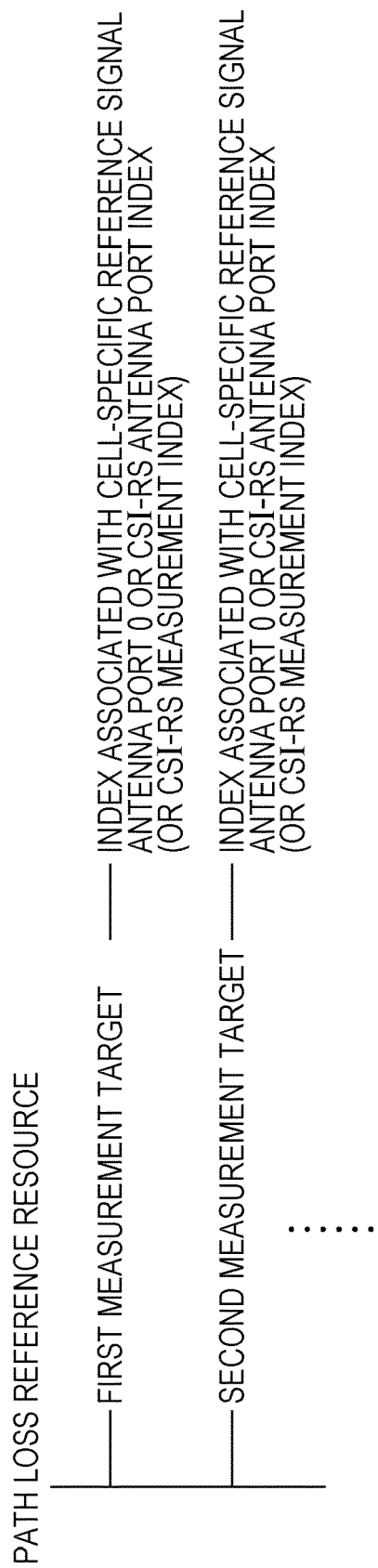
FIG. 32 is a diagram illustrating another example of the path loss reference resource (other example 1).
Figure 33:
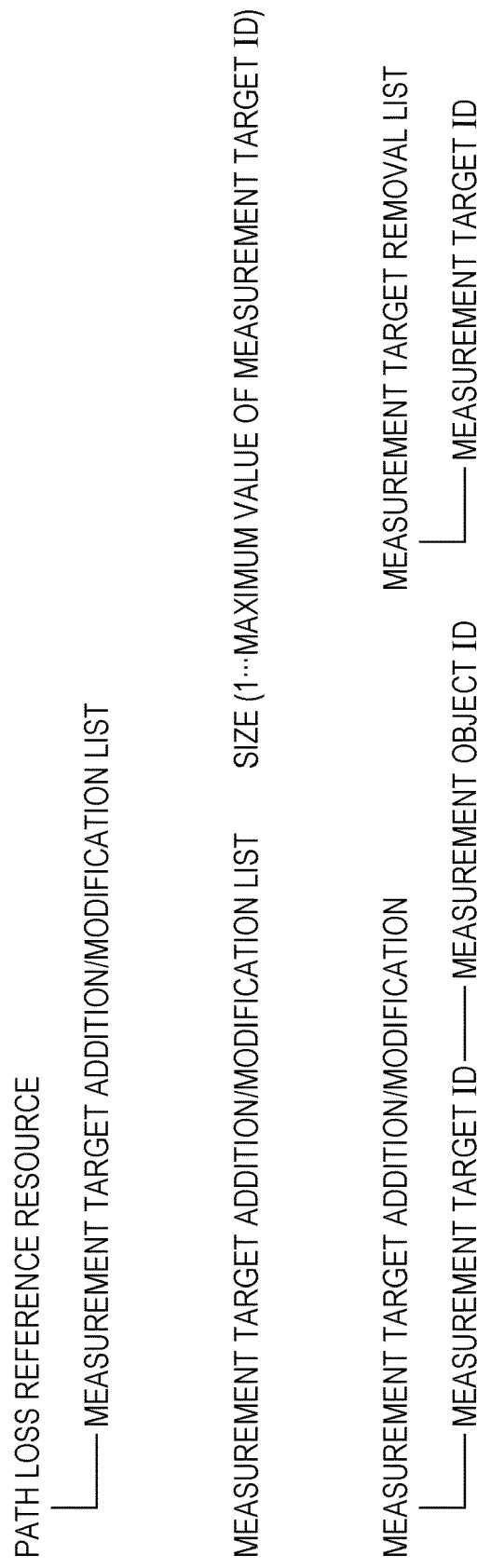
FIG. 33 is a diagram illustrating another example of the path loss reference resource (other example 2).
Figure 34:
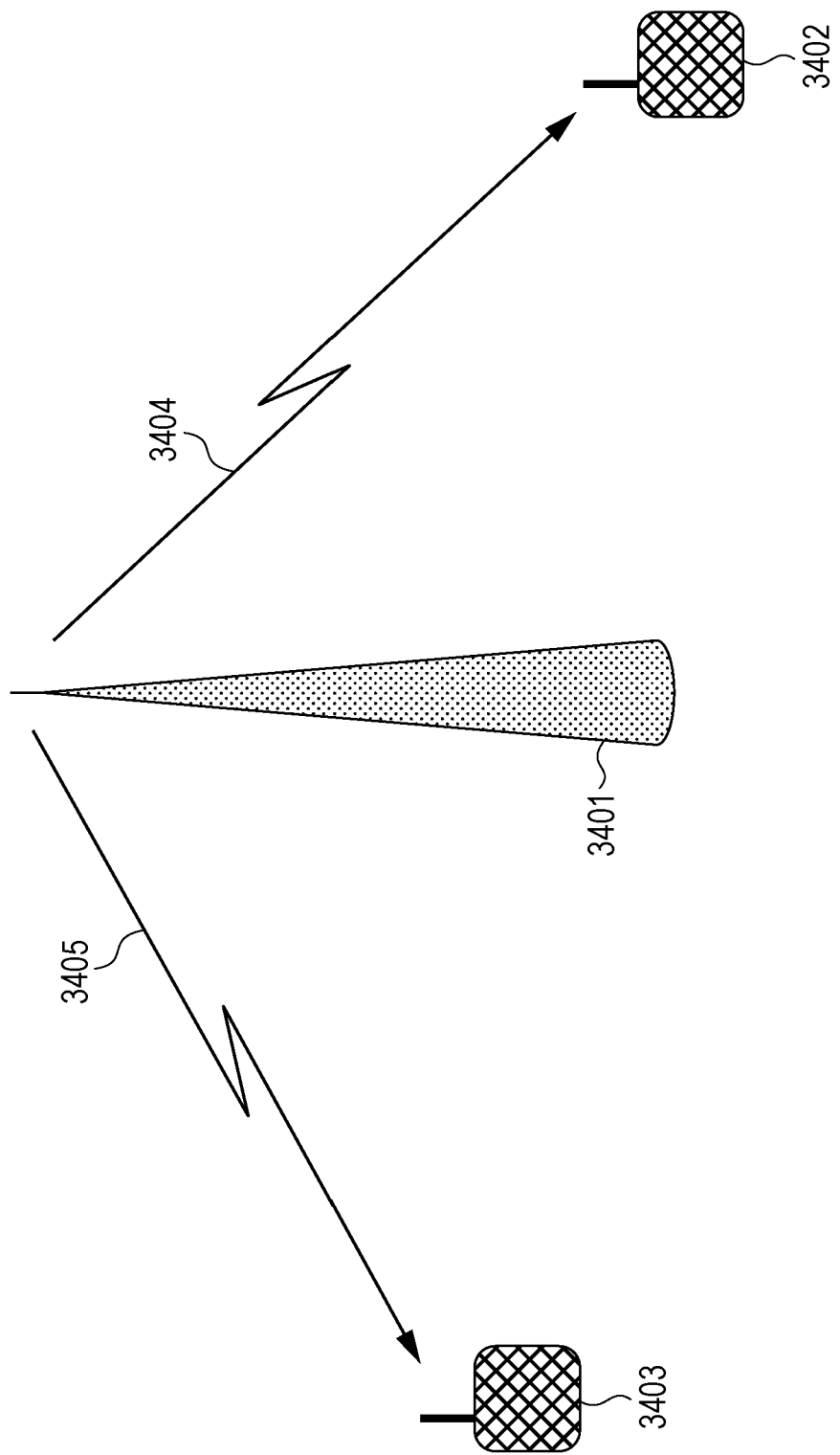
FIG. 34 is a diagram illustrating an example of implementation of a multi-user MIMO scheme.
Figure 35:
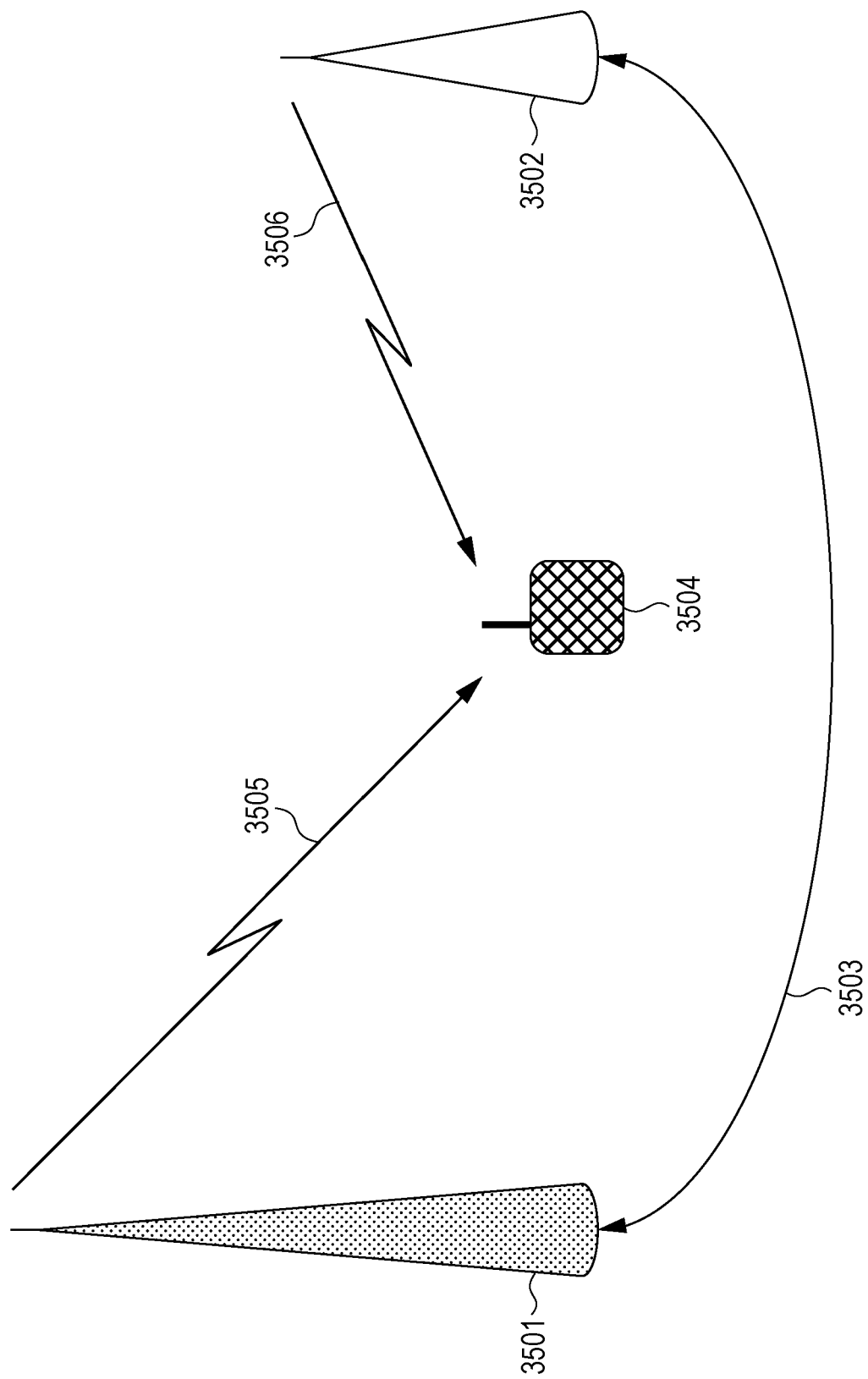
FIG. 35 is a diagram illustrating an example of implementation of a downlink CoMP scheme.
Figure 36:
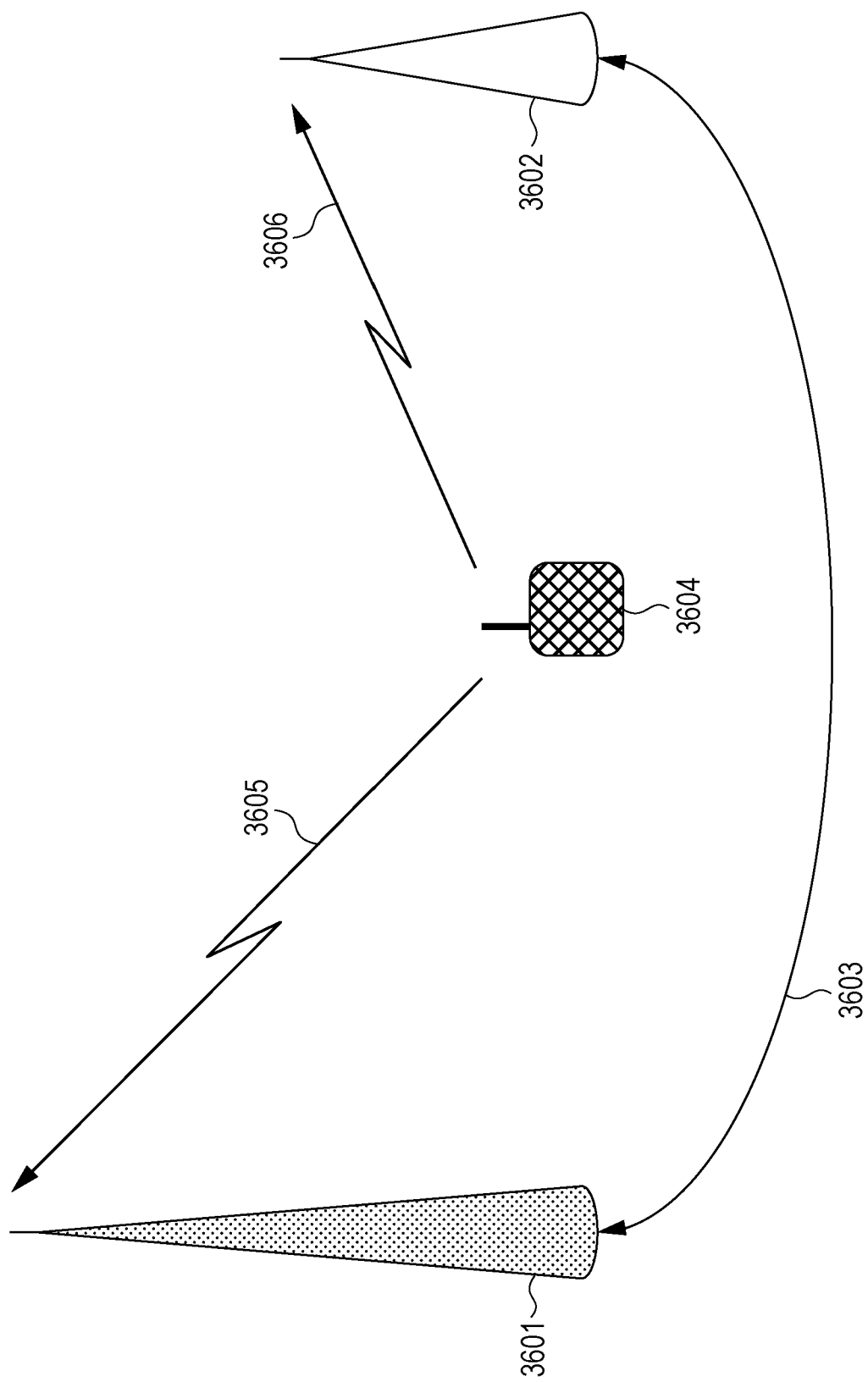
FIG. 36 is a diagram illustrating an example of implementation of an uplink CoMP scheme.

The path loss reference resource may be the same as that illustrated in the third embodiment (FIG. 24). That is, a measurement target specifying a path loss reference resource may be associated with the index associated with cell-specific reference signal antenna port 0 or the CSI-RS antenna port index (CSI-RS measurement index) (FIG. 31). Alternatively, the path loss reference resource illustrated in FIG. 32 or FIG. 33 may be used. FIG. 32 is a diagram illustrating an example of the path loss reference resource (example 1). A plurality of measurement targets are configured in the path loss reference resource. The terminal 102 can compute a path loss using at least one of these measurement targets. FIG. 33 is a diagram illustrating another example of the path loss reference resource (example 2). A measurement target to be added to the path loss reference resource may be added using an addition/modification list. The number of measurement targets to be added may be determined by the maximum value of measurement target ID. The measurement target ID may be determined by a measurement object ID. In other words, the number of measurement targets to be added may be the same as the number of measurement target configurations.

In addition, a measurement target that is no longer necessary may be removed using a removal list. The foregoing may also apply to the third exemplary embodiment and Exemplary Modification 1 of the third exemplary embodiment. An example of a method for computing a path loss in a case where a plurality of first measurement target configurations and a plurality of second measurement target configurations are associated with the path loss reference resource will now be given. The path loss reference resource may specify a plurality of first measurement target configurations and a plurality of second measurement target configurations, that is, antenna ports 15 and 16 for the channel-state information reference signal, etc., in the path loss reference resource addition/modification list. In this case, a second path loss may be computed on the basis of the received signal power at antenna ports 15 and 16 for the channel-state information reference signal. In this case, the path loss calculated from antenna port 15 and the path loss calculated from antenna port 16 may be averaged to determine a second path loss, or the larger or smaller one of the two path loss values may be used as a second path loss. Alternatively, the two path losses may be subjected to linear processing to obtain a second path loss.

The path losses described above may be calculated from antenna port 0 for the cell-specific reference signal and antenna port 15 for the channel-state information reference signal. In another example, the second path loss reference resource may specify a plurality of second measurement target configurations, that is, antenna ports 15 and 16 for the channel-state information reference signal, etc., in the path loss reference resource addition/modification list. In this case, a second path loss and a third path loss may be computed on the basis of the received signal power at antenna ports 15 and 16 for the channel-state information reference signal. In this case, the first path loss, the second path loss, and the third path loss may be associated with the first subframe subset, the second subframe subset, and the third subframe subset, respectively. The base station 101 may configure a first value for the TPC command (transmit power control command) included in the uplink grant notified in the first subframe subset, and may configure a second value different from the first value for the TPC command included in the uplink grant notified in the first subframe subset. That is, the first TPC command value may be associated with the first subframe subset, and the second TPC command value may be associated with the second subframe subset. In this case, the first value and the second value may be set to be different from each other. More specifically, the base station 101 may set the first value to be higher than the second value. The first value and the second value are power correction values of TPC commands.

By way of example, a downlink subframe is considered to be divided into a first subset and a second subset. If an uplink grant is received in subframe n (n is a natural number), the terminal 102 transmits an uplink signal in subframe n+4. Accordingly, an uplink subframe is naturally considered to be divided into a first subset and a second subset. The first subset may be associated with the first uplink power control related parameter configuration, and the second subset may be associated with the second uplink power control related parameter configuration. Specifically, if the uplink grant has been detected in the downlink subframe included in the first subset, the terminal 102 computes a path loss on the basis of a variety of information elements included in the first uplink power control related parameter configuration and the path loss reference resource (measurement target) included in the first uplink power control related parameter configuration, and computes a first uplink transmit power. If the uplink grant has been detected in the downlink subframe included in the second subset, the terminal 102 computes a path loss on the basis of a variety of information elements included in the second uplink power control related parameter configuration and the path loss reference resource (measurement target) included in the second uplink power control related parameter configuration, and computes a second uplink transmit power.

By way of example, the control channel region including an uplink grant and the uplink power control related parameter configuration are associated with each other. More specifically, the base station 101 can switch the uplink power control related parameter configuration to be used for the setting of the uplink transmit power in accordance with in which control channel region (a first control channel region and a second control channel region) the terminal 102 has detected the uplink grant. Specifically, if the uplink grant has been detected in the first control channel region, the terminal 102 computes a path loss using the first uplink power control related parameter configuration, and computes the uplink transmit power. If the uplink grant has been detected in the second control channel region, the terminal 102 computes a path loss using the second uplink power control related parameter configuration, and computes the uplink transmit power.

In Exemplary Modification 2 of the third embodiment, the base station 101 notifies the terminal 102 of the first second uplink power control related parameter configuration and the second uplink power control related parameter configuration. In an example, the terminal 102 computes a path loss (first path loss) in accordance with the notified information on the basis of the first uplink power control related parameter configuration, and computes a first uplink transmit power on the basis of the first path loss and the first uplink power control related parameter configuration. The terminal 102 also computes a path loss (second path loss) on the basis of the second uplink power control related parameter configuration, and computes a second uplink transmit power on the basis of the second path loss and the second uplink power control related parameter configuration. That is, the first uplink transmit power may be computed based on the measurement target notified using the first uplink power control related parameter configuration. The second uplink transmit power may be computed based on the measurement target notified using the second uplink power control related parameter configuration. In addition, the terminal 102 may perform control to determine whether to transmit an uplink signal at the first uplink transmit power described above or to transmit an uplink signal at the second uplink transmit power described above, in accordance with the frequency resource and timing in which the uplink grant has been detected.

In this manner, the first uplink transmit power and the second uplink transmit power may be fixedly associated with the first uplink power control related parameter configuration and the second uplink power control related parameter configuration.

In Exemplary Modification 2 of the third embodiment, furthermore, the base station 101 notifies the terminal 102 of a radio resource control signal including the first uplink power control related parameter configuration and the second uplink power control related parameter configuration, and notifies the terminal 102 of an uplink grant. The terminal 102 computes a first path loss and a first uplink transmit power on the basis of the first uplink power control related parameter configuration, and computes a second path loss and a second uplink transmit power on the basis of the second uplink power control related parameter configuration. If the uplink grant has been detected, the terminal 102 transmits an uplink signal at the first uplink transmit power or second uplink transmit power. In order to make notification of the uplink grant in the first subframe subset, the base station 101 sets the TPC command value to a first value. In order to make notification of the uplink grant in the second subframe subset, the base station 101 sets the TPC command value to a second value. For example, the first value may be set to be higher than the second value in terms of power correction value. That is, the base station 101 may configure the TPC command values independently for the first subframe subset or the second subframe subset. The base station 101 may also perform uplink signal demodulation processing so as to demodulate an uplink signal transmitted in an uplink subframe in the first subframe subset and not to perform demodulation processing on an uplink signal transmitted in an uplink subframe in the second subframe subset.

The configuration of a plurality of uplink power control related parameter configurations allows the terminal 102 to select an appropriate uplink power control related parameter configuration for the base station 101 or the RRH 103, and to transmit an uplink signal at an appropriate uplink transmit power to the base station 101 or the RRH 103. More specifically, at least one type of information element among the information elements included in the first uplink power control related parameter configuration and second uplink power control related parameter configuration may be configured as a different value. For example, in order to perform control using different attenuation coefficients α for use in the fractional transmit power control in a cell between the base station 101 and the terminal 102 and between the RRH 103 and the terminal 102, the first uplink power control related parameter configuration is associated with transmit power control for the base station 101, and the second uplink power control related parameter configuration is associated with transmit power control for the RRH 103. Accordingly, the coefficients α included in the respective configurations can be configured as appropriate values α. That is, fractional transmit power control between the base station 101 and the terminal 102 can be performed in a different way from that between the RRH 103 and the terminal 102. Similarly, PO_NOMINAL_PUSCH,c and PO_UE_PUSCH,c can be set to different values in the first uplink power control related parameter configuration and second uplink power control related parameter configuration, making the nominal power of the PUSCH between the base station 101 and the terminal 102 different from that between the RRH 103 and the terminal 102. The same applies to the other parameters.

Now referring to FIG. 1, the terminal 102 may be controlled to compute a path loss and an uplink transmit power using the first uplink power control related parameter configuration for the uplink 106, and to transmit an uplink signal at the computed transmit power. The terminal 102 may also be controlled to compute a path loss and an uplink transmit power using the second uplink power control related parameter configuration for the uplink 108, and to transmit an uplink signal at the computed transmit power.

Fourth Embodiment

Next, a fourth embodiment will be described. The description of the fourth embodiment will be directed to a method for the base station 101 to configure, in the terminal 102, parameters necessary for connection processing with the base station 101 or the RRH 103.

If an uplink signal is transmitted at the uplink transmit power for the base station (macro base station) 101 and an uplink signal is transmitted at the uplink transmit power for the RRH 103 on the same carrier component at the same timing (uplink subframe), problems occurs such as inter-symbol interference, interference caused by out-of-band radiation, and increase in a certain dynamic range.

The base station 101 controls the terminal 102 to separate the transmission of an uplink signal to the base station 101 and the transmission of an uplink signal to the RRH 103 in the time domain. Specifically, the base station 101 configures the transmission timing of uplink signals (PUCCH, PUCCH (CQI, PMI, SR, RI, ACK/HACK), UL DMRS, SRS, PRACH) so that the timing at which the terminal 102 transmits an uplink signal to the base station 101 and the timing at which the terminal 102 transmits an uplink signal to the RRH 103 are different. That is, the base station 101 configures the respective uplink signals so that the transmission to the base station 101 does not overlap the transmission to the RRH 103. A variety of uplink physical channels include at least one (or one type of) uplink physical channel (uplink signal) among the uplink signals (PUSCH, PUCCH (CQI, PMI, SR, RI, ACK/HACK), UL DMRS, SRS, PRACH) described above.

The base station 101 may configure a subset for the transmission timing (uplink subframes) of an uplink signal directed to the base station 101 and a subset for the transmission timing (uplink subframes) of an uplink signal directed to the RRH 103, and may schedule each terminal in accordance with the subsets.

Furthermore, the base station 101 appropriately configures uplink power control related parameter configurations for the base station 101 and the RRH 103 so that the transmit power set for an uplink signal to be transmitted to the base station 101 and the transmit power set for an uplink signal to be transmitted to the RRH 103 are appropriate. That is, the base station 101 can perform appropriate uplink transmit power control for the terminal 102.

First, a description will be given of the control of the base station 101 in the time domain. The uplink subframe subset for the base station 101 is represented by a first uplink subset, and the uplink subframe subset for the RRH 103 is represented by a second uplink subset. In this case, the base station 101 configures the values of a variety of parameters so that each uplink signal is included in the first subset or the second subset in accordance with whether the terminal 102 accesses the base station 101 or the RRH 103.

The configuration of the transmission subframes and transmission periods of the respective uplink signals will now be described. The transmission subframe and transmission period for the CQI (Channel Quality Indicator) and PMI (Precoding Matrix Indicator) may be configured using a CQI-PMI configuration index (cqi-pmi-ConfigIndex). The transmission subframe and transmission period for the RI (Rank Indicator) may be configured using an RI configuration index. For the SRS (Sounding Reference Signal), the cell-specific SRS transmission subframe (transmission subframe and transmission period) may be configured using a cell-specific SRS subframe configuration (srs-SubframeConfig), and the UE-specific SRS transmission subframe, which is a subset of cell-specific SRS transmission subframes, may be configured using a UE-specific SRS configuration index (srs-ConfigIndex). The transmission subframe of the PRACH is configured using a PRACH configuration index (prach-ConfigIndex). The transmission timing of the SR (Scheduling Request) may be configured using an SR configuration index (sr-ConfigIndex).

The CQI-PMI configuration index and the RI configuration index may be configured in a CQI report periodic (CQI-ReportPeriodic) included in a CQI report configuration (CQI-ReportConfig). The CQI report configuration may be included in the dedicated physical configuration.

The cell-specific SRS subframe configuration may be configured in a common sounding RS UL configuration (SoundingRS-UL-ConfigCommon), and the UE-specific SRS configuration index may be configured in a dedicated sounding RS UL configuration (SoundingRS-UL-ConfigDedicated). The common sounding RS UL configuration may be included in a common radio resource configuration SIB and/or a common radio resource configuration. The dedicated sounding RS UL configuration may be included in a dedicated radio resource configuration.

The PRACH configuration index is configured in PRACH configuration information (PRACH-ConfigInfo). The PRACH configuration information is included in a PRACH configuration SIB (PRACH-ConfigSIB) and a PRACH configuration (PRACH-Config). The PRACH configuration SIB is included in the common radio resource configuration SIB, and the PRACH configuration is included in the common radio resource configuration.

The SR configuration index is included in a scheduling request configuration (SchedulingRequetConfig). The scheduling request configuration is included in the dedicated physical configuration.

Since the PUSCH, the aperiodic CSI, and the aperiodic SRS are transmitted in the uplink subframe associated with the downlink subframe in which the uplink grant has been detected, the base station 101 can perform control to determine whether to transmit the signals to the terminal 102 in the first uplink subset or the second uplink subset by controlling the timing of notification of the uplink grant.

The base station 101 configures the indexes concerning the transmission timing for the respective uplink signals so that each of the indexes is included in the first uplink subset or the second uplink subset. Accordingly, the base station 101 can perform uplink transmission control of a terminal so that the uplink signal directed to the base station 101 and the uplink signal directed to the RRH 103 do not interfere with each other.

In addition, the resource allocation, transmission timing, and transmit power control for each uplink signal are also configurable for the secondary cell. Specifically, the cell-specific/LIE-specific SRS configuration is configured for the secondary cell. The transmission timing and transmission resource for the PUSCH are specified in the uplink grant.

As also described in the third embodiment, the one or more parameters related to uplink power control are configurable for a secondary cell.

The transmit power control of the PRACH will now be described. The initial transmit power of the PRACH is computed based on preamble initial received target power (preambleInitialReceivedTargetPower). If random access between a base station and a terminal has failed, a power ramping step (powerRampingStep), which is used to increase the transmit power by a certain amount for transmission, is configured. If random access on a physical random access channel (PRACH) transmitted at increasing power has continuously failed and the maximum transmit power of the terminal 102 or the maximum number of transmissions of the PRACH is exceeded, the terminal 102 determines that random access has failed, and notifies the higher layer of the occurrence of a random access problem (RAP). In a case where the higher layer is notified of a random access problem, it is determined that a radio link failure (RLF) has occurred.

The common radio resource configuration includes P_MAX indicating the maximum transmit power of the terminal 102. The common radio resource configuration for the secondary cell also includes P_MAX. The base station 101 can configure the maximum transmit power of the terminal 102 so as to be primary cell-specific or secondary cell-specific.

The uplink transmit power for each of the PUSCH, PUCCH, and SRS are as given in the third embodiment.

By way of example, the base station 101 configures the PUSCH/PUCCH/SRS/PRACH configuration (index) in the time axis included in the cell-specific/dedicated radio resource configuration and dedicated physical configuration notified using the system information, so that the configuration is first included in the first uplink subframe subset. After the establishment of the RRC connection, the base station 101 and the RRH 103 perform channel measurement or the like for each terminal 102 to determine which (of the base station 101 and the RRH 103) the terminal 102 is closer to. If the base station 101 determines, as a result of the measurement, that the terminal 102 is closer to the base station 101 than to the RRH 103, the base station 101 does not particularly change the configuration. If the base station 101 determines, as a result of the measurement, that the terminal 102 is closer to the RRH 103 than to the base station 101, the base station 101 notifies the terminal 102 of reconfiguration information (for example, transmit power control information, transmission timing information) suitable for the connection with the RRH 103. Here, the transmit power control information is a general term of transmit power control for the respective uplink signals. For example, a variety of information elements and TPC commands included in the uplink power control related parameter configurations are included in the transmit power control information. The transmission timing information is a general term of information for configuring the transmission timings of the respective uplink signals. For example, the transmission timing information includes control information concerning transmission timing (the SRS subframe configuration, the CQI-PMI configuration index, etc.).

The transmission control of an uplink signal (uplink transmission timing control) for the base station 101 or the RRH 103 will now be described. The base station 101 determines whether the terminal 102 is closer to the base station 101 or the RRH 103, using the measurement results of individual terminals. If the base station 101 determines, in accordance with the measurement results (measurement reports), that the terminal 102 is closer to the base station 101 than to the RRH 103, the base station 101 configures the transmission timing information on the respective uplink signals so that the transmission timing information is included in the first uplink subset, and sets the transmit power information to a value suitable for the base station 101. In this case, the base station 101 may not necessarily notify the terminal 102 of information for reconfiguration. That is, the initial configuration is not updated. If the base station 101 determines that the terminal 102 is closer to the RRH 103 than to the base station 101, the base station 101 configures the transmission timing information on the respective uplink signals so that the transmission timing information is included in the second uplink subset, and sets the transmit power information to a value suitable for the RRH 103.

Accordingly, the base station 101 can change the transmission timing to control the transmission of an uplink signal to the base station 101 and the transmission of an uplink signal to the RRH 103, and can control a terminal so that these signals do not interfere with each other. Here, a terminal 102 that communicates with the base station 101 is represented by terminal A and a terminal 102 that communicates with the RRH 103 is represented by terminal B. The base station 101 can configure a variety of configuration indexes including transmission timing so that the transmission timing of the terminal B is not equal to that of the terminal A. For example, the UE-specific SRS subframe configuration may be set to different values for the terminal A and the terminal B.

Furthermore, as described in the third embodiment, the base station 101 can associate different measurement targets with the first uplink subset and the second uplink subset.

More specific description of the procedure described above will now be provided. The base station 101 and/or the RRH 103 broadcasts broadcast information specifying a subframe in the first uplink subset as the PRACH configuration in the time axis. A terminal 102 that has not yet completed initial access or a terminal 102 in the RRC idle state attempts initial access on the basis of the acquired broadcast information using a PRACH resource in any subframe in the first uplink subset. In this case, the transmit power of the PRACH is configured with reference to a CRS transmitted from a base station or from a base station and an RRH. Accordingly, a comparatively high transmit power is obtained, which allows the PRACH to reach the base station 101.

After the RRC connection establishment or during RRC connection establishment through random access procedure, a semi-statically allocated PUCCH resource for the periodic CSI or Ack/Nack, a semi-statically allocated SRS resource, and a semi-statically allocated PUCCH resource for the SR are configured. All of these resources are resources in a subframe in the first uplink subset. The base station 101 schedules (allocates) to the terminal 102 a PDSCH that allows Ack/Nack to be transmitted on a PUSCH in a subframe in the first uplink subset or on a PUCCH in a subframe in the first uplink subset. In this case, the transmit powers of the PUSCH, PUCCH, and SRS are set with reference to a CRS transmitted from the base station 101 or from the base station 101 and the RRH 103. Accordingly, a comparatively high transmit power is obtained, which allows the PUSCH, PUCCH, and SRS to reach the base station 101. In this manner, a terminal 102 that performs uplink transmission at a comparatively high transmit power (a transmit power that is sufficient to compensate for a loss between the base station 101 and the terminal 102) uses only subframes in the first uplink subset.

Then, the base station 101 determines (judges) whether the terminal 102 is to transmit an uplink signal to the base station 101 or transmit an uplink signal to the RRH 103. In other words, the base station 101 determines whether the terminal 102 is to perform the transmission at a transmit power that is sufficient to compensate for a loss between the base station 101 and the terminal 102 or at a transmit power that is sufficient to compensate for a loss between the RRH 103 and the terminal 102. This determination is based on, as described above, which of the base station 101 and the RRH 103 the position of the terminal 102 is closer to, using the measurement results, or any other determination criterion may be used. The determination may be based on, for example, the power of a received signal when the RRH 103 receives a signal such as the SRS transmitted from the terminal 102 in a subframe in the first uplink subset. If the base station 101 determines that the terminal 102 is to transmit an uplink signal to the base station 101, the base station 101 continues uplink communication using only subframes in the first uplink subset.

If the base station 101 determines that the terminal 102 is to transmit an uplink signal to the RRH 103, parameters related to uplink power control are configured so that uplink transmission is performed in these resources at a comparatively low transmit power (a transmit power that is sufficient to compensate for a loss between the RRH 103 and the terminal 102). The configuration for reducing the transmit power may be performed using the method described above in the foregoing embodiments. Any other method may be used, such as a method for reducing power step-by-step through iteration of closed-loop transmit power control or a method for updating the configuration of the CRS power value or the channel loss compensation coefficient α in the system information through a handover procedure.

If the base station 101 determines that the terminal 102 is to transmit an uplink signal to the RRH 103, the semi-statically allocated PUCCH resource for the periodic CSI or Ack/Nack, the semi-statically allocated SRS resource, and the semi-statically allocated PUCCH resource for the SR are reconfigured. All these resources are resources in a subframe in the second uplink subset. In addition, the configuration of the PRACH resource in the system information is updated through a handover procedure (mobility control procedure). All the PRACH resources are resources in a subframe in the second uplink subset. The base station 101 further schedules (allocates) to the terminal 102 a PDSCH that allows Ack/Nack to be transmitted on a PUSCH in a subframe in the second uplink subset or on a PUCCH in a subframe in the second uplink subset. In this manner, a terminal 102 that performs uplink transmission at a comparatively low transmit power (a transmit power that is sufficient to compensate for a loss between the RRH 103 and the terminal 102) uses only subframes in the second uplink subset.

As described above, a terminal 102 that performs uplink transmission at a comparatively high transmit power (a transmit power that is sufficient to compensate for a loss between the base station 101 and the terminal 102) uses subframes in the first uplink subset, whereas a terminal 102 that performs uplink transmission at a comparatively low transmit power (a transmit power that is sufficient to compensate for a loss between the RRH 103 and the terminal 102) uses only subframes in the second uplink subset. Accordingly, subframes received by the base station 101 and subframes received by the RRH 103 can be separated in the time axis. This may not need to simultaneously perform reception processing on signals with a high received power and signals with a low received power, and can suppress interference. Furthermore, the certain dynamic range at the base station 101 or the RRH 103 can be reduced.

Here, a description will be given of the transmission control of an uplink signal (uplink transmission resource control) for the base station 101 or the RRH 103 in carrier aggregation. It is assumed that the base station 101 configures two carrier components (first carrier component, second carrier component) for the terminal 102 and that a first carrier component and a second carrier component are configured as the primary cell and the secondary cell, respectively. If the base station 101 determines, based on measurement results, that the terminal 102 is closer to the base station 101 than to the RRH 103 (terminal A), the base station 101 sets the secondary cell to be deactivated. That is, the terminal A performs communication without using the secondary cell but using only the primary cell. If the base station 101 determines that the terminal 102 is closer to the RRH 103 than to the base station 101 (terminal B), the base station 101 sets the secondary cell to be activated. That is, the terminal B performs communication with the base station 101 and the RRH 103 using not only the primary cell but also the secondary cell.

The base station 101 configures, as the secondary cell configuration for the terminal B, resource allocation and transmit power control suitable for the transmission to the RRH 103. Specifically, the base station 101 controls the terminal to compute a path loss and an uplink transmit power taking into account the transmission of path loss measurement for the secondary cell from the RRH. Note that the uplink signals that the terminal B transmits via the secondary cell are the PUSCH, PUSCH demodulation UL DMRS, and SRS. The PUCCH (CQI, PMI, RI), PUCCH demodulation UL DMRS, and PRACH are transmitted via the primary cell. For example, if the terminal B is permitted by the higher layer to simultaneously transmit the PUSCH and PUCCH, the terminal B is controlled to transmit the PUCCH in the primary cell and to transmit the PUSCH in the secondary cell. In this case, the terminal B is controlled by the base station 101 in such a manner that the transmit power for the base station 101 is set for the primary cell and the transmit power for the RRH 103 is set for the secondary cell. If the terminal A is permitted by the higher layer to simultaneously transmit the PUSCH and PUCCH, the terminal A is controlled by the base station 101 to transmit the PUSCH and PUCCH via the primary cell. Accordingly, the base station 101 can change the transmission resource to control the transmission of an uplink signal to the base station 101 and the transmission of an uplink signal to the RRH 103, and can control the terminal 102 so that these signals do not interfere with each other.

In addition, the base station 101 may reconfigure the first carrier component as the secondary cell and reconfigure the second carrier component as the primary cell for the terminal B by utilizing a handover. In this case, the terminal performs processing similar to that for the terminal A described above. Specifically, the terminal B deactivates the secondary cell. That is, the terminal B communicates with the RRH 103 without using the secondary cell but using only the primary cell. In this case, the terminal B is controlled to transmit all uplink signals via the primary cell. In this case, furthermore, regarding all the uplink transmit powers, uplink transmit power control for the RRH 103 is carried out. Specifically, the transmit powers of the PUSCH, PUCCH, PRACH, and SRS are reconfigured to be suitable for the RRH 103. In this case, reconfiguration information is included in the RRC connection reconfiguration.

In addition, the base station 101 can control a terminal not to perform communication at a high transmit power via the second carrier component by providing carrier components or cells with access (transmission) restrictions (ac-Barring Factor) on uplink transmit power.

In addition, as described in the third embodiment, the base station 101 can associate different measurement targets with the first carrier component and the second carrier component or with the primary cell and the secondary cell.

The procedure described above will now be described in a different aspect. The base station 101 and the RRH 103 perform communication using a combination of carrier components, which is a subset of two downlink carrier components (component carriers) and two uplink carrier components (component carriers). The base station 101 and/or the RRH 103 broadcasts broadcast information on restrictions of initial access (preventing initial access) on the second downlink carrier component. On the other hand, the base station 101 and/or the RRH 103 broadcasts broadcast information enabling initial access on the first downlink carrier component (does not broadcast the broadcast information on restrictions of initial access). A terminal that has not yet completed initial access or a terminal 102 in the RRC idle state attempts initial access on the basis of the acquired broadcast information using a PRACH resource in the first uplink carrier component rather than in the second uplink carrier component. In this case, the transmit power of the PRACH is configured with reference to a CRS transmitted from the base station 101 or from the base station 101 and the RRH 103 in the first downlink carrier component. Accordingly, a comparatively high transmit power is obtained, which allows the PRACH to reach the base station 101.

After the RRC connection establishment or during RRC connection establishment through random access procedure, a semi-statically allocated PUCCH resource for the periodic CSI or Ack/Nack, a semi-statically allocated SRS resource, and a semi-statically allocated PUCCH resource for the SR are configured. These resources are resources in the first uplink carrier component, that is, resources in the primary cell (PCell: a cell including the first downlink carrier component and the first uplink carrier component). The base station 101 performs the scheduling (e.g., resource allocation/resource assignment) for a PUSCH in the first uplink carrier component to the terminal 102. The terminal 102 further transmits an Ack/Nack for a PDSCH in the first downlink carrier component using a PUCCH in the first uplink carrier component. In this case, the transmit powers of the PUSCH, PUCCH, and SRS are set with reference to a CRS transmitted from the base station 101 or from the base station 101 and the RRH 103 in the PCell. Accordingly, a comparatively high transmit power is obtained, which allows the PUSCH, PUCCH, and SRS to reach the base station 101.

In a case where carrier aggregation is to be performed, the secondary cell (SCell) is configured as a cell having the second downlink carrier component (having no uplink carrier components). In the SCell, the semi-statically allocated PUCCH resources for the periodic CSI or Ack/Nack are resources in the first uplink carrier component, that is, resources in the PCell. The terminal 102 transmits an Ack/Nack for a PDSCH in the second downlink carrier component (SCell) using a PUCCH in the first uplink carrier component (PCell). In this case, the transmit powers of the PUSCH, PUCCH, and SRS are set with reference to a CRS transmitted from the base station 101 or from the base station 101 and the RRH 103 in the PCell. Accordingly, a comparatively high transmit power is obtained, which allows the PUSCH, PUCCH, and SRS to reach the base station 101. In this manner, a terminal 102 that performs uplink transmission at a comparatively high transmit power (a transmit power that is sufficient to compensate for a loss between the base station 101 and the terminal 102) uses only the first uplink carrier component regardless of whether carrier aggregation is performed or not.

Then, the base station 101 determines whether the terminal 102 is to transmit an uplink signal to the base station 101 or to transmit an uplink signal to the RRH 103. In other words, the terminal 102 determines whether the terminal 102 is to perform the transmission at a transmit power that is sufficient to compensate for a loss between the base station 101 and the terminal 102 or at a transmit power that is sufficient to compensate for a loss between the RRH 103 and the terminal 102. This determination can be based on the method described above. If the base station 101 determines that the terminal 102 is to transmit an uplink signal to the base station 101, the base station 101 continues uplink communication using only the first uplink carrier component, that is, communication in which a cell including the first downlink carrier component and the first uplink carrier component is set as the PCell.

If the base station 101 determines that the terminal 102 is to transmit an uplink signal to the RRH 103, the base station 101 changes the PCell through a handover procedure. Specifically, the PCell is changed from a PCell having the first downlink carrier component and the first uplink carrier component to a PCell having the second downlink carrier component and the second uplink carrier component. In the handover procedure, the parameters related to uplink power control are configured in such a manner that uplink transmission is performed at a comparatively low transmit power (a transmit power that is sufficient to compensate for a loss between the RRH 103 and the terminal 102) after the handover has been completed. Any other method may be used, such as a method for updating the configuration of the CRS power value, the channel loss compensation coefficient α, or the initial value of the uplink transmit power in the system information. In addition, system information with no restrictions of initial access is configured.

In a case where the PCell has been changed, the random access procedure on the second uplink carrier component is performed and an RRC connection is established. After the RRC connection establishment or during RRC connection establishment through the random access procedure, a semi-statically allocated PUCCH resource for the periodic CSI or Ack/Nack, a semi-statically allocated SRS resource, and a semi-statically allocated PUCCH resource for the SR are reconfigured. All of these resources are resources in the second uplink carrier component. The base station 101 schedules (allocates) to the terminal 102 a PDSCH that allows Ack/Nack to be transmitted on a PUSCH in the second uplink carrier component or on a PUCCH in the second uplink carrier component. In this case, the parameters related to uplink power control are configured in such a manner that the transmit powers of the PUSCH, PUCCH, and SRS are comparatively low (sufficient to compensate for a loss between the RRH 103 and the terminal 102).

In a case where carrier aggregation is to be performed, the SCell is configured as a cell having the first downlink carrier component (having no uplink carrier components). In the SCell, the semi-statically allocated PUCCH resources for the periodic CSI or Ack/Nack are resources in the second uplink carrier component, that is, resources in the PCell. The terminal 102 transmits an Ack/Nack for a PDSCH in the SCell using a PUCCH in the second uplink carrier component. In this case, the parameters related to uplink power control are set in such a manner that the transmit power of the PUCCH is comparatively low (sufficient to compensate for a loss between the RRH 103 and the terminal 102). In this manner, a terminal 102 that performs uplink transmission at a comparatively low transmit power (a transmit power that is sufficient to compensate for a loss between the RRH 103 and the terminal 102) uses only the second uplink carrier component regardless of whether carrier aggregation is performed or not.

As described above, a terminal 102 that performs uplink transmission at a comparatively high transmit power (a transmit power that is sufficient to compensate for a loss between the base station 101 and the terminal 102) uses the first uplink carrier component, whereas a terminal 102 that performs uplink transmission with a comparatively low transmit power (a transmit power that is sufficient to compensate for a loss between the RRH 103 and the terminal 102) uses only the second uplink carrier component. Accordingly, subframes received by the base station 101 and subframes received by the RRH 103 can be separated in the frequency axis. This may not need to simultaneously perform reception processing on signals with a high received power and signals with a low received power, and can suppress interference. Furthermore, the certain dynamic range at the base station 101 or the RRH 103 can be reduced.

Here, a description will be given of the transmission control of an uplink signal (uplink signal transmit power control) for the base station 101 or the RRH 103 in a control channel (PDCCH) region including an uplink grant. If the base station 101 determines, based on measurement results, that a certain terminal (terminal A) is close to the base station 101, the base station 101 performs dynamic uplink signal transmission control for the terminal A only in the first control channel (PDCCH) region. If the base station 101 determines, based on measurement results, that a certain terminal (terminal B) is close to the RRH 103, the base station 101 performs dynamic uplink signal transmission control for the terminal B only in the second control channel (X-PDCCH) region. More specifically, in order to cause the terminal 102 to transmit an uplink signal to the base station 101, the base station 101 notifies the terminal 102 of an uplink grant that is included in the first control channel region. In order to cause the terminal 102 to transmit an uplink signal to the RRH 103, the base station 101 notifies the terminal 102 of an uplink grant that is included in the second control channel region. In addition, the base station 101 can utilize a TPC command, which is a correction value for uplink signal transmit power control included in the uplink grant, to perform uplink signal transmit power control for the base station 101 or the RRH 103.

The base station 101 configures a TPC command value included in the uplink grant so as to be suitable for the base station 101 or the RRH 103 in accordance with the control channel region in which the base station 101 notifies the terminal 102 of the uplink grant. More specifically, in order to increase the uplink transmit power for the base station 101, the base station 101 sets the power correction value of the TPC command in the first control channel region to be high. In order to decrease the uplink transmit power for the RRH 103, the base station 101 sets the power correction value of the TPC command in the second control channel region to be low. The base station 101 performs uplink signal transmission and uplink transmit power control for the terminal A using the first control channel region, and performs uplink signal transmission and uplink transmit power control for the terminal B using the second control channel. More specifically, the base station 101 performs transmit power control of uplink signals by setting the TPC command (transmit power control command) for the base station 101 to a first value and setting the TPC command (transmit power control command) for the RRH 103 to a second value. The base station 101 may set the first value to be higher than the second value in terms of power correction value.

In addition, as described in the third embodiment, the base station 101 can associate different measurement targets with the first control channel region and the second control channel region.

In the fourth embodiment, the base station 101 configures transmission timing information on the physical random access channel, which is included in system information, in a subframe in the first subframe subset, and configures transmission timing information on a variety of uplink physical channels in a subframe in the first subframe subset. Furthermore, the base station 101 reconfigures the radio resource control information for some terminals 102. In this case, transmission timing information on the physical random access channel, which is included in a radio resource control signal, is configured in a subframe in the second subframe subset different from the first subframe subset, and the transmission timing information on a variety of uplink physical channels is configured in a subframe in the second subframe subset.

In addition, the base station 101 configures transmit power control information on a variety of uplink signals as first transmit power control information in association with the first subframe subset, and reconfigures the radio resource control information for some terminals 102. In this case, the transmit power control information on a variety of uplink signals is configured as second transmit power control information in association with the second subframe subset.

In addition, the base station 101 configures first transmit power control information for a terminal 102 that transmits an uplink signal in the first subframe subset, and configures second transmit power control information for a terminal 102 that transmits an uplink signal in the second subframe subset.

In the fourth embodiment, furthermore, the base station 101 transmits a signal via the first downlink carrier component and the second downlink carrier component. The base station 101 configures first transmit power control information as primary cell-specific transmit power control information for a terminal 102 for which the first downlink carrier component is configured as the primary cell, and configures second transmit power control information as primary cell-specific transmit power control information for a terminal 102 for which the second downlink carrier component is configured as the primary cell.

In addition, the base station 101 receives a signal via the first uplink carrier component and the second uplink carrier component. The base station 101 configures first transmit power control information for a terminal 102 that performs communication via the first uplink carrier component, and configures second transmit power control information for a terminal 102 that performs communication via the second uplink carrier component.

The base station 101 controls a terminal 102 that accesses the base station 101 and a terminal 102 that accesses the RRH 103 to transmit an uplink signal in accordance with time, frequency, and a control channel region including an uplink grant. Accordingly, the base station 101 can perform appropriate transmission timing control, appropriate radio resource control, and appropriate uplink transmit power control.

The base station 101 configures a variety of parameters such that all the transmit power control information and transmission timing information concerning uplink signals, which are included in system information, are appropriately configured for the base station 101. After the establishment of initial connection (RRC connection establishment), while the base station 101 and the terminal 102 communicate with each other, the base station 101 determines, based on the results of channel measurement and so forth, whether the terminal 102 is closer to the base station 101 or to the RRH 103. If the base station 101 determines that the terminal 102 is closer to the base station 101, the base station 101 does not particularly notify the terminal 102 of configuration information, or configures transmit power control information, transmission timing control information, and transmission resource control information which are more suitable for communication with the base station 101 and notifies the terminal 102 of the configured information through RRC connection reconfiguration. If the base station 101 determines that the terminal 102 is closer to the RRH 103, the base station 101 configures transmit power control information, transmission timing control information, and transmission resource control information which are suitable for communication with the RRH, and notifies the terminal 102 of the configured information through RRC connection reconfiguration.

The foregoing embodiments have been described using, for example, but not limited to, a resource element or a resource block as the unit of mapping an information data signal, a control information signal, a PDSCH, a PDCCH, and reference signals and using a subframe or a radio frame as the unit of transmission in the time domain. Similar advantages can be achieved with the use of any desired frequency and time domains and the time unit instead of them. The foregoing embodiments have been described using, by way of example, but not limited to, the case where demodulation is carried out using RSs subjected to precoding processing and using ports equivalent to the layers of MIMO as the ports corresponding to the RSs subjected to precoding processing. Additionally, similar advantages can also be achieved by applying the present invention to ports corresponding to different reference signals. For example, in place of precoded RSs, unprecoded (nonprecoded) RSs may be used, and ports equivalent to the output edges after the precoding processing has been performed or ports equivalent to physical antennas (or a combination of physical antennas) may be used as ports.

The foregoing embodiments have been described in terms of downlink/uplink coordinated communication between the base station 101, the terminal 102, and the RRH 103. The present invention can also be applied to coordinated communication between two or more base stations 101 and the terminal 102, coordinated communication between two or more base stations 101, the RRH 103, and the terminal 102, coordinated communication between two or more base stations 101 or the RRH 103 and the terminal 102, coordinated communication between two or more base stations 101, two or more RRHs 103, and the terminal 102, and coordinated communication between two or more transmission points/reception points. Furthermore, the foregoing embodiments have been described in terms of uplink transmit power control suitable for communication between the terminal 102 and one of the base station 101 and the RRH 103 to which the terminal 102 is closer, based on the computational results of path loss. However, similar processing can be performed for uplink transmit power control suitable for communication between the terminal 102 and one of a base station 101 and the RRH 103 from which the terminal 102 is more distant, based on the computational results of path loss.

(a) The present invention can also have the following aspects: A terminal according to an aspect of the present invention is a terminal for communicating with a base station, including means for receiving a radio resource control signal including information concerning an uplink power control related parameter configuration in which information concerning a path loss reference resource is configured, and means for computing a path loss and an uplink transmit power on the basis of the information concerning the path loss reference resource and the information concerning the uplink power control related parameter configuration.

(b) Furthermore, a terminal according to an aspect of the present invention is a terminal for communicating with a base station, including means for receiving a radio resource control signal including an uplink power control related parameter configuration in which first path loss reference resource and second path loss reference resource are configured, means for computing a first path loss on the basis of the first path loss reference resource and for computing a second path loss on the basis of the second path loss reference resource, and means for computing an uplink transmit power on the basis of the first path loss or the second path loss and the uplink power control related parameter configuration.

(c) Furthermore, a terminal according to an aspect of the present invention is a terminal for communicating with a base station, including means for receiving a radio resource control signal including an uplink power control related parameter configuration in which primary cell-specific and secondary cell-specific path loss reference resources are configured, means for receiving an uplink grant, means for computing a path loss and an uplink transmit power on the basis of a path loss reference resource included in an uplink power control related UE-specific parameter configuration for the primary cell and the uplink power control related parameter configuration in a case where the uplink grant has been detected in a primary cell, and for computing a path loss and an uplink transmit power on the basis of a path loss reference resource included in an uplink power control related UE-specific parameter configuration for the secondary cell and the uplink power control related parameter configuration in a case where the uplink grant has been detected in a secondary cell, and means for transmitting an uplink signal to the base station at the uplink transmit power.

(d) Furthermore, a terminal according to an aspect of the present invention is a terminal for communicating with a base station, including means for receiving a radio resource control signal including an uplink power control related parameter configuration in which first path loss reference resource and second path loss reference resource are configured, means for computing a first path loss and a first uplink transmit power on the basis of the first path loss reference resource and the uplink power control related parameter configuration in a case where an uplink grant has been detected in a downlink subframe included in a first subframe subset, and for computing a second path loss and a second uplink transmit power on the basis of the second path loss reference resource and the uplink power control related parameter configuration in a case where the uplink grant has been detected in a downlink subframe included in a second subframe subset, and means for transmitting an uplink signal to the base station at the uplink transmit power in an uplink subframe included in the subframe subset.

(e) Furthermore, a terminal according to an aspect of the present invention is the terminal described above, which transmits an uplink signal to the base station at a first uplink transmit power in a case where a transmission subframe of a periodic uplink signal is included in the first subframe subset and which transmits an uplink signal to the base station at a second uplink transmit power in a case where a transmission subframe of a periodic uplink signal is included in the second subframe subset.

(f) Furthermore, a terminal according to an aspect of the present invention is a terminal for communicating with a base station, including means for receiving a radio resource control signal including an uplink power control related parameter configuration in which first path loss reference resource and second path loss reference resource are configured, means for computing a first path loss and a first uplink transmit power on the basis of the first path loss reference resource and the uplink power control related parameter configuration in a case where the uplink grant has been detected in a first control channel region, and for computing a second path loss and a second uplink transmit power on the basis of the second path loss reference resource and the uplink power control related parameter configuration in a case where the uplink grant has been detected in a second control channel region, and means for transmitting an uplink signal to the base station at the uplink transmit power.

(g) Furthermore, a terminal according to an aspect of the present invention is any of the terminals described above, in which the path loss reference resource includes an index associated with cell-specific reference signal antenna port 0.

(h) Furthermore, a terminal according to an aspect of the present invention is any of the terminals described above, in which the path loss reference resource includes an antenna port index of a channel-state information reference signal.

(i) Furthermore, a terminal according to an aspect of the present invention is any of the terminals described above, in which the path loss reference resource includes an index determined using a third reference signal configuration.

(j) Furthermore, a terminal according to an aspect of the present invention is any of the terminals described above, in which each of the first path loss reference resource and the second path loss reference resource includes a different index.

(k) Furthermore, a communication system according to an aspect of the present invention is a communication system including a base station and a terminal, wherein the base station notifies the terminal of a radio resource control signal including an uplink power control related parameter configuration in which a path loss reference resource is configured, and notifies the terminal of an uplink grant, and the terminal computes a path loss and an uplink transmit power in accordance with information included in the radio resource control signal on the basis of the path loss reference resource and the uplink power control related parameter configuration, and transmits an uplink signal to the base station at the uplink transmit power.

(l) Furthermore, a communication system according to an aspect of the present invention is a communication system including a base station and a terminal, wherein the base station notifies the terminal of a radio resource control signal including an uplink power control related parameter configuration in which primary cell-specific and secondary cell-specific path loss reference resources are configured, and notifies the terminal of an uplink grant, and the terminal computes, in accordance with information included in the radio resource control signal, a path loss and an uplink transmit power on the basis of a path loss reference resource included in an uplink power control related UE-specific parameter configuration for the primary cell and the uplink power control related parameter configuration in a case where the uplink grant has been detected in a primary cell, computes a path loss and an uplink transmit power on the basis of a path loss reference resource included in an uplink power control related UE-specific parameter configuration for the secondary cell and the uplink power control related parameter configuration in a case where the uplink grant has been detected in a secondary cell, and transmits an uplink signal to the base station at the uplink transmit power.

(m) Furthermore, a communication system according to an aspect of the present invention is a communication system including a base station and a terminal, wherein the base station notifies the terminal of a radio resource control signal including an uplink power control related parameter configuration in which first path loss reference resource and second path loss reference resource are configured, and notifies the terminal of an uplink grant, and the terminal computes, in accordance with information included in the radio resource control signal, a path loss and an uplink transmit power on the basis of the first path loss reference resource and the uplink power control related parameter configuration in a case where the uplink grant has been detected in a downlink subframe included in a first subframe subset, computes a path loss and an uplink transmit power on the basis of the second path loss reference resource and the uplink power control related parameter configuration in a case where the uplink grant has been detected in a downlink subframe included in a second subframe subset, and transmits an uplink signal to the base station at the uplink transmit power in an uplink subframe included in the subframe subset.

(n) Furthermore, a communication system according to an aspect of the present invention is a communication system including a base station and a terminal, wherein the base station notifies the terminal of a radio resource control signal including an uplink power control related parameter configuration in which first path loss reference resource and second path loss reference resource are configured, and notifies the terminal of an uplink grant, and the terminal computes, in accordance with information included in the radio resource control signal, a path loss and an uplink transmit power on the basis of the first path loss reference resource and the uplink power control related parameter configuration in a case where the uplink grant has been detected in a first control channel region, computes a path loss and an uplink transmit power on the basis of the second path loss reference resource and the uplink power control related parameter configuration in a case where the uplink grant has been detected in a second control channel region, and transmits an uplink signal to the base station at the uplink transmit power.

(o) Furthermore, a communication method according to an aspect of the present invention is a communication method for a communication system including a base station and a terminal, including a step in which the base station notifies the terminal of a radio resource control signal including an uplink power control related parameter configuration in which a path loss reference resource is configured, a step in which the base station notifies the terminal of an uplink grant, a step in which the terminal computes a path loss and an uplink transmit power in accordance with information included in the radio resource control signal on the basis of the path loss reference resource and the uplink power control related parameter configuration, and a step in which the terminal transmits an uplink signal to the base station at the uplink transmit power.

Accordingly, a terminal can transmit an uplink signal with an appropriate uplink transmit power at appropriate transmission timing by using a transmission resource.

A program operating in the base station 101 and the terminal 102 according to the present invention is a program (a program for causing a computer to function) to control a CPU and so forth so as to implement the functions of the foregoing embodiments according to the present invention. Such information as handled by devices is temporarily accumulated in a RAM while processed, and is then stored in various ROMs and HDDs. The information is read by the CPU, if necessary, for modification/writing. A recording medium having the program stored therein may be any of semiconductor media (for example, a ROM, a non-volatile memory card, etc.), optical recording media (for example, a DVD, an MO, an MD, a CD, a BD, etc.), magnetic recording media (for example, a magnetic tape, a flexible disk, etc.), and so forth. Furthermore, in addition to the implementation of the functions of the embodiments described above by executing the loaded program, the functions of the present invention may be implemented by processing the program in cooperation with an operating system, any other application program, or the like in accordance with instructions of the program.

To distribute the program to the market, the program may be stored in a transportable recording medium for distribution, or may be transferred to a server computer connected via a network such as the Internet. In this case, a storage device in the server computer also falls within the scope of the present invention. In addition, part or the entirety of the base station 101 and the terminal 102 in the embodiments described above may be implemented as an LSI, which is typically an integrated circuit. The respective functional blocks of the base station 101 and the terminal 102 may be individually built into chips or some or all of them may be integrated and built into a chip. The method for forming an integrated circuit is not limited to LSI, and may be implemented by a dedicated circuit or a general-purpose processor. In the case of the advent of integrated circuit technology replacing LSI due to the advancement of semiconductor technology, it is also possible to use an integrated circuit bead on this technology.

While embodiments of this invention have been described in detail with reference to the drawings, a specific configuration is not limited to that in these embodiments, and design changes and the like without departing from the essence of this invention also fall within the invention. In addition, a variety of changes can be made to the present invention within the scope defined by the claims, and embodiments that are achievable by appropriately combining respective technical means disclosed in different embodiments are also embraced within the technical scope of the present invention. Furthermore, a configuration in which elements described in the foregoing embodiments and capable of achieving similar advantages are interchanged is also embraced within the technical scope of the present invention. The present invention is suitable for use in a radio base station device, a radio terminal device, a radio communication system, and a radio communication method.

REFERENCE SIGNS LIST 101, 3401 base station
102, 3402, 3403, 3504, 3604 terminal
103, 3502, 3602 RRH
104, 3503, 3603 line
105, 107, 3404, 3405, 3505, 3506 downlink
106, 108, 3605, 3606 uplink
501 higher layer processing unit
503 control unit
505 receiving unit
507 transmitting unit
509 channel measurement unit
511 transmit/receive antenna
5011 radio resource control unit
5013 SRS configuration unit
5015 transmit power configuration unit
5051 decoding unit
5053 demodulation unit
5055 demultiplexing unit
5057 radio receiving unit
5071 coding unit
5073 modulation unit
5075 multiplexing unit
5077 radio transmitting unit
5079 downlink reference signal generation unit
601 higher layer processing unit
603 control unit
605 receiving unit
607 transmitting unit
609 channel measurement unit
611 transmit/receive antenna
6011 radio resource control unit
6013 SRS control unit
6015 transmit power control unit
6051 decoding unit 6053 demodulation unit
6055 demultiplexing unit
6057 radio receiving unit
6071 coding unit
6073 modulation unit
6075 multiplexing unit
6077 radio transmitting unit
6079 uplink reference signal generation unit
3501, 3601 macro base station

The invention claimed is:

1. A terminal apparatus comprising:
reception circuitry configured to receive, via a higher layer signal, a first parameter set for uplink power control and a second parameter set for the uplink power control; and
transmission circuitry configured to transmit an uplink signal including at least one of a physical uplink shared channel (PUSCH), a physical uplink control channel (PUCCH), and a sounding reference signal (SRS); wherein,
in a case that a first cell of a first base station and a second cell of a second base station are configured, the transmission circuitry is further configured to:
set a transmit power for the uplink signal based on the first parameter set, in a first case that the reception circuitry receives a first downlink control information (DCI) format from the first base station; and
set the transmit power based on the second parameter set, in a second case that the reception circuitry receives a second DCI format from the second base station, and
each of the first parameter set and the second parameter set includes at least a first type parameter for the PUSCH, a second type parameter for the PUCCH, and a third type parameter for the SRS.

2. The terminal apparatus according to claim 1, wherein each of the first parameter set and the second parameter set includes at least a nominal power for the uplink signal.

3. The terminal apparatus according to claim 1, wherein the transmission circuitry is configured to set the transmit power based further on a first pathloss in the first case, the first pathloss determined from a first received power of a first measurement target from the first base station, and
set the transmit power based further on a second pathloss in the second case, the second pathloss determined from a second received power of a second measurement target from the second base station.

4. A communication method for a terminal apparatus comprising:
receiving, via a higher layer signal, a first parameter set for uplink power control and a second parameter set for the uplink power control;
transmitting an uplink signal including at least one of a physical uplink shared channel (PUSCH), a physical uplink control channel (PUCCH), and a sounding reference signal (SRS); and
in a case that a first cell of a first base station and a second cell of a second base station are configured,
setting a transmit power for the uplink signal based on the first parameter set, in a first case of receiving a first downlink control information (DCI) format from the first base station, and
setting the transmit power based on the second parameter set, in a second case of receiving a second DCI format from the second base station,
wherein each of the first parameter set and the second parameter set includes at least a first type parameter for the PUSCH, a second type parameter for the PUCCH, and a third type parameter for the SRS.

\* \* \* \* \*